(12) United States Patent
Guan et al.

(10) Patent No.: US 10,502,442 B2
(45) Date of Patent: *Dec. 10, 2019

(54) DEVICE CONTROL SYSTEM

(71) Applicant: LUCIS TECHNOLOGIES HOLDINGS LIMITED, Grand Cayman (KY)

(72) Inventors: Shan Guan, Fremont, CA (US); Tao Zhao, Shanghai (CN)

(73) Assignee: LUCIS TECHNOLOGIES HOLDINGS LIMITED, Grand Cayman (KY)

( * ) Notice: Subject to any disclaimer, the term of this patent is extended or adjusted under 35 U.S.C. 154(b) by 152 days.

This patent is subject to a terminal disclaimer.

(21) Appl. No.: 14/902,344

(22) PCT Filed: Apr. 3, 2015

(86) PCT No.: PCT/CN2015/075923
§ 371 (c)(1),
(2) Date: Dec. 31, 2015

(87) PCT Pub. No.: WO2016/155021
PCT Pub. Date: Oct. 6, 2016

(65) Prior Publication Data
US 2017/0108235 A1    Apr. 20, 2017

(51) Int. Cl.
*F24F 11/00* (2018.01)
*F24F 11/30* (2018.01)
(Continued)

(52) U.S. Cl.
CPC .............. *F24F 11/30* (2018.01); *G05B 15/02* (2013.01); *G05B 19/042* (2013.01);
(Continued)

(58) Field of Classification Search
CPC .............. F24F 11/0012; F24F 11/0015; F24F 2011/0057; G05B 19/042;
(Continued)

(56) References Cited

U.S. PATENT DOCUMENTS

| 5,458,311 A | 10/1995 | Holbrook |
| 2006/0161270 A1* | 7/2006 | Luskin .................. G05B 15/02 700/22 |

(Continued)

FOREIGN PATENT DOCUMENTS

| CN | 201119069 Y | 9/2008 |
| CN | 101303794 A | 11/2008 |

(Continued)

OTHER PUBLICATIONS

International Search report for PCT/CN2015/075923 dated Jan. 8, 2016, 7 pages.

(Continued)

*Primary Examiner* — Chun Cao
(74) *Attorney, Agent, or Firm* — Metis IP LLC

(57) ABSTRACT

The present application relates to an environment control system. The environment control system is capable of detecting variations of natural environment and artificial environment, and control the use of electronic devices automatically or semi-automatically. Based on collected information stored in a built-in storage module, the environment control system may calculate and learn the user's habit of use with respect to the electronic devices using network connection.

20 Claims, 49 Drawing Sheets

(51) Int. Cl.
*G05B 19/042* (2006.01)
*H05B 37/02* (2006.01)
*G05B 15/02* (2006.01)
*F24F 110/20* (2018.01)
*F24F 120/20* (2018.01)
*F24F 110/10* (2018.01)
*F24F 110/50* (2018.01)
*F24F 120/10* (2018.01)
*F24F 11/58* (2018.01)

(52) U.S. Cl.
CPC ..... *H05B 37/0209* (2013.01); *H05B 37/0218* (2013.01); *H05B 37/0227* (2013.01); *H05B 37/0272* (2013.01); *F24F 11/58* (2018.01); *F24F 2110/10* (2018.01); *F24F 2110/20* (2018.01); *F24F 2110/50* (2018.01); *F24F 2120/10* (2018.01); *F24F 2120/20* (2018.01); *G05B 2219/2614* (2013.01); *G05B 2219/2642* (2013.01); *Y02B 20/46* (2013.01)

(58) Field of Classification Search
CPC .... G05B 2219/2614; G05B 2219/2642; H05B 37/0209
USPC ......................................................... 700/278
See application file for complete search history.

(56) References Cited

U.S. PATENT DOCUMENTS

| | | |
|---|---|---|
| 2007/0146160 A1 | 6/2007 | Takeshita |
| 2010/0308735 A1 | 12/2010 | Liu |
| 2011/0140548 A1 | 6/2011 | Hakkarainen et al. |
| 2011/0245940 A1* | 10/2011 | Picco ................. H05B 33/0863 700/90 |
| 2012/0104197 A1 | 5/2012 | Jensen |
| 2012/0310415 A1* | 12/2012 | Raestik ................. G05B 19/409 700/275 |
| 2013/0226354 A9* | 8/2013 | Ruff .................... G05D 23/1902 700/278 |
| 2013/0270097 A1 | 10/2013 | Cheng |
| 2014/0239843 A1 | 8/2014 | Hoang |
| 2015/0079178 A1 | 3/2015 | Dhuppad et al. |
| 2015/0370272 A1* | 12/2015 | Reddy ................... G05B 15/02 700/278 |
| 2016/0277203 A1* | 9/2016 | Jin ......................... G05B 15/02 |
| 2016/0299480 A1* | 10/2016 | Fu .......................... G05B 15/02 |

FOREIGN PATENT DOCUMENTS

| | | | |
|---|---|---|---|
| CN | 202075571 U | | 12/2011 |
| CN | 103376747 A | * | 10/2013 |
| CN | 103376747 A | | 10/2013 |
| CN | 103529762 A | | 1/2014 |
| CN | 103885346 A | | 6/2014 |
| CN | 204009437 U | | 12/2014 |
| CN | 204090198 U | | 1/2015 |
| CN | 204104195 U | * | 1/2015 |
| CN | 204104195 U | | 1/2015 |
| EP | 2421333 A1 | | 2/2012 |
| JP | 1994203967 A | | 7/1994 |
| JP | 2008109511 A | | 5/2008 |
| JP | 2010041344 A | | 2/2010 |
| WO | WO2015/135334 A1 | * | 9/2015 |

OTHER PUBLICATIONS

International Search report for PCT/CN2015/080160 dated Jan. 15, 2016, 7 pages.
European Search report in European Application No. 15887076 dated Feb. 19, 2018, 8 pages.
First Office Action in Chinese Application No. 201580078464.7 dated Sep. 2, 2019, 25 pages.

* cited by examiner

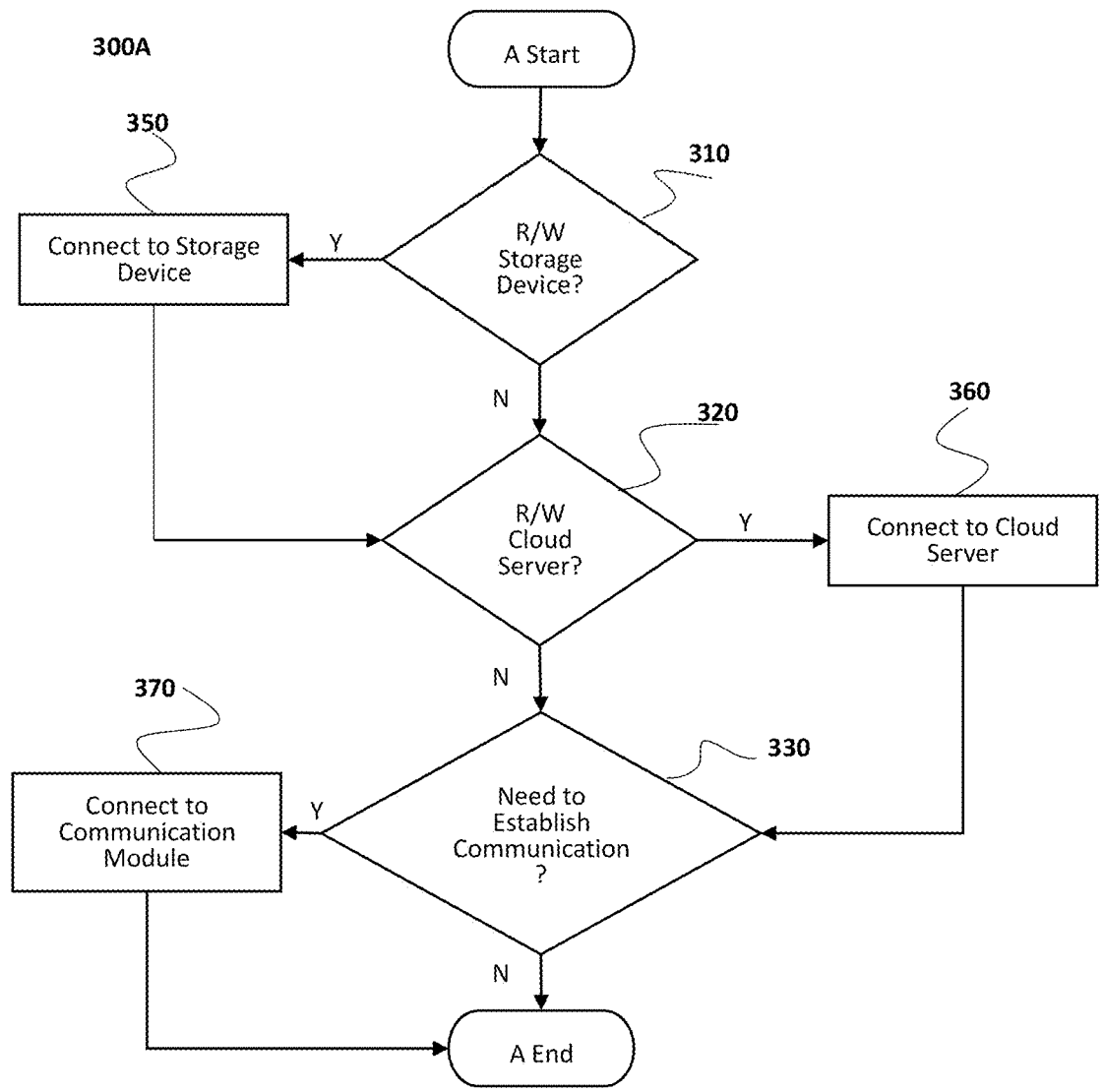
FIG. 3-A

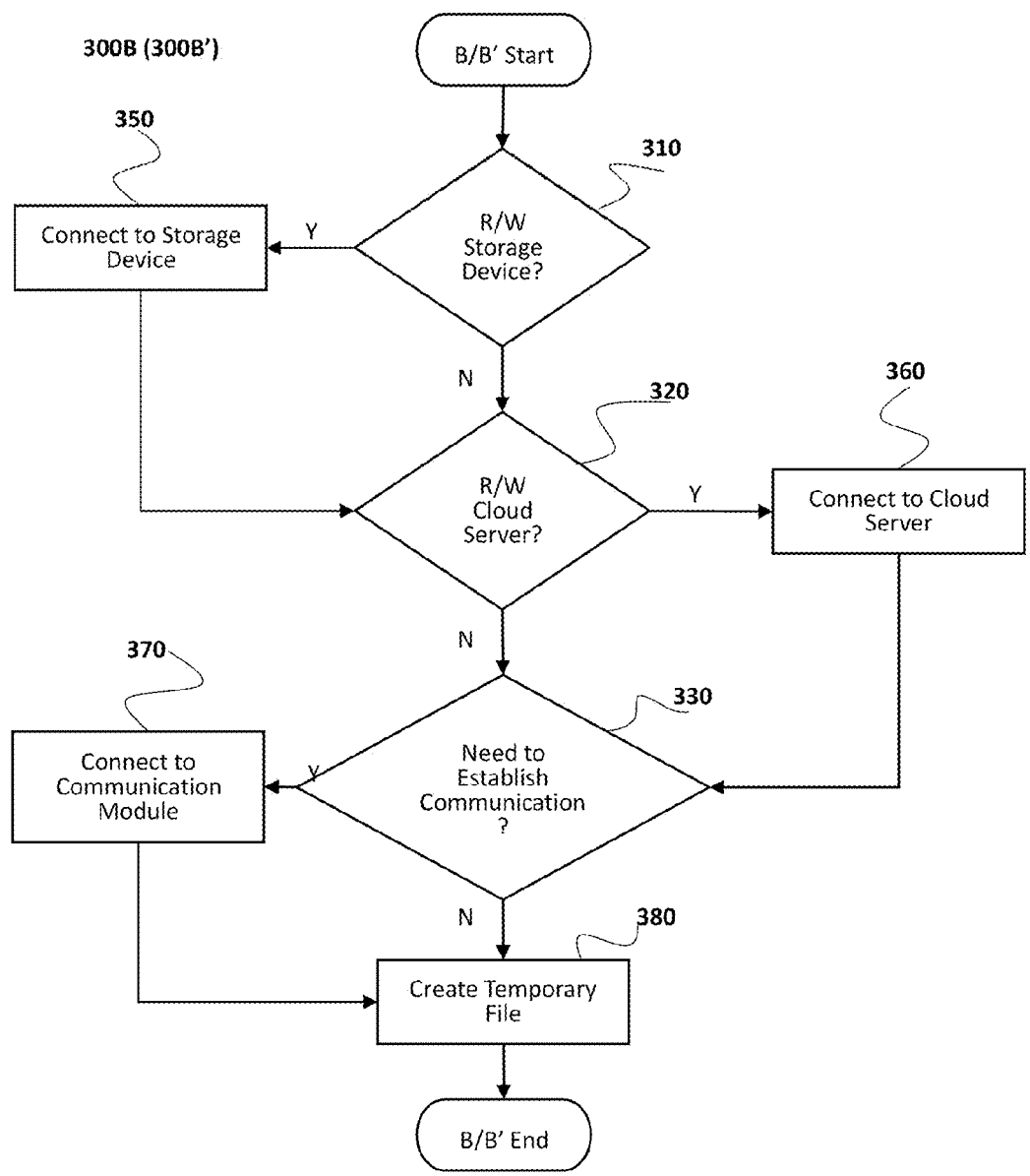
FIG. 3-B

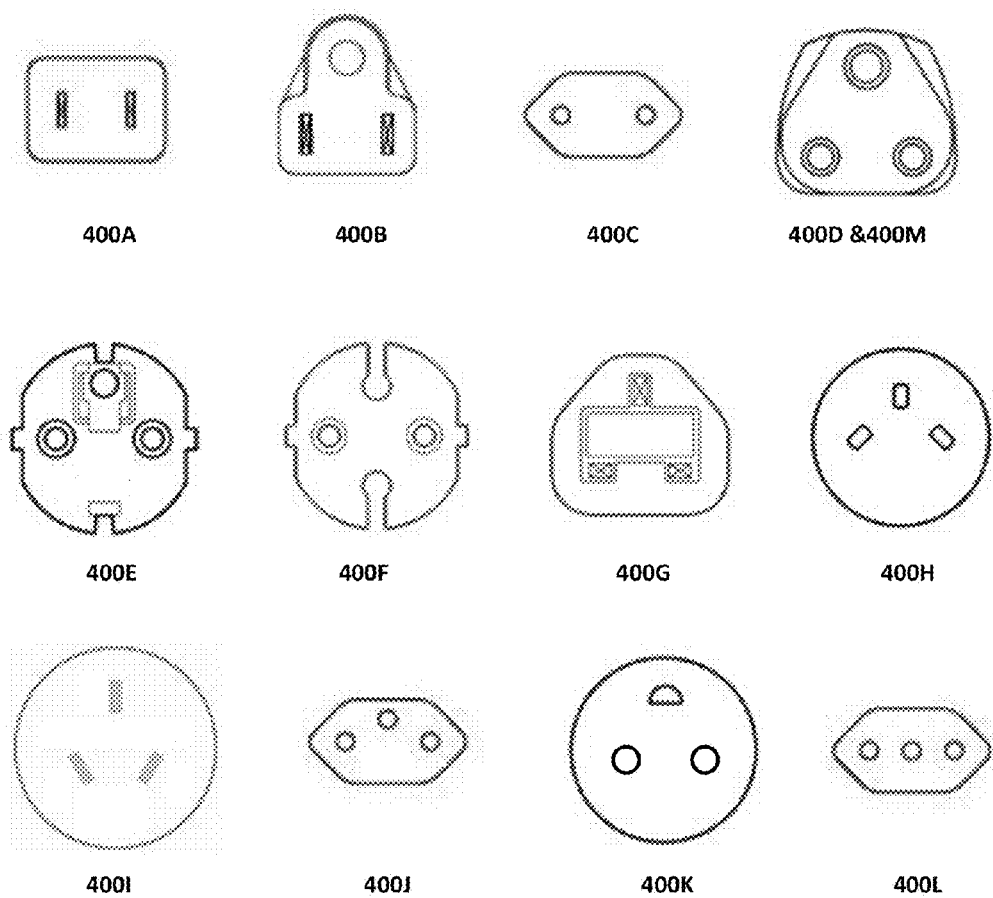
FIG. 4-A

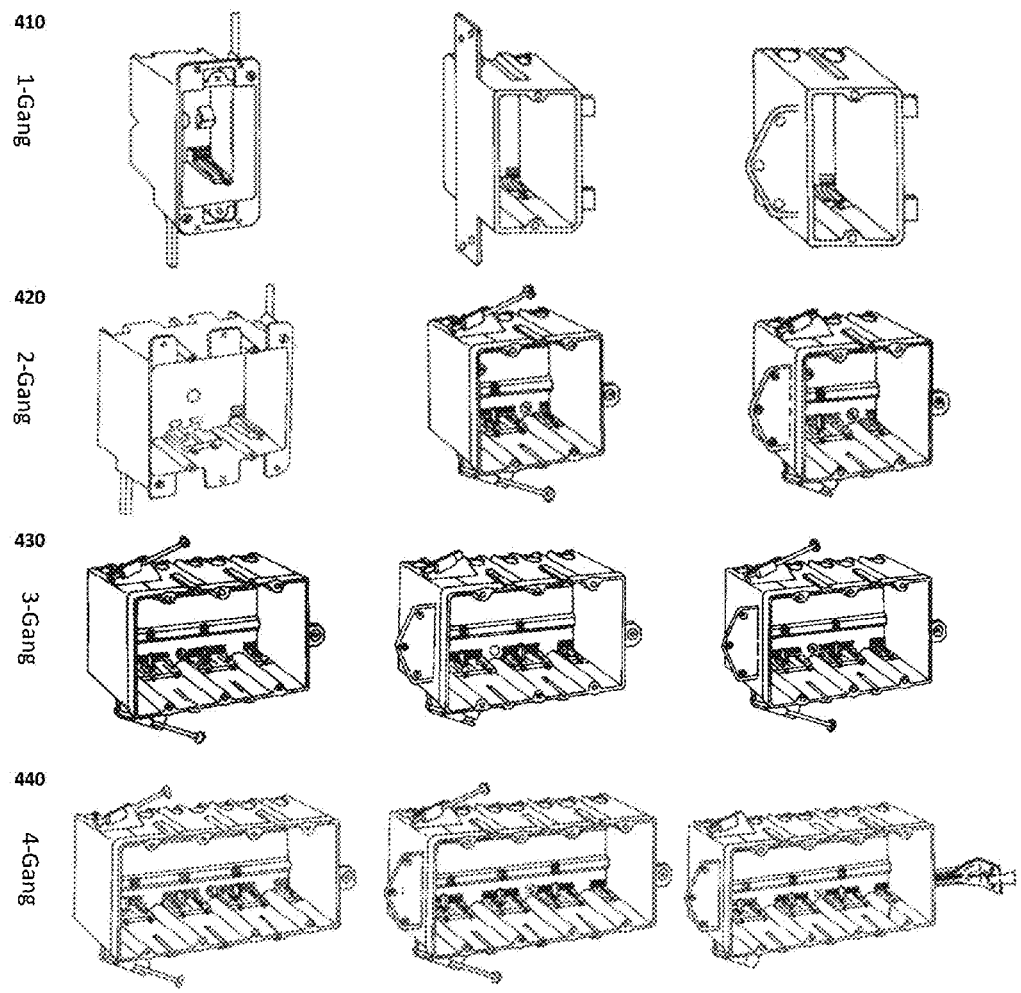
FIG. 4-B

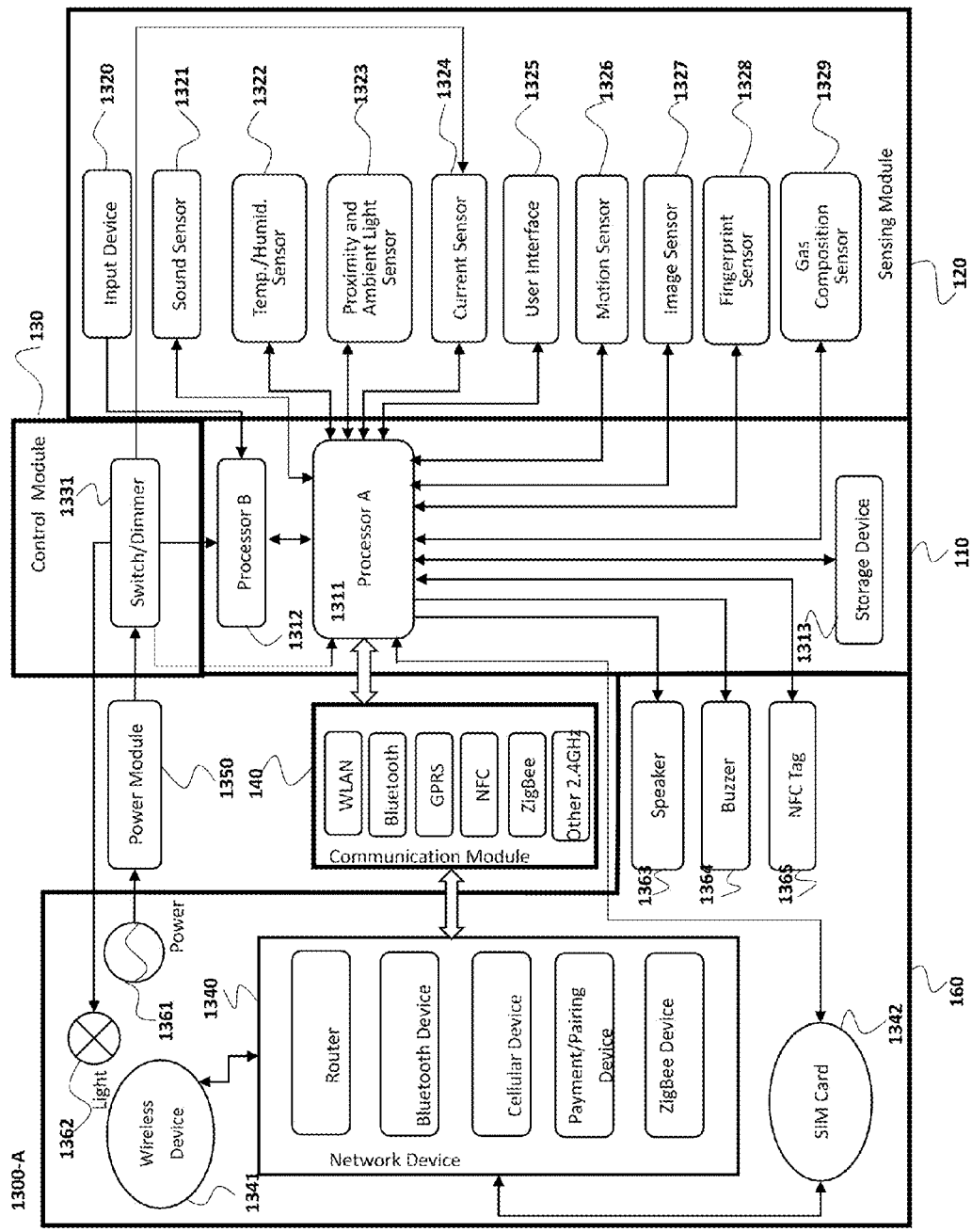
FIG. 13-A

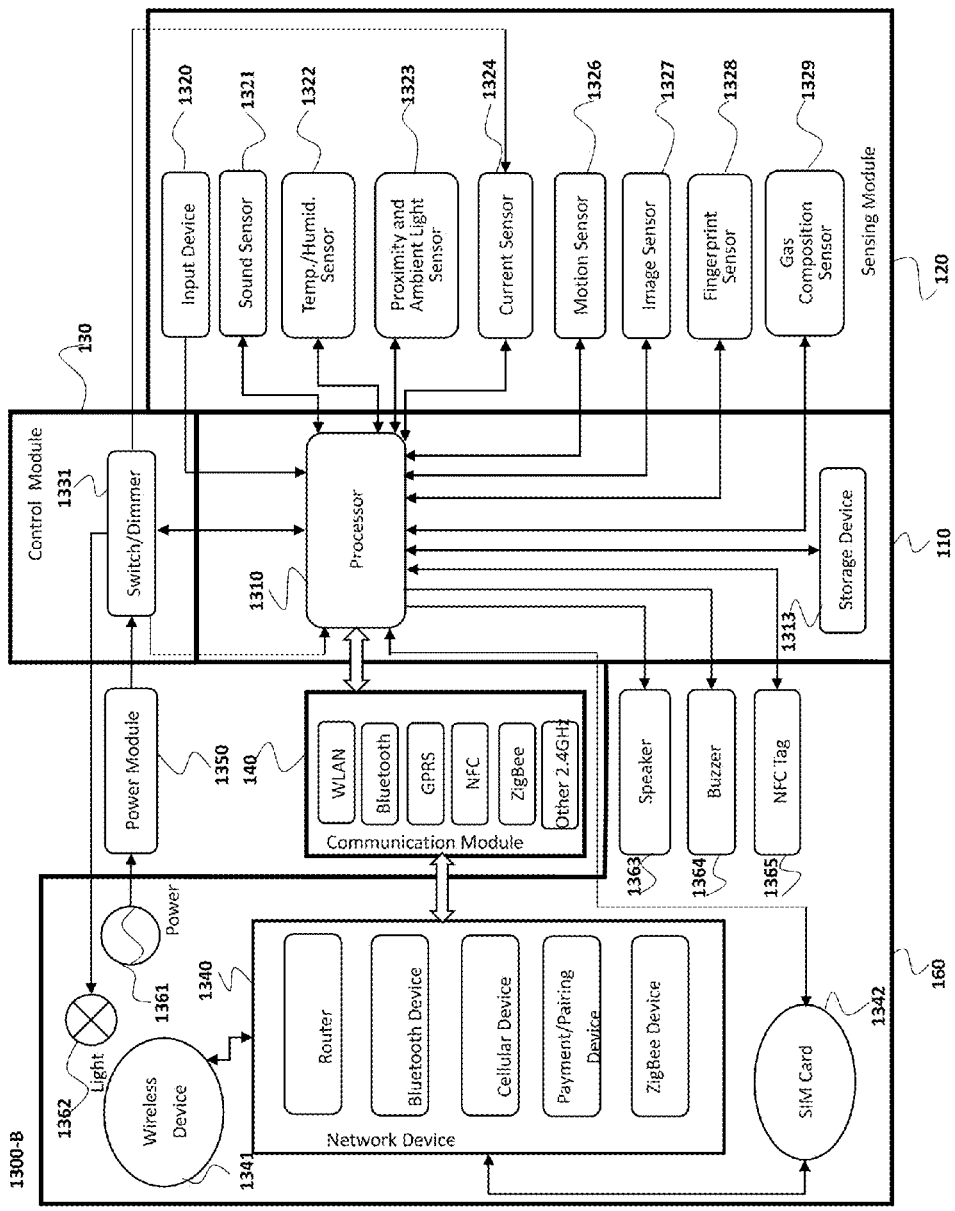
FIG. 13-B

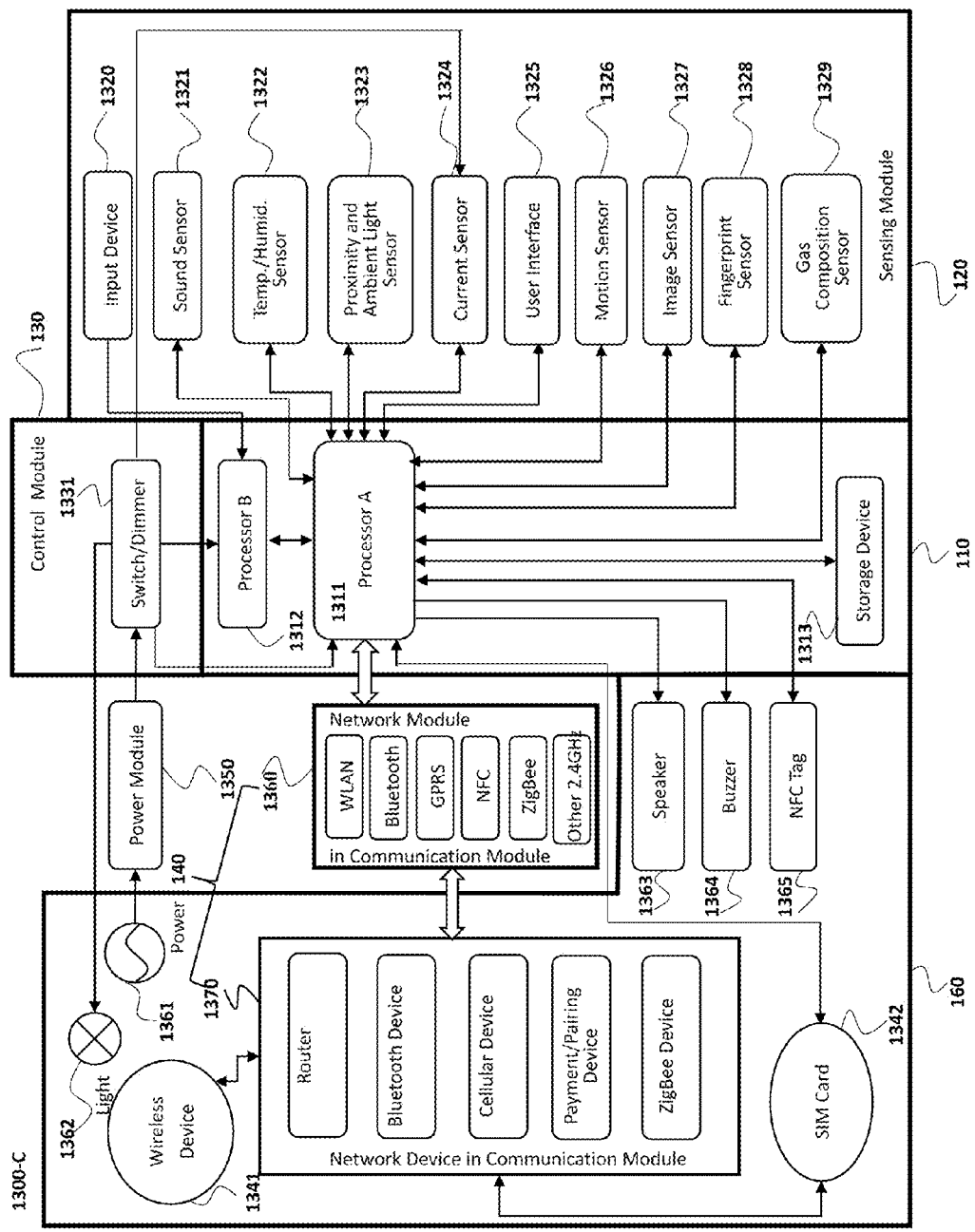
FIG. 13-C

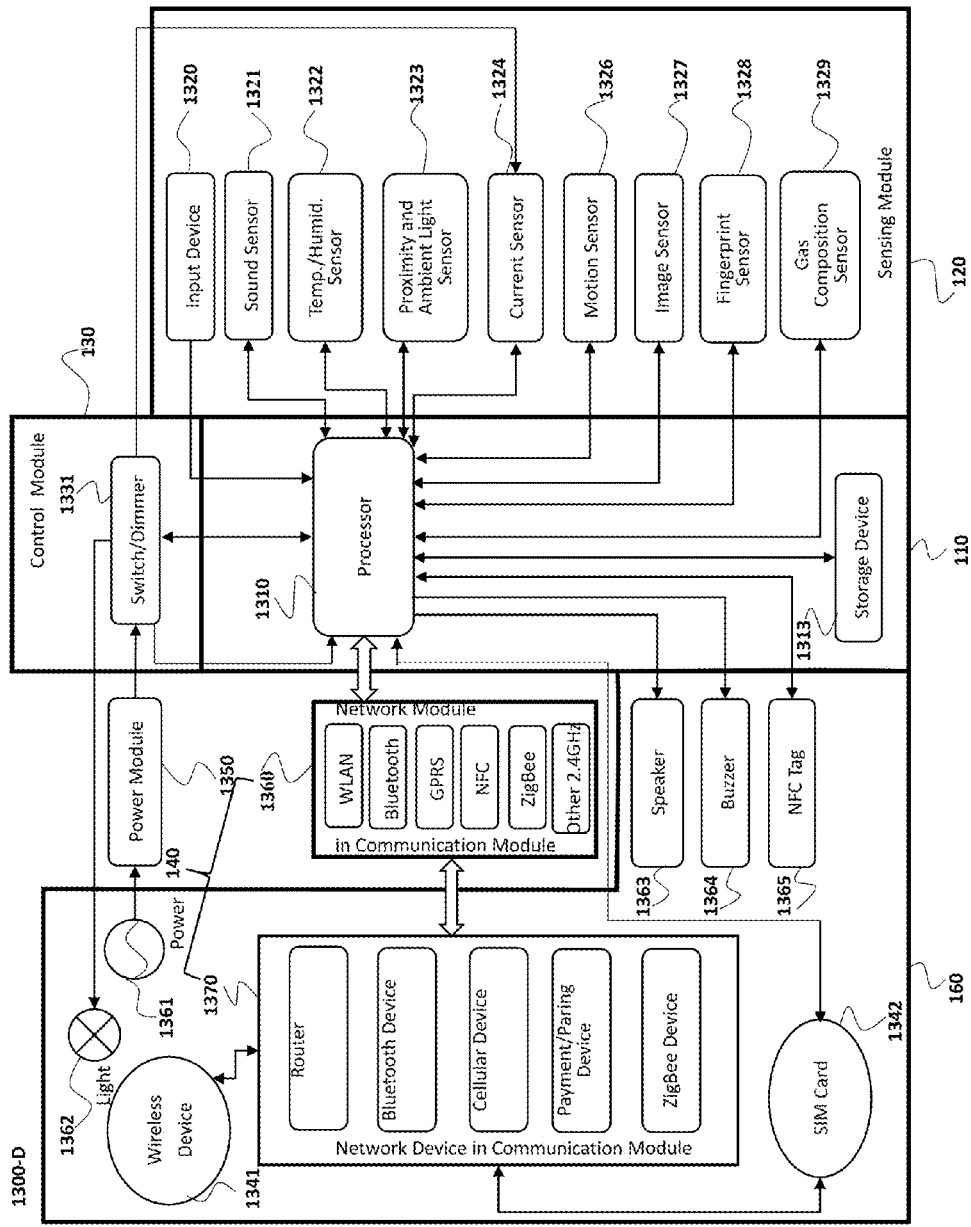
FIG. 13-D

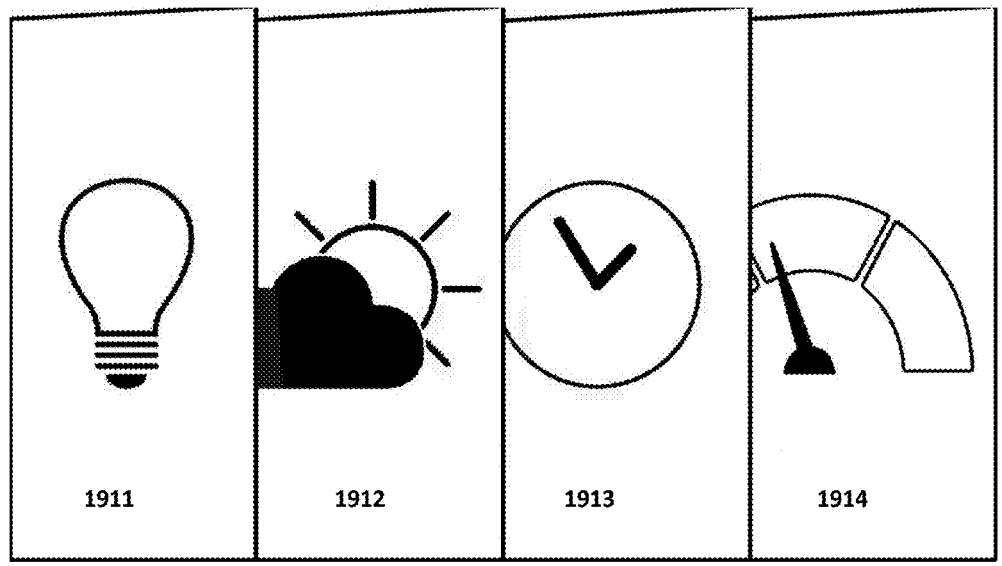
FIG. 19-A
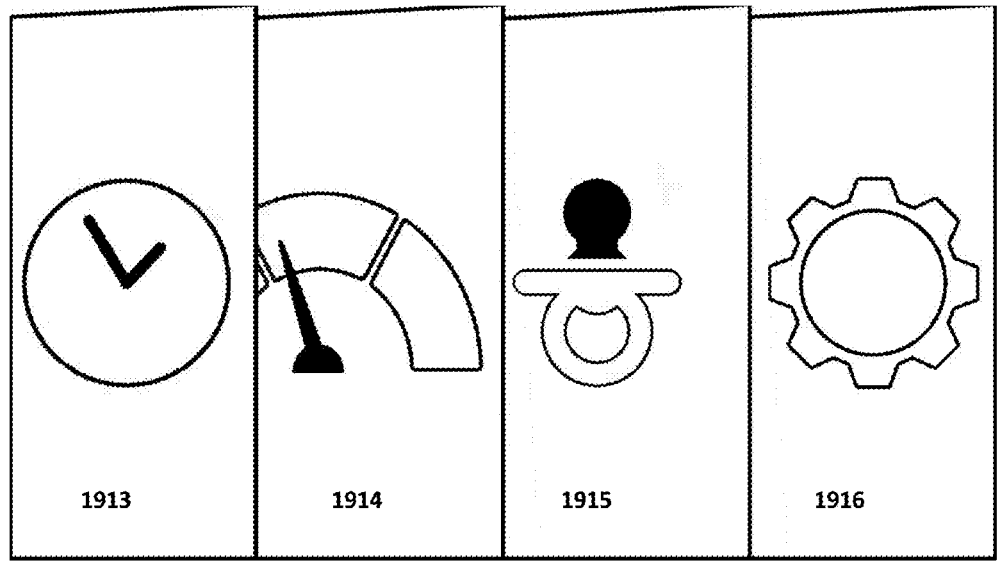
FIG. 19-B

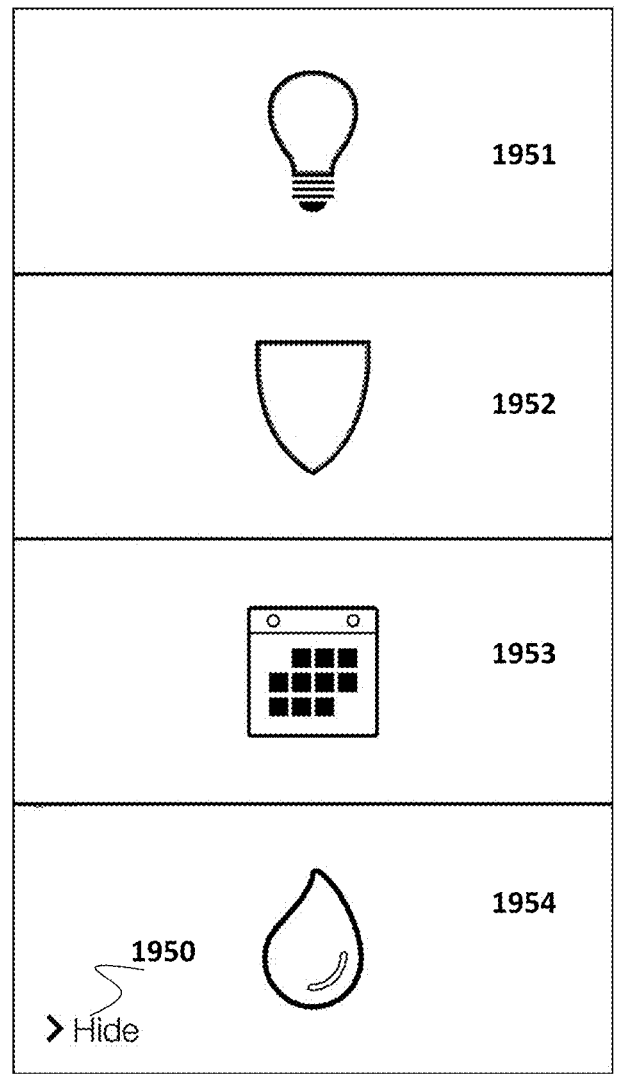
FIG. 19-C

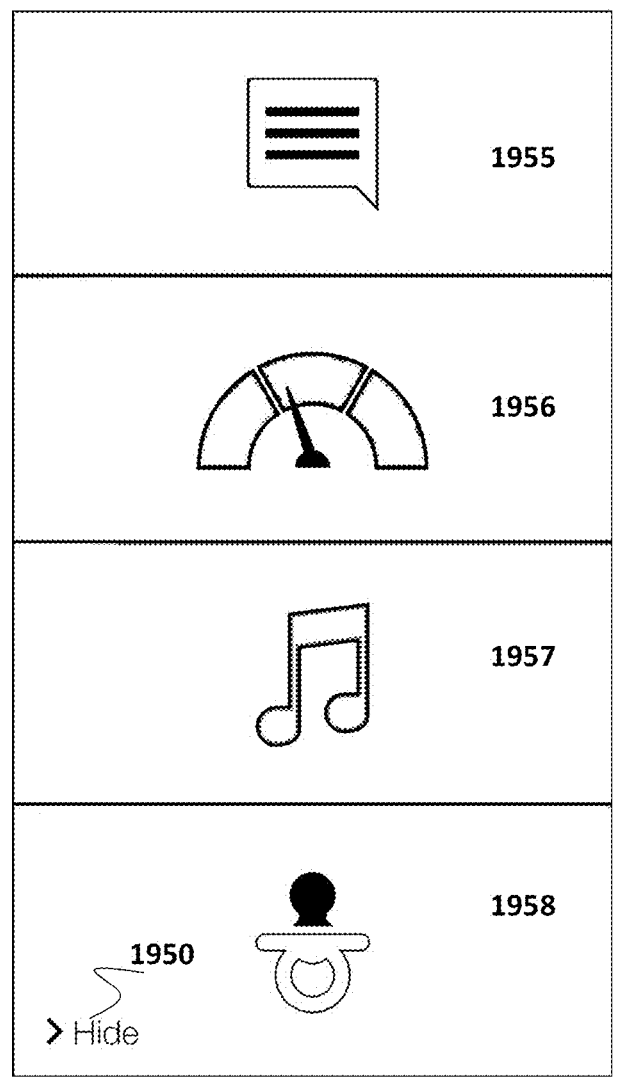
FIG. 19-D

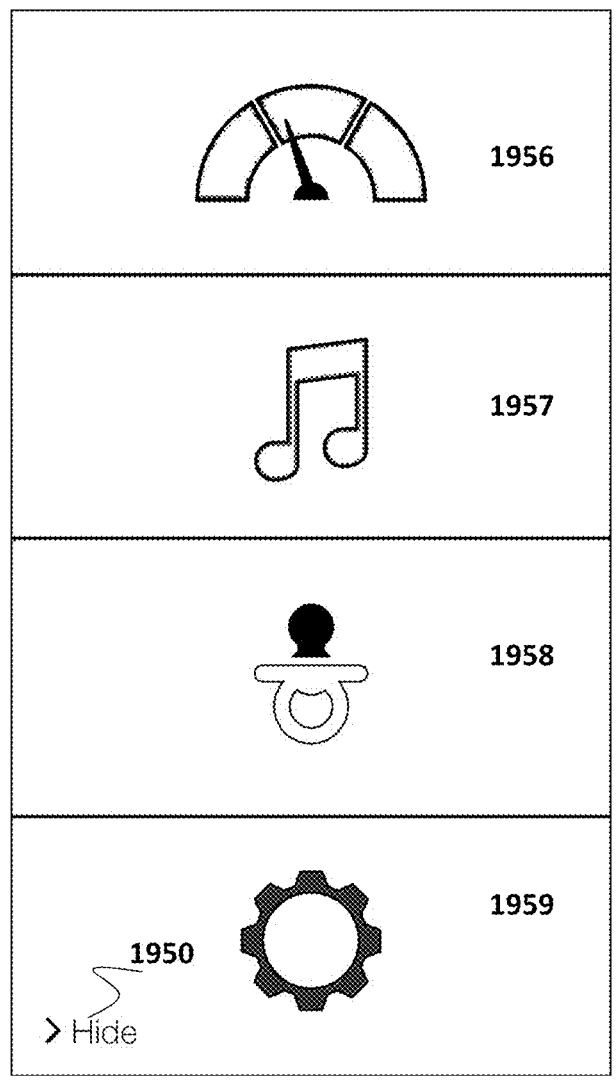
FIG. 19-E

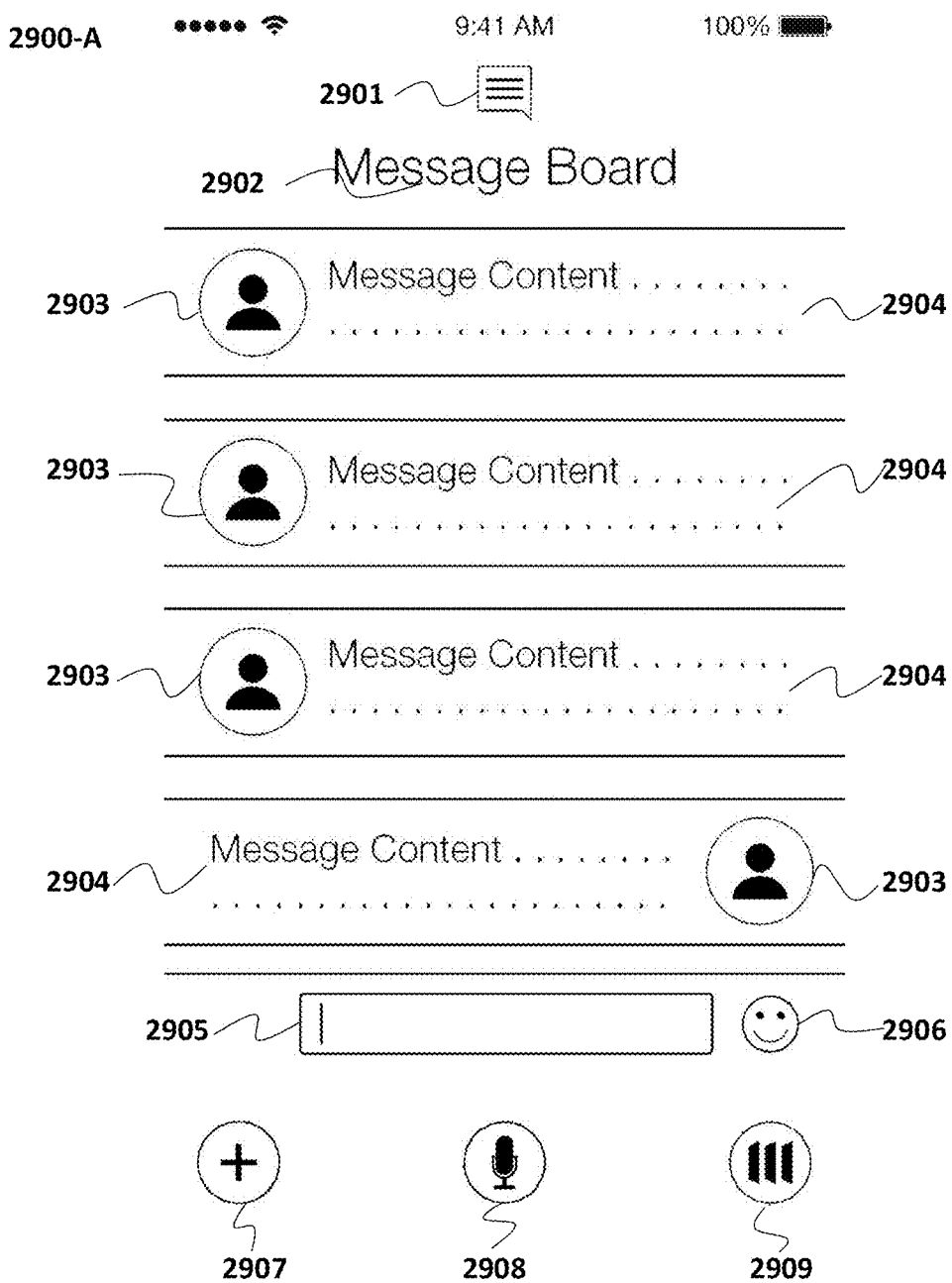
FIG. 29-A

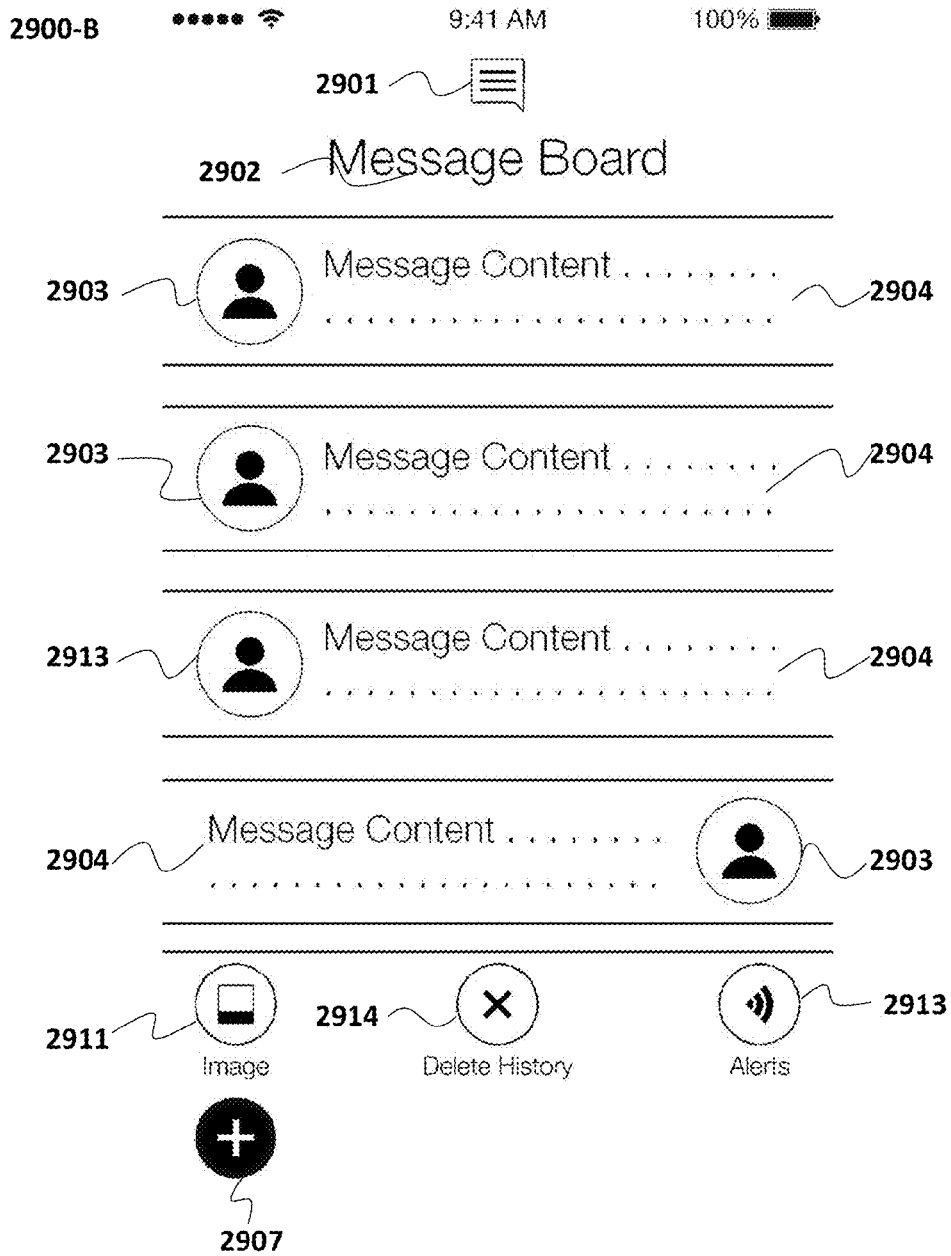
FIG. 29-B

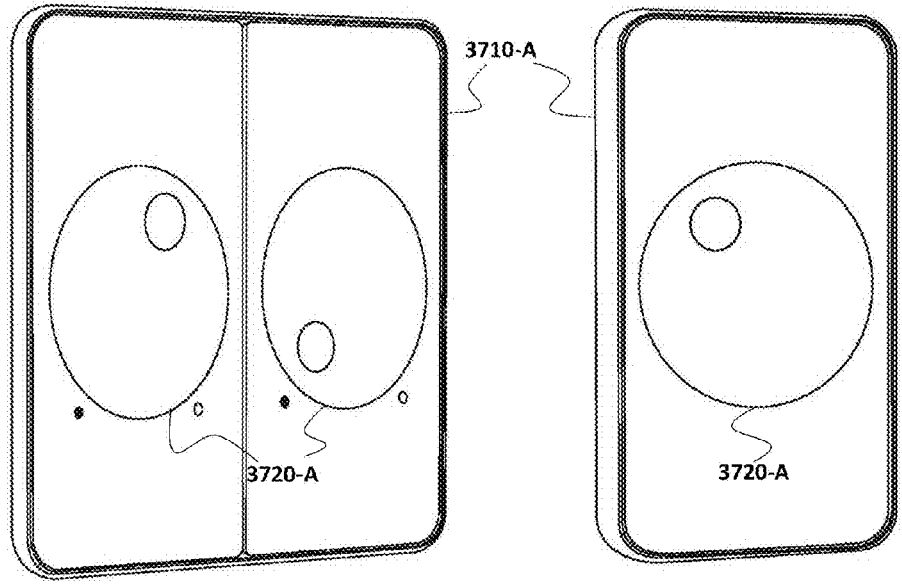
FIG. 37-A
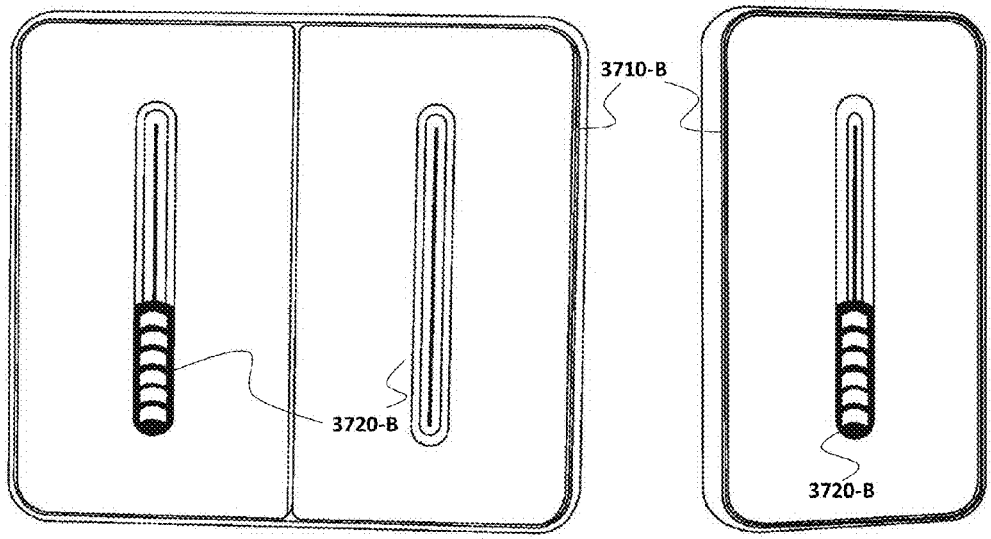
FIG. 37-B

DEVICE CONTROL SYSTEM

CROSS-REFERENCE TO RELATED APPLICATIONS

The present application is a U.S. National Phase Entry under 35 U.S.C. § 371 of the International Patent Application No. PCT/CN2015/075923 entitled "ENVIRONMENT CONTROL SYSTEM," filed on Apr. 3, 2015, the contents of which are hereby incorporated by reference.

TECHNICAL FIELD

The present application relates to an environment control system, including the fields of integration of multiple sub-systems or modes, building environment design and control, data collection and analysis, integration of circuits, data communication, and intelligence science.

BACKGROUND

Living environment of modern society often relies on the cooperation of multiple electronic devices such as lighting control inside buildings, installation and usage of common electronic appliances (such as refrigerators and televisions), security systems (such as doorbells and closed-circuit televisions), and heat and air conditioning systems. These kinds of electronic devices usually use physical switches, such as manual switches of lights, connection to electrical sockets of refrigerators, press buttons for doorbells, valves found in water heating systems, and power switches for air conditioners. Using physical switches may be inconvenient sometimes. For example, people may need to feel around with hands to search for light switches when entering a room during night or getting up in the middle of night; people may forget to turn off lights or television when leaving a room; people may fall asleep with a television on for a whole night, wasting energy; a host may have to walk across a room to open a door when guests ring the doorbell; air conditioners need to be manually turned on and require some time to achieve a set temperature, or otherwise may need to work inefficiently for an extended period; the recording function of closed-circuit televisions in security systems generally need to be constantly turned on for a long time, which may consume large storage space. The above mentioned are only some common situations, thus it can be appreciated that although some electronic devices already incorporate some smart controlling elements (e.g., smart temperature control of a refrigerator), there is still the need for a smarter, more convenient, and more powerful environment control system.

SUMMARY

The present application relates to an environment control system and related use thereof. The environment control system may include several subsystems or integration modes, building environment design and control, data collection and analysis, integration of circuits, data communication, and intelligence science. According to one embodiment, the system may include a first panel and a second panel. The first panel may include a first sensing module and a first processing module. The first sensing module may collect parameters related to a first device. The first processing module may control the first device according to at least part of the collected parameters or user inputs. The first panel may acquire one or more parameters related to the first device by other means (for example, sensors or sensing units located on the second panel, or sensors or sensing units outside or independent of the system, etc.), in order to determine the control of the first device. The second panel may work independent of the first device. The second panel may include a first physical controller. The first physical controller may control the first device. The first panel may also control the first physical controller. The first panel and the second panel are detachably connected. The first panel may be termed a "front panel," while the second panel may be termed a "back panel." For the sake of convenience, the environment control system may also be referred to as the "system."

According to one embodiment of the present application, the first sensing module of the first panel may include one or more sensors or sensing units. For example, the first sensing module of the first panel may include a temperature/humidity sensor, a gas composition sensor, a motion sensor, a proximity sensor, an ambient light sensor capable of sensing luminous intensity of ambient light, etc., or any combination thereof. A motion sensor may detect speed, contour, or distance between an object and a smart switch. The first panel may include a camera. The camera may be equipped with a physical cover, which may be opened or closed. The first panel may include a gateway, which may be a smart gateway. Descriptions of the smart gateway can be found in below passages of the present application.

According to one embodiment of the present application, the first panel may further include a first communication module. The first panel may communicate with a second device via the first communication module. The first panel may control the second device through the communication with the second device. The first panel may collect or acquire parameters or user inputs related to the second device, and communicate with or control the second device. See below descriptions of the collection or acquisition of parameters or user input related to the first device. The communication between the first communication module and the second device may be through one or more cellular networks. The communication between the first communication module and the second device may be through a wireless network.

According to one embodiment of the present application, the first panel may include a touch-sensitive device. The touch-sensitive device may be a touch screen. According to the present application, the touch-sensitive device and the touch screen are generally referred to as "touch screen." The first panel may receive user input through the touch screen. The first panel may display information related to the first device through the touch screen. The user input may refer to clicking or selecting information displayed on the touch screen by a user, and such information may be at least partially related to the first device. User input may be other information or instructions inputted by the user. The first panel may acquire user input through the first communication module (for example, a user may input through mobile phones, computers, television sets, or remote controllers of television sets that are able to communicate with the environment control system). According to one embodiment of the present application, the second panel may include a second sensing module and/or a second communication module. Descriptions of the first sensing module may be similarly applied to the second sensing module. Descriptions of the first communication module may be similarly applied to the second communication module.

According to one embodiment of the present application, the environment control system may include a first panel and a second panel. The first panel is configured to collect or acquire parameters or user inputs related to the first device. Parameters related to the first device may be collected via a sensor or a sensing unit. The sensor or sensing unit may be part of the environment control system. For example, the environment control system may include a sensing module, and the sensor or sensing unit may be part of the sensing module. The sensing module may be part of the first panel, or part of the second panel. Parameters related to the first device may be acquired via a sensor or a sensing unit outside of the environment control system or independent of the system, which may send the parameters to the system. User input related to the first device may be acquired via an input/output device. The input/output device may be a touch screen. The input/output device may be part of the environment control system. For example, the environment control system may include a touch screen, and the touch screen may be part of the first panel or second panel. User inputs related to the first device may be acquired through other parts or modules of the environment control system. For example, user inputs related to the first device may be acquired and sent to the system via an input/output device outside or independent of the environment control system. The environment control system may determine the control on the first device based on at least part of collected or acquired parameters or user inputs. Such determination may be made by a processor. The processor may be part of the environment control system. For example, the environment control system may include a processing module, while the processor may be part of the processing module. The processing module may be part of the first or second panel. The processor may be, for example, part of a cloud server, which may be part of the environment control system, or may be outside or independent of the environment control system. The second panel may include a first physical controller. The first physical controller may control the first device. The first panel may control the first physical controller, in order to control the first device. There may be a detachable connection between the first panel and the second panel. The first panel may communication with other devices or control devices other than the first device.

According to one embodiment of the present application, the environment control system may include a port that connects the first panel with the second panel.

According to one embodiment of the present application, the second panel may further include a current detecting device capable of collecting information related to current and send the information to the first panel. The first physical controller in the second panel may be a dimmer.

According to one embodiment of the present application, the environment control system may further include a wireless switch that may control the first device via the first panel.

According to one embodiment of the present application, the environment control system may further include a third panel, which includes a second physical controller, and the second physical controller may control a third device. The first panel may control the second physical controller. The third panel may further include one or more modules, for example, one or more of a third sensing module, a third communication module, a third sensing module, or any combination thereof. The first panel may further communicate with the third panel via the first communication module. Furthermore, there may be a detachable connection between the first panel and the third panel. The third panel may be a simplified smart switch.

According to one embodiment of the current applications, a method may include gathering a parameter or user input related to a first device through a first panel; determining a control to the first device by the first panel based on at least part of the gathered parameter or user input; executing the control to the first device, where the control to the first device may include controlling of a first physical controller by the first panel, and the physical controller may control the first device independently from the first panel.

Additionally, the first panel may include a first sensing module, and the first sensing module may gather a parameter related to the first device. The first panel may include a touch screen, and the touch screen may receive a user input. The first physical controller may be a dimmer. The first panel may further include a first communication module, through which the first panel may communicate with a second device. The first panel may control the second device via the communication therewith.

BRIEF DESCRIPTION OF THE DRAWINGS

In order to better illustrate the technical solutions related to the embodiments of the present application, drawings associated with some embodiments are briefly described below. Obviously, drawings described below are only several embodiments of the present application. A person of ordinary skill in the art, without further creative effort, may apply the present teachings to other scenarios according to these drawings. Unless otherwise specified or obviously indicated by the context to the otherwise, the same numbering in the drawings refers to the same structure or procedure.

FIG. 3-A: System operation sub-process.
FIG. 3-B: System operation sub-process.
FIG. 4-A: Diagram of some commonly used household AC sockets.
FIG. 4-B: Diagram of some common junction boxes.
FIG. 13-A: Exemplary embodiment of modules application.
FIG. 13-B: Exemplary embodiment of modules application.
FIG. 13-C: Exemplary embodiment of modules application.
FIG. 13-D: Exemplary embodiment of modules application.
FIG. 19-A: Diagram of an exemplary embodiment of user interface menu.
FIG. 19-B: Diagram of an exemplary embodiment of user interface menu.
FIG. 19-C: Diagram of an exemplary embodiment of user interface menu.

FIG. 19-D: Diagram of an exemplary embodiment of user interface menu.

FIG. 19-E: Diagram of an exemplary embodiment of user interface menu.

FIG. 29-A: Diagram of an exemplary embodiment of message board user interface.

FIG. 29-B: Diagram of an exemplary embodiment of message board user interface.

FIG. 37-A: Diagram of an exemplary design of smart switch tag.

FIG. 37-B: Diagram of an exemplary design of smart switch tag.

DETAILED DESCRIPTION

Figure 1:
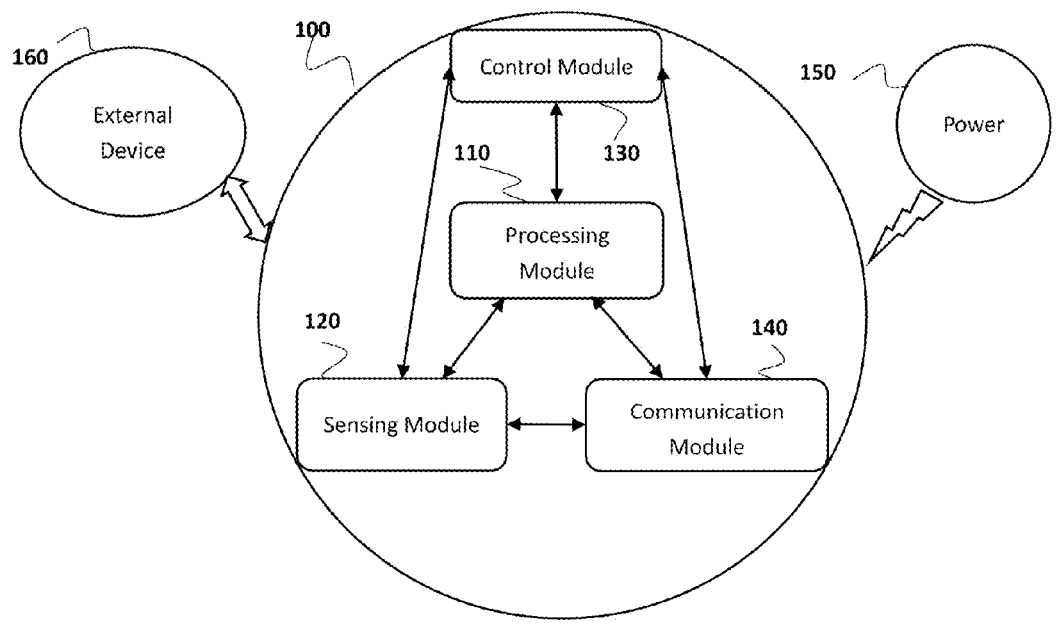
FIG. 1: Diagram of environmental control system module.

In order to better illustrate the technical solutions related to embodiments of the present application, drawings associated with some embodiments are described below. Obviously, drawings described below are only some embodiments of the present application. A person of ordinary skill in the art, without further creative effort, may apply the present teachings to other scenarios according to these drawings. Unless otherwise specified or obviously indicated by the context to the otherwise, the same numbering in the drawings indicates the same structure or procedure.

According to the specifications and claims in the present application, unless otherwise specified in the context, articles such as "a," "an," and/or "the" do not necessarily indicate singular forms, and also include plural forms. Generally, expressions such as "include" and "comprise" are only used to indicate specified steps or elements. However, listings of these steps and elements are not exclusive, and methods or devices may also include other steps or elements.

The environment control system in the present application may be applied to multiple environments, such as homes, offices, schools, hospitals, and other private or public areas. The environment control system may control one or more devices, such as lighting, temperature, electronic devices, or other devices. The environment control system may include one or more switches. A switch may have two panels, a first panel and a second panel. The first panel and the second panel may be detachably connected, that is, the first panel may be repeatedly attached and detached from the second panel. The first panel may have a touch screen. The touch screen is configured to display information for users and to receive user input. The first panel is configured to control one or multiple devices. The second panel may have one or more physical controllers. A physical controller may work independently from the first panel. When the first panel is impaired or dysfunctional, a user may remove the first panel and use the physical controller on the second panel to achieve at least some of the control functionality that may be normally performed by the first panel. The environment control system may be connected to existing power circuits or other control circuits (such that the rearrangement of wires for the environment control system may be avoided). This is configured to control the power circuits and other control circuits, as well as to control at least one other device. For example, the environment control system may be connected to existing power/control circuits of lighting devices, and thus control lighting; at the same time, the environment control system may control one or more other devices through wired or wireless connections. Such devices may include but are not limited to an air conditioner, a fan, a light, a television, a doorbell, a camera device, other home appliances, or the like. When the first panel is impaired or dysfunctional, a user may remove the first panel and use the physical controller on the second panel to achieve at least the control of lighting devices.

FIG. 1 shows an exemplary embodiment of the modules that may be included or used in the environment control system, which may include but are not limited to one or more components 100, one or more powers 150, and one or more external devices 160. In addition, the components 100 may include but are not limited to processing module 110, sensing module 120, control module 130, and communication module 140, etc. Processing module 110 may be used to perform calculations and primary logical judgments in the environment control system, or coordinate the relationships among different modules. Processing module 110 may be integrated (on a single electronic component), or distributed (by cooperation of multiple electronic components). It may be local (located within the controlled environmental), or remote (located outside of the controlled environmental). Sensing module 120 may be configured to acquire parameters, variables, or the like that relate to the environment and the environment control system. The manner of information acquisition by the sensing module 120 may be integrated or distributed, local or remote. In addition, it may be implemented by wired methods (for example, via electric or optical cables) or wireless methods (for example, via wireless radio or optical signals). Control module 130 may be configured to control the environment control system and/or external devices. Such control methods may be integrated or distributed, local or remote, or in a wired or wireless manner. Communication module 140 may be configured to enable communication within the environment control system, between the environment control system and external devices, or between the environment control system and/or external devices and other systems or devices. The communication method may be wired or wireless. Power 150 generally refers to any device which may supply energy to the system. The connection method may be wired or wireless. It is to be noted that, as mentioned here and below, connection methods may include but are not limited to the connection of power circuits, the connection of signal transmission, or the like. Details regarding embodiments of connection methods will be provided after the description of FIG. 3-B. Connection methods as mentioned below may also be applied to the whole content regarding "connection," "connection method," or the like. External devices 160 generally refer to a variety of devices that are connected directly or indirectly to the environment control system or a device of the environment control system. The connection may be local or remote, and connected by wire or wirelessly.

Processing module 110 is connected with other modules and/or other devices. The connected modules or devices may include but are not limited to sensing module 120, control module 130, and communication module 140. The connection method may be wired or wireless. Sensing module 120, control module 130, and communication module 140 may be connected with each other, and the connection method may be wired or wireless. Processing module 110, sensing module 120, control module 130, and communication module 140 may each have an independent power. Alternatively, two, three or more modules may make use of the same power source. Sensing module 120, control module 130, or communication module 140 may connect individually with external devices, or an external device may connect with one or more modules. The connection methods herein may be wired or wireless. A processing module 110 may connect with one or more other processing modules (not shown), and may connect with storage devices (not shown) and/or cloud servers (not shown). The connection methods here may be wired or wireless. The modules and devices described above are not indispensable, and for a person having ordinary skill in the art, based on the content and principle of the current disclosure, the form and details of the system may be modified or changed without departing from certain principles and structures. The modifications and changes may include any combination of the modules, or the formation of subsystems that may connect with other modules, and these modifications and changes, are still within the scope of the current disclosure and claims. For example, as shown in FIG. 1 control module 130 and communication module 140 may form a subsystem, and this subsystem may have a wired or wireless connection with processing module 110. Similar modifications may also be within the scope of the current disclosure and claims. Additionally, different modules may distribute to different electronic components, or be integrated on the same electronic component; a single module may even distribute to more than one electronic components. For example, processing module 110, sensing module 120, control module 130, and communication module 140 may each reside on an independent chip; or in another case, sensing module 120 and control module 130 are integrated on one chip, and processing module 110 and communication module 140 each resides on an independent chip; yet another case, each of processing module 110, sensing module 120, and control module 130 may be an independent chip, with different network modules of the communication module 140 residing on multiple chips.

Figure 2:
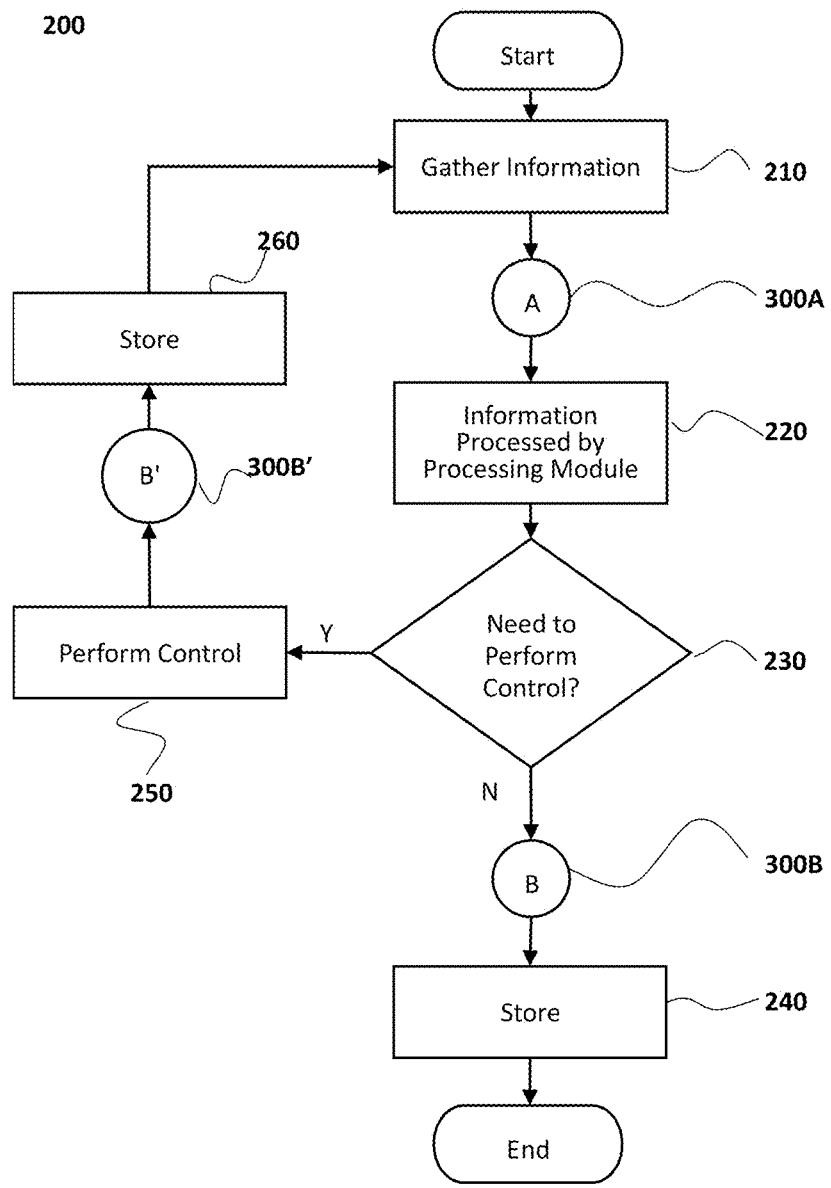
FIG. 2: System operation process.

FIG. 2 describes an example of the operation process of the environment control system, which may include the following steps: environmental information and/or user input information is gathered in Step 210, and such information, after being processed in Step 300A, may then be processed in Step 220 by processing module 110. The process related to Step 300A will be described later in detail. Step 230 may decide whether there is a need for a control module 130 to execute a control command according to the results generated in Step 220. If the control module 130 needs not execute a control command, or if the control module 130 needs to execute a control command, yet part or all of the related data need to be stored, then the process in Steps 300B and 240 may be used to store the data. If control module 130 needs to execute a control command, the system may conduct Step 250, follow the process in Step 300B' and Step 260 to store data, and then return to Step 210. The process related to Steps 300B and 300B' will be described later. The stored Data may further be transmitted to external devices (not shown) via wired or wireless connections. The stored data may also be used by the system to further conduct mode analysis and learning functions (not shown). Descriptions provided herein are only one specific embodiment of the greater process, and should not be understood as the only embodiment. Each individual step mentioned is not, in and of itself absolutely essential, and the whole process along with specific steps are not limited to the drawing or the descriptions above. For example, Step 210 may detect and/or monitor the current room temperature; subsequently Step 300A may be conducted to retrieve local temperature information from a cloud server, and subsequently connect with communication module 140 to send notifications of weather forecasts or warnings to a user. Step 230 may then make a judgment according to a user's preference or setting of room temperature, and let Step 250 drive air conditioners and vent outlets to control the room temperature. Relevant data may then be stored in Steps 300B' and 260. By repeating Steps 210, 220, 300A, 230, 250, 300B' and 260, room temperature may be adjusted to a comfortable level; finally, Steps 300B and 240 may be conducted to store relevant data. It is to be noted that information gathering in Step 210 may include detecting (perform gathering operation for one time or multiple times) and/or monitoring (continuously perform gathering operation), and such operation may be conducted for one or more times, or within a period of time, or all the time. The environment control system may have a self-learning function, which studies a user's living habits or activity style, according to the user's command and/or at least part of stored data received by the environment control system, and subsequently generates models to adjust or control related environment (such as temperature, lighting, or the like). It shall become obvious to a person having ordinary skill in the art, based on the content and principle of the current disclosure, that the form and details in the process may be modified or changed without departing from certain principles and structures. The modifications and changes are still within the scope of the current disclosure and claims.

FIG. 3-A shows an example of the process in Step 300A. The process in Step 300A makes judgments in Steps 310, 320, and 330 in order to determine whether to perform Steps 350, 360, and 370. Step 350 performs writing and reading of data and other information through storage devices. Storage devices include, without limitation, various common storage devices, such as hard drives, flash drives, tapes, CD-ROMs, cloud storage, and the like. The storage devices may be within, or outside of, the environment control system. The connection methods of the storage devices may be wired or wireless. Step 360 may connect to cloud servers and read and write data or other information. Cloud servers may be within the environment control system, or a third party commercial server. Step 370 may coordinate with communication module 140; in addition to reading and writing, it may also execute the control of the environment control system to the environment, the communication between users, or between a user and the environment control system. Communication as used herein generally refers to one-way or two-way signal acquisitions. Signals may include, without limitation to, commands, codes, numbers, texts, images, sounds, videos, and the like. Descriptions provided here are only one specific embodiment of a greater process, and should not be understood as the only embodiment. Each individual step mentioned here is not absolutely essential, and the whole process along with specific steps are not limited to the drawing or the descriptions above. For example, the order of conducting Steps 350 and 360 may be as shown in FIG. 3-A, or Steps 350 and 360 may be performed after Step 370, where connection with communication module 140 may be achieved. Steps 310, 320, and 330 may be performed separately, or simultaneously. It is obvious to a person having ordinary skill in the art, based on the content and principle of the current disclosure, that the forms and details in the process may be modified or changed without departing from certain principles and structures. The modifications and changes are still within the scope of the current disclosure and claims. FIG. 3-B shows an example of the process in Steps 300B and 300B'. In addition to the process in Step 300A, Steps 300B and 300B' may perform Step 380 to create temporary documents when reading and writing a storage device, reading and writing a cloud server, or achieving communication connection is not needed, and thus the environment control system may create a temporary document for further uses.

The environment control system may have one or more power sources, and power may supply the energy source to operate the environment control system. Power generally refers to any energy supply source. The following examples of power types are only part of applicable examples, and do not include or represent all the examples suitable for the environment control system. Power may include, without limitation to, an external power, a built-in battery, and a power generating device within the environmental control system. External alternating current power may include, without limitation to, domestic or industrial alternating current power sources. Specifically, different countries or regions may have different standards for domestic alternating current voltage and frequency. By way of example and without limitation, 120V and 60 Hz for United States and Canada, 220V to 240V and 50 Hz for most European countries, 230V or 240V and 50 Hz for Australia and New Zealand, 220V and 50 Hz for Argentina and Chile, 110V or 220V and 60 Hz for Brazil, 220V and 50 Hz for Egypt, South Africa and Morocco, 127V or 220V and 60 Hz for Saudi Arabia, 230V and 50 Hz for Turkey, 100V and 50 Hz (East) or 60 Hz (West) for Japan, 220V and 50 Hz for China, Hong Kong, and Macau, 220V and 60 Hz for South Korea, 110V and 60 Hz for Taiwan. Furthermore, the connection between the environment control system and domestic alternating current may be achieved through cables or standard plugs. When connecting using cables between the environment control system and domestic alternating current, cable wiring standards may include, without limitation to, American standards UL244A, UL514A, UL514B, UL514C, UL514D, CSA C22.2 No. 177, and NFPA70, European standards IEC/EN 61058-1, IEC/EN 61347-2-11, and IEC/EN 61347-1, Australian standards AS/NZS3123, AS/NZS3131, AS/NZS60320.1, and AS/NZS60320.2.2, Japanese standard JIS C 8281-2-1, Chinese standards GB16915.1, GB16915.2, GB16915.3, and EN60669. Standards for using plug connection may include, without limitation to, the examples shown in FIG. 4-A, where plug schematics of some countries are demonstrated. 400A and 400B show plugs generally used in the United States, Canada, and Japan, and the 400A type plugs used in the United States and Canada are polarized (with one smaller port and one larger port). Most European counties use 400C and 400F plugs, 400G plugs for United Kingdom, 400I plugs for most Oceanic countries, and 400A, 400I, and 400G plugs for China. FIG. 4-B provides some examples of inlet boxes, for example, single-gang inlet boxes shown in 410, two-gang inlet boxes shown in 420, three-gang inlet boxes shown in 430, and four-gang inlet boxes shown in 440. The above examples of voltage, frequency, domestic power standards, plug standards, and inlet boxes are only some of the examples for illustrative purposes. Other voltages, frequencies, domestic power standards, plug standards, and inlet boxes may also be used in the environment control system. For example, a power source may be wirelessly supplied to the environment control system. For instance, energy may be transferred from the power source to the environment control system through inductive coupling. This technology may also transfer energy to a battery to supply the operation of the environment control system.

The environment control system may also use a battery as its power. A battery includes, without limitation to, a disposable battery and a rechargeable battery. Types of batteries may include, without limitation to, lead-acid batteries, nickel-cadmium batteries, nickel-metal hydride battery, lithium ion battery, fuel battery, zinc-manganese batteries, alkaline-manganese batteries, lithium battery, mercury batteries, and zinc-mercury batteries. Certainly, batteries may come in other types. When a rechargeable battery is used, the battery may be charged from a port within the environment control system; otherwise the battery may be taken out from the environment control system to get charged, or even be charged using wireless charging techniques.

Additionally, a power generating device may be integrated in the environment control system. That is, in some of the embodiments, the environment control system may include one or more, or one or more sets of, generation devices. The energy source used for power generation may include, without limitation to, coal, petroleum and its products, hydraulic power, wind energy, geothermal, methane, and solar power. Energy sources are not limited to the above-mentioned types, and other energy types may also be used for the generation of power in the environment control system, such as, incineration heat.

The above only lists some exemplary types of power that may support the operation of the environment control system. However, it is to be understood that the types of power the environmental control system may use are not limited to the above examples. Additionally, multiple types of power may be used together to supply energy for the environment control system or some of its modules.

The connection between different modules of the environment control system, between modules and external devices, and between the system and storage devices or cloud servers may be wired or wireless. Wired connections may include, without limitation to, metal cables, optical cables, and hybrid cables. Exemplary embodiments of wired connection include coaxial cables, communications cables, flexible cables, helix cables, non-metallic sheathed cables, metallic sheathed cables, multicore cables, paired cables, ribbon cables, shielded cables, single cables, twinax cables, twin-lead cables, and twisted pair cables. The above examples are only for illustrative purposes, and the media for wired connection may come in other types, such as other transmission media for electrical or optical signals. Wireless connections may include, without limitation to, radio communication, free-space optical communication, sonic communication, and electromagnetic induction communication. Moreover, radio communication may include, without limitation to, IEEE 802.11 series standards, IEEE 802.15 series standards (such as Bluetooth and ZigBee technology), first generation mobile communication technology, second generation mobile communication technology (such as, FDMA, TDMA, SDMA, CDMA, and SSMA), general packet radio service, third generation mobile communication technology (such as, CDMA2000, WCDMA, TS-SDMA, and WiMax), fourth generation mobile communication technology (such as, TD-LTE and FDD-LTE), satellite communication (such as, GPS technology), and other technology that operates on ISM frequencies (such as 2.4 GHz). Free-space optical communication may include, without limitation to, visible lights, and infrared ray signals. Sonic communication may include, without limitation to, sound wave and ultrasonic wave. Electromagnetic induction may include, without limitation to, near field communication technology. The above examples are only for illustrative purposes, and wireless connections may also come in other types, such as Z-wave technology, Bluetooth low energy (BLE) technology, 433 MHz communication protocol frequencies, and other charged civil radio frequencies and military radio frequencies.

The connection methods between different modules in the environment control system, between modules and external devices, and between the system and storage devices or cloud servers are not limited to the above-mentioned exemplary technologies. In the environment control system, the above-mentioned connection methods may be used alone or together through the combination of multiple types of connection methods. In the case where multiple connection methods are used together, corresponding gateway devices may be used to achieve information exchange. Different modules may be integrated to achieve functions of more than one modules via the same device or electronic component. External devices may also be integrated into devices or electronic components of one or more modules, and one or more modules may be integrated on one or more external devices or electronic components.

Figure 5:
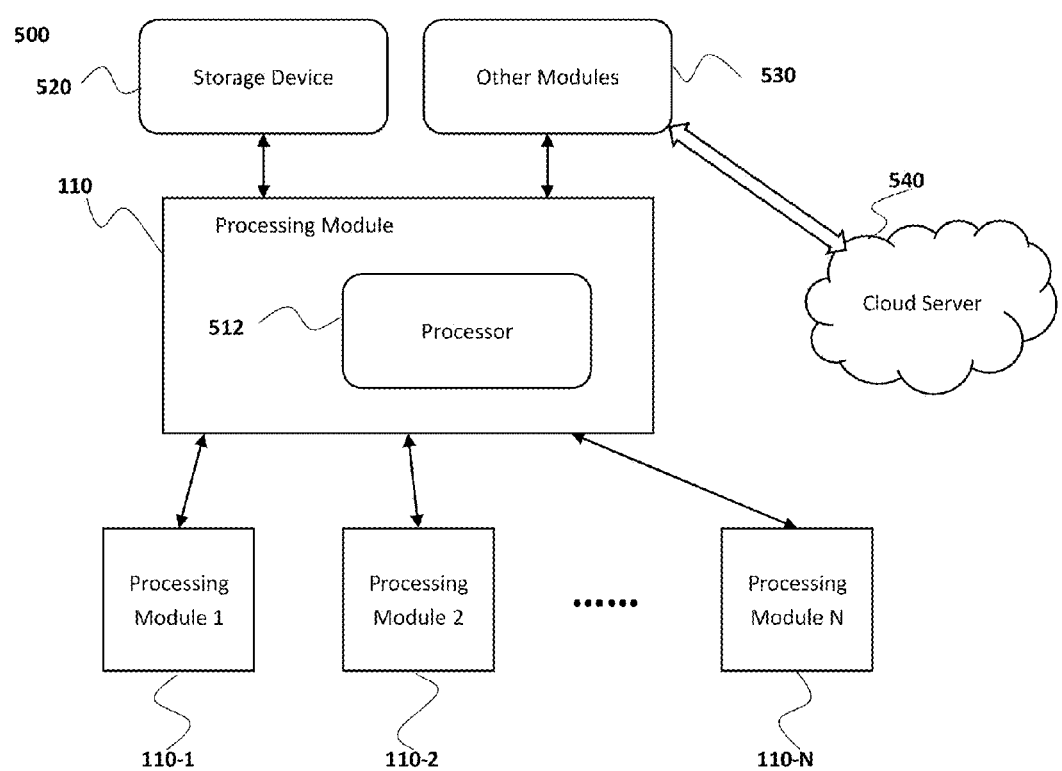
FIG. 5: Processing module diagram.

FIG. 5 shows an exemplary diagram of processing module 110 and its peripheral devices. Processing module 110 may include one or more processors 512. Processing module 110 may be connected with storage device 520 and other modules 530. Storage device 520 may also be included within processing module 110. Additionally, processing module 110 may be selectively connected with one or more processing modules 110-1, 110-2, and 110-N, or may not be connected with other processing modules. Processing module 110 may also be connected with cloud server 540 through other modules 530. Storage device 520 and/or cloud server 540 may be part of the environment control system, or may be devices external to the environment control system. For example, storage device 520 or cloud server 540 may be provided by a third party. The connection methods mentioned herein may be wired or wireless. The internal connection within processing module 110, and the connection between processing module 110 and peripheral devices are not limited to the exemplary embodiments shown in FIG. 5. One or more processor 512 in processing module 110 may be integrated on the same electronic component, or may be any combination of multiple electronic components.

Figure 6:
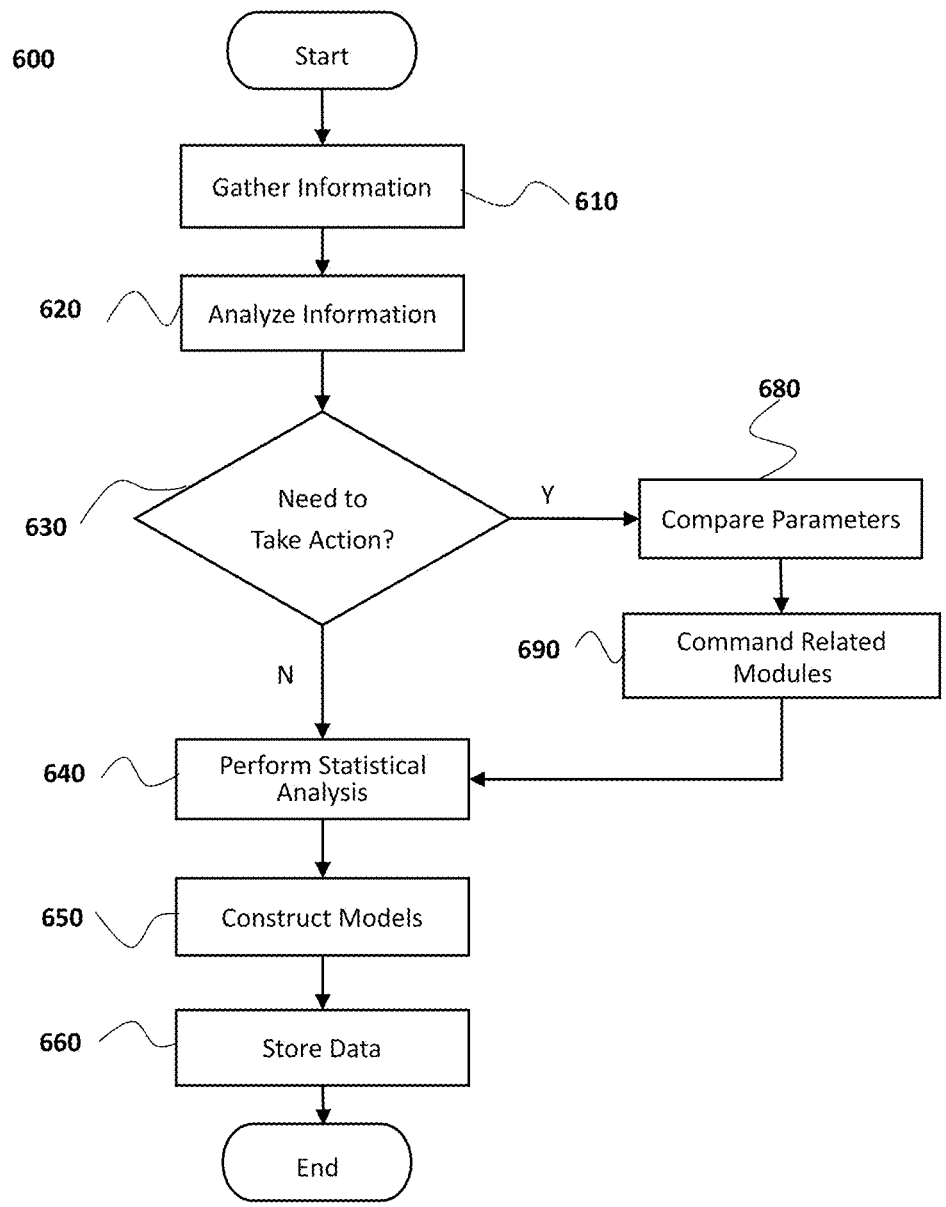
FIG. 6: Processing module operation flow chart.

FIG. 6 is an exemplary flow chart of the process of processing module 110 or its processing functions. In Step 610, processing function may gather information from other modules, storage device 520, or cloud server 540. Step 620 may analyze and process the gathered information. Step 630 may make judgment of whether other modules need to take an action, or whether, through the connection of other modules, external devices need to take an action. When action is needed, Step 680 may be executed to compare parameters and Step 690 may be executed to command related modules. The parameters as used herein generally refer to any data that may be compared with gathered information, including but not limited to preset values, thresholds, reference values or predictive values. When action is not required, Step 640 may be executed to statistically analyze gathered information, Step 650 may be executed to construct models according to gathered information, historically stored information and other parameters, and Step 660 may be executed to store data. The processing function of processing module 110 may include additional steps, or may omit any one or more steps shown in FIG. 6. For example, when processing module 110 is processing the command of "open the door," statistical analysis in Step 640 and model construction in Step 650 may be omitted. In another example, Step 680 may be omitted, and if Step 630 decides that an action needs to be taken, Step 690 may be executed to command related modules.

All data, including but not limited to user command, data detected and/or monitored from sensing module 120, and data stored in cloud server 540, after being gathered and processed by processing module 110, may be selectively stored in storage device 520 and cloud server 540 for future access and analysis by the processing module 110. The storage device 520 as used herein generally refers to any medium capable of reading and/or writing data, and includes, without limitation to, random access memory (RAM) and read-only memory (ROM). RAM may include, without limitation to, dekatron, selectron tube, delay line memory, Williams tube, dynamic random access memory (DRAM), static random access memory (SRAM), thyristor random access memory (T-RAM), and zero capacitor random access memory (Z-RAM), etc. ROM may include, and without limitation to, magnetic bubble memory, magnetic twister memory, magnetic thin-film memory, magnetic plated wire memory, magnetic-core memory, drum memory, optical drive, hard disk, tape, early nonvolatile memory (NVRAM), phase change memory, magneto-resistive random access memory modules, ferroelectric random access memory, nonvolatile SRAM, flash memory, electronically erasable rewritable read-only memory, an erasable programmable read-only memory, programmable read-only memory, read shielded heap memory, floating connecting doors random access memory, nano-RAM, racetrack memory, variable resistive memory, and programmable metallization cell, etc. The above-mentioned storage devices are only exemplary, and storage devices that may be used in connection with the environment control system are not limited to these examples.

In addition, the reading and writing of data may be through cloud storage. Cloud storage is a part of cloud computing, which mainly uses the Internet to connect one or more sets of remote servers to achieve some types of data storage and processing. Cloud computing used the in environment control system may be public, private, or a combination of both. For example, personal information of users as well as data and related parameters acquired from family or working environment may be stored and calculated on private clouds. Private clouds as mentioned herein may require some level of identity recognition during data reading and writing. On the other hand, information such as weather may be retrieved from public clouds. Processing module 110 may select to read data from private or public clouds.

In addition to data storage, Cloud computing may also be used in data analysis. After the processing module 110 receives data, it may perform Steps 640 to conduct statistical analysis and Step 650 to construct models. First, the processing module 110 may compile and organize data gathered by other modules, read from storage devices, and stored in cloud server 540. Subsequently, these data may then be used as a statistical sample to assist construction of a mathematical model. The mathematical model may analyze, judge, predict, and imitate environmental changes and characteristics of user behaviors. For example, the characteristics may be modes of movement of humans and animals indoor, time and numbers of light being turned on and off, habits of using electronic devices, personal information of users, choices of multimedia's form and content, and time for watching thereof, preference of temperature and humidity, time to open doors and windows, habits of locking doors, amount, temperature, and time of water usage, frequency of using the bathroom by user, habit of diet and health conditions of users, user's habit of diet and language (may include ascents, habitual expressions, and emotional expressions), and visitor's personal information and visiting frequencies, etc. The above examples mainly analyze and construct models based on information retrieved from private clouds and other gathered data. Additionally, more complete models may be constructed by adding to this basis information provided by public clouds. For example, the models may calculate appropriate temperature, humidity, and ventilation time in a year or a day based on weather and climate information; the models may analyze users' social relationships with visitors based on social network; the models may adjust safety standards for family living or working places based on local news, etc. These mathematical models utilize a large amount of data statistics, calculations, and empirical tests to predict and mimic user and environmental variables. These types of models have many utilities. For example, to analyze users' living or working habits such that users can realize automatic environment control through less commands. Through this kind of learning, the environment control system is able to take corresponding measures when abnormal conditions (such as, sudden weather change, users' underlying health problems, potential safety problems, and illegal entry) are found. Additionally, the environment control system may also mimic a user's usage of electronic devices, so as to mitigate safety hazards even when the user is absent. Methods and applications of data statistical analysis and model construction are not limited to the above examples. For example, this kind of data statistical analysis may also utilize cloud server 540 and big data to construct an artificial intelligence system, which may be capable of analyzing user movements and interacting with users, etc.

Figure 7:
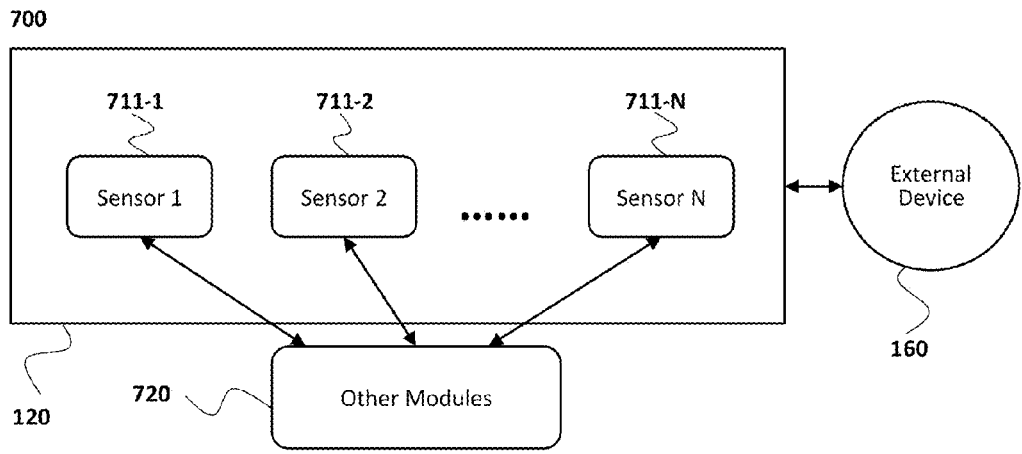
FIG. 7: Sensing module diagram.

FIG. 7 shows an exemplary embodiment of sensing module 120 in the environment control system. Sensing module 120 may include one or more sensors 711-1, 711-2, and 711-N. Sensing module 120 may further connect with other modules 720 and external devices 160. Sensors 711-1, 711-2, and 711-N may also be external devices, or some parts or electronic components of external devices. FIG. 7 is only one exemplary embodiment of the internal structure of sensing module 120 and peripheral devices, and sensing module 120 may have different structures and be connected with different peripheral devices. The connection methods suggested here may be wired or wireless. Sensing module 120 may have multiple sensors 711-1, 711-2, and 711-N integrated on the same electronic component, or alternatively may have multiple electronic components (each contains one or more sensors 711-1, 711-2, and 711-N) used together.

Figure 8:
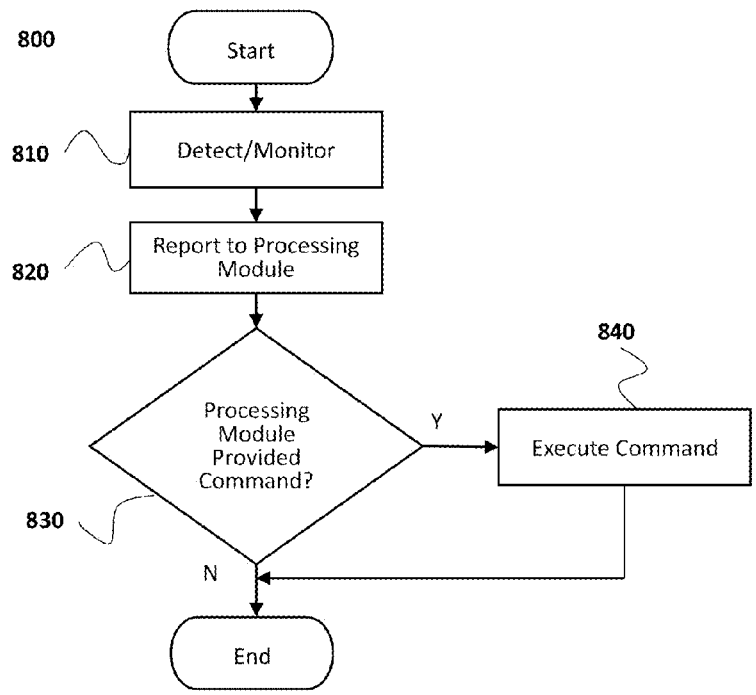
FIG. 8: Sensing module operation flow chart.

FIG. 8 is an operation flow chart of the sensing module 120 and sensing functions. Sensors 711-1, 711-2, and 711-N may detect and/or monitor changes in Step 810, and may execute Step 820 to report the changes to processing module 110. Based on the judgment made in Step 830, if a command is received, then Step 840 may be performed to execute the command and end the process; if a command is not received, the process may be terminated directly. FIG. 8 is only one example of the process in the operation of sensing module 120, and the function of sensing module 120 is not limited to this.

When sensing module 120 transmits to processing module 110, the transmitted content may be environmental or man-made changes that are detected and/or monitored by the sensing module 120. When processing module 110 transmits to sensing module 120, the transmitted content may be commands for some actions, such as controlling the angle of a camera or turning on and off the infrared security mode. Under some situations (such as, without limitation to, breakdown of processing module 110 or failure in connecting to processing module 110), sensing module 120 may bypass processing module 110, and communicate directly and exchange data with one or more of control module 130, communication module 140, or external device 160. In another embodiment, sensors 711-1, 711-2, and 711-N internal or external to the environment control system, after having detected and/or monitored data, may send the data to processing module 110 through communication module 140 of the environment control system via wired or wireless signals.

Types of data that may be acquired by one or more sensors 711-1, 711-2, and 711-N include but are not limited to physical data, chemical data, and biological data, etc. Physical data may include but are not limited to sound, light, time, weight, proximity, location, temperature, humidity, pressure, current, velocity and acceleration, inhalable particles, radiation, text, image, touch sense, pupil lines, and fingerprints, etc. Chemical data may include but are not limited to air pollution, water pollution, carbon monoxide intensity, and carbon dioxide intensity, etc. Biological data may include but are not limited to a living organism's blood pressure, heartbeat rate, blood sugar level, and insulin level, etc. The above examples are only for illustrative purposes, and data that may be detected and/or monitored are not limited to these examples. For example, gas composition sensor 1329 (see FIGS. 13A-13D) may detect and/or monitor gas composition of the surrounding atmosphere, including but not limited to carbon monoxide, carbon dioxide, oxygen, nitrogen, and ammonium, etc. Gas composition sensors 1329 include but are not limited to semiconductor gas sensors, electrochemical gas sensors, catalytic combustion gas sensors, thermal conductivity gas sensors, infrared gas sensors, and solid-state electrolyte gas sensors, etc. Gas composition sensors 1329 (see FIGS. 13A-13D) include but are not limited to enzyme sensors, microorganism sensors, cell sensors, tissue sensors, immunity sensors, biological electrode sensors, semiconductor biosensors, optical biosensors, thermal biosensors, and piezo crystal sensors, etc. A gas composition sensor 1329 may detect and/or monitor various biological information, including but not limited to blood sugar level, heartbeat, facial expression, age, pupil, hairstyle, scent, microorganism, and allergen, etc. It shall be noted that the above descriptions regarding gas composition sensor 1329 are for illustrative purposes only. In terms of the physical structure of the gas composition sensor 1329, it may comprise multiple independent sensors, and the independent sensors may be, for example, a gas sensor, and a pheromone sensor. In some embodiments, one gas composition sensor 1329 may detect and/or monitor one type of gas composition. In other embodiments, one gas composition sensor 1329 may detect and/or monitor multiple gas compositions. The above-mentioned data types are only some examples provided for illustrative purposes, and types of data acquirable by sensing module 120 include others, such as users' emotions and magnetic fields. Additionally, many different kinds of devices and methods can be used to detect and/or monitor aforementioned types of data. Devices used to detect and/or monitor sound include but are not limited to microphones, etc. Devices used to detect and/or monitor light include but are not limited to light intensity sensors and ambient light sensors, etc. Specifically, ambient and proximity sensor 1323 (see FIGS. 13A-13D) may have photosensitive components, the photosensitive components including but not limited to photoresistors, photodiodes, phototriodes, and silicon photovoltaic batteries, etc. The photosensitive components convert light condition of the surrounding environment into electrical signals. Ambient and proximity sensor 1323 may sense nearby light condition through processing the electrical signals. Devices used to detect and/or monitor time include but are not limited to mechanical watches and electric watches, etc. Devices used to detect and/or monitor weight include but are not limited to spring scales and electronic scales, etc. Devices used to detect and/or monitor proximity include but are not limited to transmitting and receiving devices of electromagnetic fields, etc. Devices used to detect and/or monitor location include but are not limited to microwave ranging systems, passive infrared sensors, ultrasonic sensors, and tomography sensors, etc. Specifically, when motion sensor 1326 (see FIGS. 13A-13D) uses microwave ranging mechanism, it may first send microwave to the surrounding area. When the microwave reaches an object that may not be bypassed, the microwave may then be reflected. Motion sensor 1326 may receive the reflected microwave and determine the distance of that object. Through continuously receiving reflected microwaves, the motion sensor 1326 may recognize whether the object is moving or not. Devices used to detect and/or monitor temperature include but are not limited to resistance thermometers, silicon band gap temperature sensors, infrared thermometers, and thermistor temperature sensors, etc. Devices used to detect and/or monitor humidity include but are not limited to capacitive humidity sensors, resistive humidity sensors, thermal conductivity humidity sensors, and gravimetric hygrometers, etc. Devices used to detect and/or monitor pressure include but are not limited barometers, force sensors, pressure sensors, manometers, McLeod gauges and, pressurized manometers, etc. Devices used to detect and/or monitor current include but are not limited to moving-coil ammeters, moving-iron ammeters, thermocouple ammeters, hot-wire ammeters, and digital ammeters, etc. Devices used to detect and/or monitor velocity and acceleration include but are not limited to microwave speedometers, photoelectric velocity sensors, optoelectronic wind speed sensors, photoelectric speed sensors, magnetic-electric speed sensors, and Hall-type speed sensors, etc. Devices used to detect and/or monitor inhalable particles include, without limitation to, beta rays and trace volatile balances. Devices used to detect and/or monitor radiation include, without limitation to, actinometers, pyrheliometers, and Geiger counters. Devices used to detect and/or monitor text include but are not limited to mechanical keyboards, conductive rubber keyboards, and contactless electrostatic capacitance keyboards, etc. Devices used to detect and/or monitor images include but are not limited to optical cameras, etc. Devices used to detect and/or monitor touch sense include but are not limited to tactile sensors, etc. Devices used to detect and/or monitor iris or fingerprint include but are not limited to optical identifications, capacitive sensors, biological radio frequencies, and digital optical identifications, etc. Devices used to detect and/or monitor air and water pollutions include but are not limited to chemistry reagents, pH monitors, conductivity meters, dissolved oxygen monitors, and nephelometers, etc. Devices used to detect and/or monitor microorganisms include but are not limited to biological toxicity test apparatuses, etc. Devices used to detect and/or monitor allergen include but are not limited to enzyme-linked immunosorbent assays, lateral flow assays, polymerase chain reactions, and adenosine triphosphate (ATP) assays, etc. The recognition of identity of moving objects includes but is not limited to sizes of objects, movement speeds, and movement modes, etc. The recognition of identity of sounds includes but is not limited to frequencies, amplitude (loudness), and rhythm, etc. The recognition on the identity of images includes but is not limited to themes of images and figures' appearances, ages, heights, races, and body builds within the images. The recognition on the identity of touch senses include but is not limited to force intensities, contact positions, force directions, force durations, force gap durations, and changes in force directions and magnitudes, etc. The above examples of sensible data are only for illustrative purposes, and sensible data may include many other types, such as identity of moving objects and users' emotions. The devices and parameters mentioned above are only some examples, and there are other devices and methods to achieve the function of sensing. Detected and/or monitored data may be recognized, and compared with a reference value, reference range, threshold, preset value, or predicted value.

One sensor may sense one or more items, and the following examples of sensors may be used. Additionally, multiple sensors may be integrated on the sensing module 120, or the external devices 160. For example, a touch screen may be used to recognize text input and hand gestures, and may verify password information. A camera with a microphone may be used to gather inanimate or animate images and sounds. A system integrating microwave, infrared, and thermal induction technologies, may be used to sense movements of humans, animals, and other objects, and apply related judgments. A light sensing system may detect and/or monitor sunlight intensity, time, visibility, and on/off conditions of lights. A physical switch may adjust lights by detecting and/or monitoring a user's change to the switch. A sensor may constantly perform the detecting and/or monitoring functions (such as to detect and/or monitor all day), or may perform the detecting and/or monitoring functions at certain time (such as once every minute, once every two minutes, etc), or may perform the detecting and/or monitoring function only when activated (such as, activated under user inputs or pre-set commands, or activated when environmental data exceed a pre-set threshold, etc.). Different sensors may work independently. For example, each sensor's detected and/or monitored data, time of sensing, and communication with other modules of the environment control system may be independent. The above examples only describe some possible functions of the sensing module, and are by no means limiting.

In addition to the data detected and/or monitored by sensing module 120, processing module 110 may also acquire or process data detected and/or monitored by external sensors or sensing devices. For example, there may be a wireless camera outdoor, which works as part of a security system independent of the environment control system. The environment control system may access images taken by this wireless camera, analyze the images, thus to judge whether any further action is needed. In another example, a user may use a blood glucose meter independent of or external to the environment control system. The environment control system may access the user's blood sugar information from this device, analyze it independently or together with other information in the environment control system (such as the user's health history data, diagnosis or treatment plan of a doctor, etc.), thus to determine whether any further action is needed.

Figure 9:
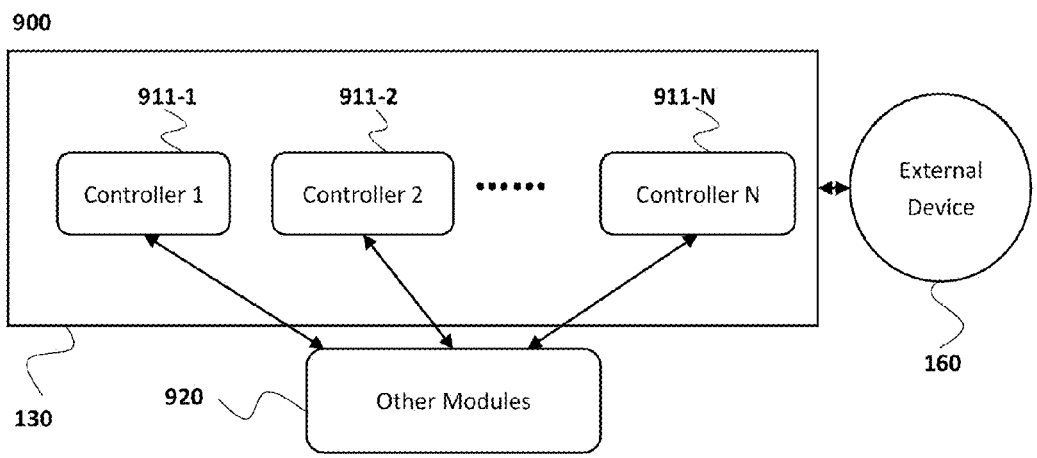
FIG. 9: Control module diagram.

FIG. 9 illustrates the structure of control module 130 of the environment control system and peripheral devices. Control module 130 may include one or more controllers 911-1, 911-2, and 911-N. Control module 130 is further connected with other modules 920 and external devices 160. Controllers 911-1, 911-2, and 911-N may also be external devices, or a part or an electronic component of external devices. FIG. 9 is only an example of control module 130 and peripheral devices, and control module 130 may have other different structures and connect with other different peripheral devices. The connection methods here may be wired or wireless. Control module 130 may have multiple controllers 911-1, 911-2, and 911-N integrated on a same electronic component, or may have multiple electronic components (each contains one or more controllers 911-1, 911-2, and 911-N).

Figure 10:
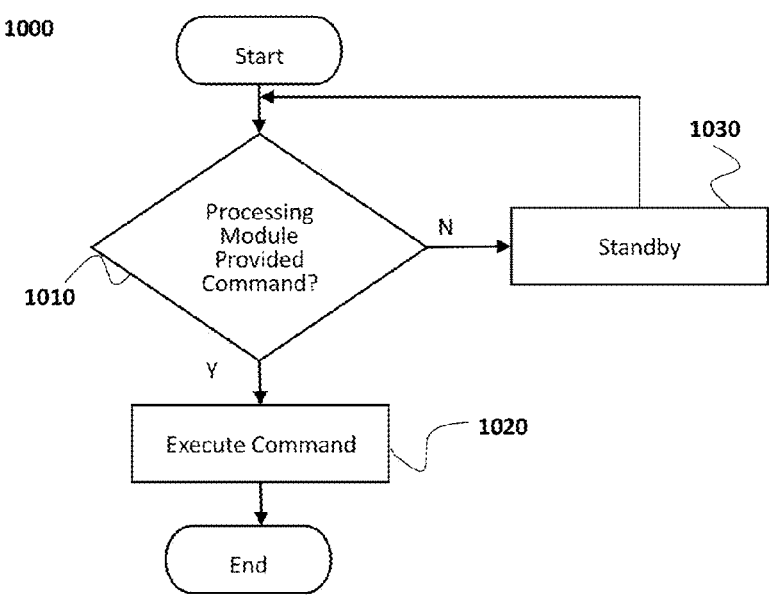
FIG. 10: Control module operation flow chart.

FIG. 10 is an operation flow chart of control module 130 and related controlling functions. Step 1010 may decide whether processing module 110 has made a command, and if a command has been made, Step 1020 may be executed; if a command has not been made, Step 1030 may be executed and route back to the start of this process. FIG. 10 is only an example of the process that may be conducted by control module 130, and functionality of control module 130 is not limited to the described.

When processing module 110 transmits to control module 130, the transmitted content may be action commands. When control module 130 transmits to processing module 110, the transmitted content may be reports for action completion, requests for performing actions, and reports of errors. In some situations (such as but not limited to breakdown of processing module 110 or failure in the connection with processing module 110), control module 130 may bypass processing module 110 and communicate and exchange data directly with sensing module 120, communication module 140, and external device 160. In another embodiment, processing module 110 may transmit signals to controllers 911-1, 911-2, and 911-N through communication module 140, so as to provide commands to controllers 911-1, 911-2, and 911-N.

Controllers 911-1, 911-2, and 911-N may be included in control module 130, or may be placed on external device 160. During the control process, one controller may execute actions, or multiple controllers may cooperate to execute actions. Controllable subjects may include, without limitation to, direct control of current, control of machines and computer devices, etc. Direct control of current includes, without limitation to, power on/off and current supply of the external devices. For example, controlling power on/off and current supply of the electric warming plates and compressors in air conditioners, controlling power on/off and current supply of lights, controlling power on/off and current supply of refrigerators, controlling power on/off and current supply of water boilers, controlling power on/off and current supply of electric stoves, controlling power on/off and current supply of microwave ovens, controlling power on/off and current supply of ovens, controlling the power on/off and current supply of coffee machines, controlling power on/off and current supply of washers, controlling power on/off and current supply of dish washers, controlling power on/off and current supply of dryers, controlling power on/off and current supply of multimedia devices, controlling power on/off and current supply of cameras, controlling power on/off and current supply of radio devices, controlling power on/off and current supply of storage devices, controlling power on/off and current supply of alarms, and controlling power on/off and current supply of auto ignitions, etc. The above examples are only for illustrative purposes, and controllable current may also include other aspects, such as current of network devices and anti-theft alarms. Control of machines includes, without limitation to, controlling machines' on/off conditions, magnitudes, velocities, accelerations, rotation angles, angular velocities and angular accelerations of displacements. For example, controlling on/off conditions of gas supply valves of gas stoves, controlling locks of doors and windows, controlling opening levels of vent outlets, controlling opening levels of smoke detectors, controlling opening levels, velocities and accelerations of curtains, controlling opening levels, velocities and accelerations of safety fences, controlling opening levels, fan velocities and accelerations of ventilators, controlling on/off conditions of fire sprinkler valves, controlling opening levels, velocities and accelerations of water valves of water boilers, controlling opening levels, velocities and accelerations of heat valves, controlling opening levels, velocities and accelerations of water storage and draining of bathtubs, controlling opening levels, velocities and accelerations of water storage and draining of toilets, and controlling stopped locations, rising and falling velocities and accelerations of elevators, etc. The above examples are only for illustrative purposes, and controllable machines may include other aspects, such as movement of electronic toys and family robots. Computer devices, which may include, without limitation to, personal computers, servers, and microelectronic devices, may be used for, for example, controlling personal desktop computers, controlling personal laptop computers, controlling PDAs, controlling tablets, controlling mobile terminals, controlling smart televisions, controlling smart refrigerators, controlling smart microwaves, controlling smart stoves, controlling robots, controlling public servers, controlling private or company servers, controlling smart lighting devices, controlling image taking devices, and controlling sound taking devices, etc. The above examples are only for illustrative purposes, controllable computer devices may include other aspects such as smart anti-theft systems and on-vehicle electronic systems.

Figure 11:
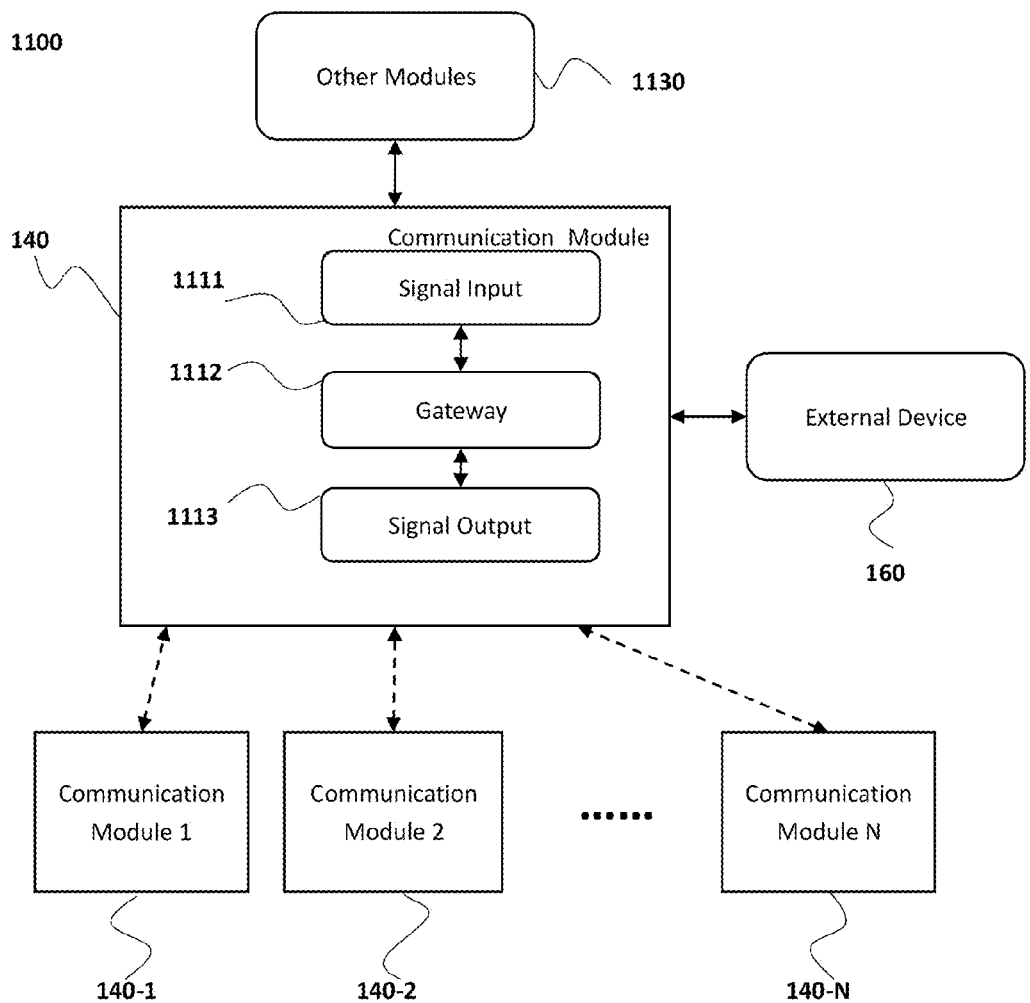
FIG. 11: Communication module diagram.

FIG. 11 shows the structure and peripheral devices of communication module 140 of the environment control system. Communication module 140 may include one or more signal input devices 1111, one or more gateways 1112, and one or more signal output devices 1113. Gateways 1112 may include, without limitation to, one or more gateways, one or more protocol translators, and one or more smart gateways. Specifically, smart gateways may include, without limitation to, one or more network modules, such as, Bluetooth modules, WLAN modules, ZigBee modules, GPRS modules, satellite GPS modules, near field communication modules, and other 2.4 GHz frequency modules, etc. More specifically, smart gateways may include, without limitation to, one or more network devices, such as, Bluetooth network devices, routers, ZigBee network devices, carrier operator network devices, satellite GPS devices, payment and pairing devices, and other devices using 2.4 GHz frequencies, etc. The communication types supported by network modules and network devices are not limited to the above-mentioned examples, and may also be other types mentioned above, which will not be repeated here. Communication module 140 may also connect with external device 160 and other modules 1130, and may also selectively connect with other communication modules 140-1, 140-2, and 140-N, etc. FIG. 11 is only an example of the internal and peripheral structures of communication module 140, and communication module 140 may have other different structures and connect with other different peripheral devices. The connection methods mentioned herein may be wired or wireless. Communication module 140 may have multiple communication protocols, network modules and/or network devices integrated on the same electronic component, and may also have multiple electronic components (each contains one or more communication protocols, network modules and/or network devices).

Figure 12:
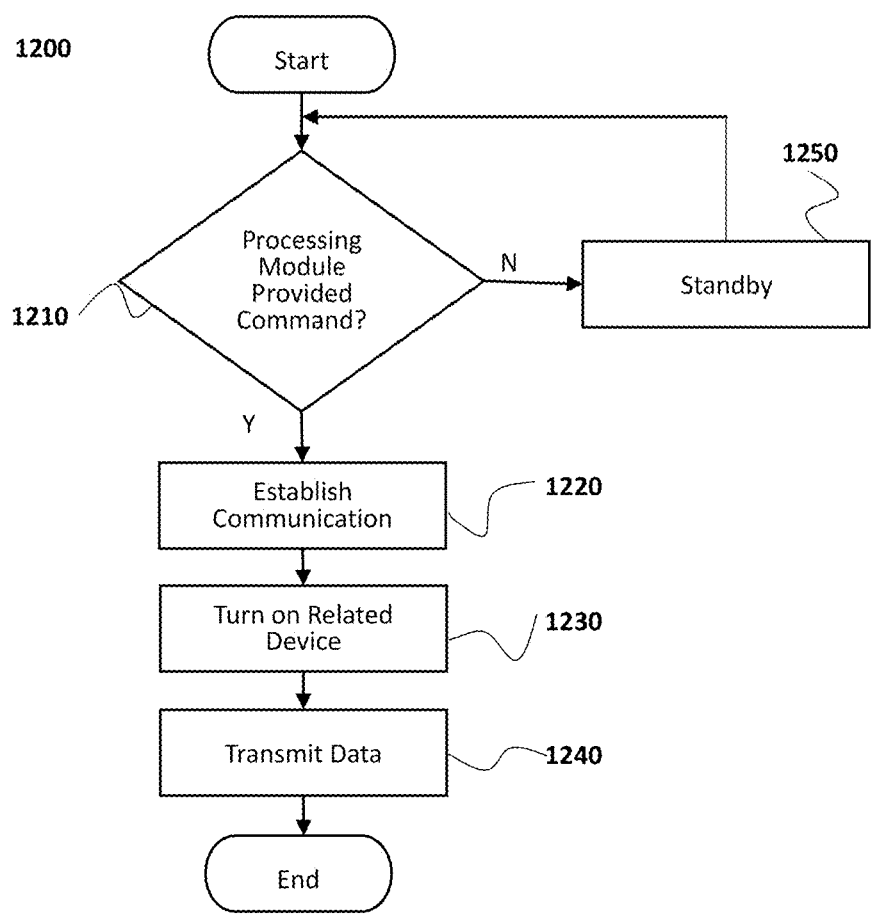
FIG. 12: Communication module operation flow chart.

FIG. 12 shows an operation flow chart of the communication module 140 and its communication functions in the environment control system. Step 1210 may judge whether processing module 110 has sent communication commands. If a command has not been sent, Step 1250 may be performed to stand by and return to the start of the process. If a command has been sent, Step 1220 may be performed to establish communication, followed by Step 1230 to turn on related devices and Step 1240 to transmit data. FIG. 12 is only an example of the process that may be executed by communication module 140, and the functions of communication module 140 are not limited to it.

When processing module 110 transmits content to communication module 140, the transmitted content may be commands to establish connection for communication, or other information that needs to be transmitted outwards, etc. When communication module 140 transmits content to processing module 110, the transmitted content may be acquired information, and requests to communicate outwards, etc. In some situations (such as but not limited to breakdown of processing module 110 or failure in the connection with processing module 110), communication module 140 may bypass processing module 110 and communicate and exchange data directly with one or more of sensing module 120, control module 130, other communication module 140, and external device 160.

The connection methods between communication module 140 and exterior environment or other communication module 140 of the environment control system may be wired or wireless. Wired connections may include, without limitation to, metal cables, optical cables, and hybrid cables, for example, coaxial cables, communications cables, flexible cables, helix cables, non-metallic sheathed cables, metallic sheathed cables, multicore cables, paired cables, ribbon cables, shielded cables, single cables, twinax cables, twin-lead cables, and twisted pair cables, etc. The above examples are only for illustrative purposes, the medium of wired connection may be in other types, such as other transmission media for electric or optical signals. Wireless connection may include, without limitation to, radio communication, free-space optical communication, sonic communication, and electromagnetic induction communication, etc. Moreover, radio communication may include, without limitation to, IEEE 802.11 series standards, IEEE 802.15 series standards (such as Bluetooth and ZigBee technology), first-generation mobile communication technology, second-generation mobile communication technology (such as, FDMA, TDMA, SDMA, CDMA, and SSMA), general packet radio service, third-generation mobile communication technology (such as, CDMA2000, WCDMA, TS-SDMA, and WiMax), fourth-generation mobile communication technology (such as, TD-LTE and FDD-LTE), satellite communication (such as, GPS technology), and other technology that operates on ISM frequencies (such as 2.4 GHz), etc. Free-space optical communication may include, without limitation to, visible lights, and infrared signals, etc. Sonic communication may include, without limitation to, sound waves and supersonic waves, etc. Electromagnetic induction may include, without limitation to, near field communication technology, etc. The above examples are only for illustrative purposes, and wireless connections may also be in other types, such as Z-wave technology, Bluetooth low energy (BLE) technology, 433 MHz communication protocol frequencies, other charged civil radio frequencies and military radio frequencies, etc.

Devices used to communicate may be modules within the environment control system, external personal devices, and external public devices, etc. Modules within the environment control system may include, without limitation to, processing module 110, sensing module 120, control module 130, and communication module 140, etc. Other devices related to communication module 140 may include, without limitation to, cameras, microphones, displays, and touch screens, etc. The above examples are only to provide a better understanding, and the internal modules of the environment control system may have other devices, such as, alarm systems and notification systems, etc. External personal devices may include, without limitation to, wireless equipment or wired equipment, such as, personal desktop computers, personal laptop computers, PDAs, tablets, mobile terminals, personal or company servers, private clouds, and on-vehicle communication systems, etc. The above examples are only to provide a better understanding, and external personal devices may have other devices, such as, kitchen electronic devices with communication functions, and bathroom electronic devices with communication functions, etc. External public devices may include but are not limited to wired or wireless devices, such as public security network devices, Internet devices, others' personal desktop computers, others' personal laptop computers, others' PDAs, tablets, others' mobile terminals, others' on-vehicle communication systems, and others' public servers and cloud servers 540, etc. The above examples are only to provide a better understanding, and the external public devices may have other devices such as communication module 140 within the environment control system owned by other users in a group. Tasks that may be performed by communication module 140 include but are not limited to communication between multiple communication modules 140 in the environment control system, communication between the environment control system and mobile devices, communication between the environment control system and smart devices on vehicles, and communication between the environment control system and the Internet, etc. Specifically, communication module 140 may execute video telephone within the environment control system, exchange messages with cellphones, power and control vehicles, and acquire information from the Internet, etc. More specifically, examples of the functions of communication module 140 further include video and/or phone calls within a family environment (such as between upstairs and down stairs, and between different rooms), downloading from the Internet local life information such as store discounts and sending notifications to users via the system's internal modules or mobile devices, and enabling users to further download and use such local life information through for example, near field communication technology.

The examples below are some functions that may be achieved by the environment control system. Such examples are for illustrative purposes, and the functions of the environment control system are not limited to these examples.

FIG. 13-A, FIG. 13-B, FIG. 13-C, and FIG. 13-D are some examples of the modules mentioned above. It should be noted that the modules in the environment control system may have other different forms, and are not limited to the examples described below.

FIG. 13-A, FIG. 13-B, FIG. 13-C, and FIG. 13-D each has processing module 110, sensing module 120, control module 130, communication module 140, external device 160 and power module 1350. FIG. 13-A and FIG. 13-C represent the module structures of two types of smart switches. FIG. 13-B and FIG. 13-D represent the module structures of two types of simplified smart switches (hereinafter referred to as simplified switch).

In FIG. 13-A, processing module 110 may include, without limitation to, storage device 1313, processor A 1311, and processor B 1312, etc. Processor A 1311 is further connected with sensing module 120, and sensing module 120 include, without limitations to, one or more sensors of sound sensor 1321, temperature and humidity sensor 1322, ambient and proximity sensor 1323, current sensor 1324, user interface 1325, motion sensor 1326, image sensor 1327 (such as, and without limitation to, cameras, etc.), fingerprint sensor 1328, and gas composition sensor 1329, etc. The examples in sensing module are only for illustrative purposes, and sensing module 120 may also include other sensors mentioned above in the descriptions of sensing module 120. Processor A 1311 is also connected with speaker 1363, buzzer 1364, NFC tag 1365, and other external devices, etc. Processor A 1311 also is connected with communication module 140, and communication module may include, without limitation to, one or more of WLAN module, Bluetooth module, GPRS module, NFC module, ZigBee module, and other 2.4 GHz module, etc. One or more of the examples mentioned for communication module are only for illustrative purposes, and communication module 140 may also include other communication methods mentioned above in the descriptions of communication module 140. Communication module 140 is further connected with network devices 1340, and network devices 1340 may include, without limitation to, one or more selected from routers, Bluetooth network devices, carrier operator network devices, payment/pairing devices, ZigBee network devices, etc. Examples of network device 1340 are only for illustrative purposes, and it may also be in other types, such as satellite positioning devices, etc. As part of network device 1340, routers may be connected with wireless device 1341, and carrier operator network devices may be connected with SIM card 1342. SIM card may also be connected with processor A 1311. Processor A 1311 may connect with processor B 1312, and processor B 1312 may be further connected with input device 1320 and control module 130, etc. Control module 130 includes, without limitation to, one or more switch/dimmer 1331. The switch/dimmer 1331 may connect with power 1361 in external device 160 through power module 1350, and in the meantime may connect with and control external device—light 1362. On the other hand, switch/dimmer 1331 may also connect with current sensor 1324.

In FIG. 13-B, processing module 110 may include, without limitations to, storage device 1313, and processor 1310, etc. Processor 1310 may be further connected with sensing module 120, and sensing module 120 include but are not limited to one or more of sound sensor 1321, temperature and humidity sensor 1322, ambient and proximity sensor 1323, current sensor 1324, motion sensor 1326, image sensor 1327 (such as, and without limitation to, cameras), fingerprint sensor 1328, and gas composition sensor 1329, etc. The examples in sensing module are only for illustrative purposes, and sensing module 120 may also include other sensors mentioned above in the descriptions of sensing module 120. Processor 1310 also may connect with speaker 1363, buzzer 1364, NFC tag 1365, and other external devices, etc. Processor 1310 may also connect with communication module 140, and communication module may include but are not limited to one or more of WLAN module, Bluetooth module, GPRS module, NFC module, ZigBee module, and other 2.4 GHz module, etc. One or more of the examples mentioned for communication module are only for illustrative purposes, and communication module 140 may also include any other connection methods mentioned above in the descriptions of communication module 140. Communication module 140 is further connected with network devices 1340, and network devices 1340 may include, without limitation to, one or more selected from: routers, Bluetooth network devices, carrier operator network devices, payment/pairing devices, and ZigBee network devices, etc. Examples of network device 1340 are only for illustrative purposes, and it may also be in other types, such as satellite positioning devices. As part of network device 1340, routers may be connected with wireless device 1341, and carrier operator network devices may be connected with SIM card 1342. SIM card may also be connected with processor 1310. Processor 1310 may be further connected with control module 130. Control module 130 includes, without limitation to, one or more switch/dimmer 1331. The switch/dimmer 1331 may connect with power 1361 in external device 160 through power module 1350, and in the meantime may connect with and control external device—light 1362. On the other hand, switch/dimmer 1331 may also connect with current sensor 1324.

Processing module 110 as shown in FIG. 13-C may include, without limitations of, storage device 1313, processor A 1311, and processor B 1312. Processor A 1311 may be further connected with sensing module 120, and sensing module 120 may include, without limitations to, one or more selected from sound sensor 1321, temperature and humidity sensor 1322, ambient and proximity sensor 1323, current sensor 1324, user interface 1325, motion sensor 1326, image sensor 1327 (such as but not limited to cameras), fingerprint sensor 1328, and gas composition sensor 1329, etc. The examples of sensing module are only for illustrative purposes, and sensing module 120 may also include other sensors mentioned above in the descriptions of sensing module 120. Processor A 1311 may also connect with speaker 1363, buzzer 1364, NFC tag 1365, and other external devices, etc. Processor A 1311 may also connect with communication module 140, and communication module 140 may include but are not limited to network module 1360 and network device 1370 in communication module, etc. Network module in communication module 1360 may include but are not limited to one or more selected from: WLAN module, Bluetooth module, GPRS module, NFC module, ZigBee module, and other 2.4 GHz module, etc. One or more of the examples mentioned for network module are only for illustrative purposes, and network module in communication module 1360 may also include other communication methods mentioned above in the descriptions of communication module 140. Network devices 1370 in communication module may include but are not limited to one or more of routers, Bluetooth network devices, carrier operator network devices, payment/pairing devices, ZigBee network devices, etc. Examples of network device 1370 in communication module are only for illustrative purposes, and it may also come in other forms, such as satellite positioning devices. As part of network device 1370, routers may be connected with wireless device 1341, and carrier operator network devices may be connected with SIM card 1342. SIM card may also be connected with processor A 1311. Processor A 1311 may connect with processor B 1312, and processor B 1312 may be further connected with input device 1320 and control module 130, etc. Control module 130 may include, without limitation, one or more switch/dimmer 1331. The switch/dimmer 1331 may connect with power 1361 in external device 160 through power module 1350, and in the meantime may connect with and control external device—light 1362. On the other hand, switch/dimmer 1331 also connects with current sensor 1324.

In FIG. 13-D, processing module 110 may include, without limitation to, storage device 1313, and processor 1310, etc. Processor 1310 may be further connected with sensing module 120, and sensing module 120 may include, without limitations to, one or more of input device 1320, sound sensor 1321, temperature and humidity sensor 1322, ambient and proximity sensor 1323, current sensor 1324, motion sensor 1326, image sensor 1327 (such as but not limited to cameras), fingerprint sensor 1328, and gas composition sensor 1329, etc. The examples in sensing module are only for illustrative purposes, and sensing module 120 may include other sensors mentioned above in the descriptions of sensing module 120. Processor 1310 may also connect with speaker 1363, buzzer 1364, NFC tag 1365, and other external devices, etc. Processor 1310 may also connect with communication module 140, and communication module 140 may include, without limitation to, network module 1360 in communication module, and network device 1370 in communication module. Network module 1360 in communication module may include, without limitation to, one or more selected form WLAN module, Bluetooth module, GPRS module, NFC module, ZigBee module, and other 2.4 GHz modules, etc. Those examples mentioned for network module are only for illustrative purposes and the network module 1360 in communication module may also include other communication methods mentioned above as described by communication module 140. Network device 1370 in communication module may include, without limitation to, one or more selected from routers, Bluetooth network devices, carrier operator network devices, payment/pairing devices, and ZigBee network devices, etc. Examples of network device 1370 in communication module are only for illustrative purposes, and it may also come in other forms such as satellite positioning devices. As part of network device 1370, routers may be connected with wireless device 1341, and carrier operator network devices may be connected with SIM card 1342. SIM card may also be connected with processor 1310. Processor 1310 may be further connected with input device 1320 and control module 130, etc. Control module 130 may include, without limitation to, one or more switch/dimmer 1331. The switch/dimmer 1331 may connect with power 1361 in external device 160 through power module 1350, and in the meantime may connect with and control external device—light 1362. On the other hand, switch/dimmer 1331 may also connect with current sensor 1324.

Based on, by way of example and without any limitation, the forms of modules in the above descriptions, the environment control system may achieve a series of smart, automatic, manual, or semi-automatic operations. For example, such operations may be, adjusting home lighting devices through automatic sensing of movements of persons, detecting and alarming functions of smart home security system, automatic temperature and humidity adjustment, internal video calls, calendar, weather, and security notifications, utility fee payments, shopping, and personal money transfers, preset or automatic control of home appliances, and GPS location confirmation of family members and pets. The above examples only constitute a small portion of the functions environment control system may have, and the examples are only for illustrative purposes. The environment control system may also have other functions, such as communication with mobile devices by forming a network, and controlling of automobiles.

Figure 14:
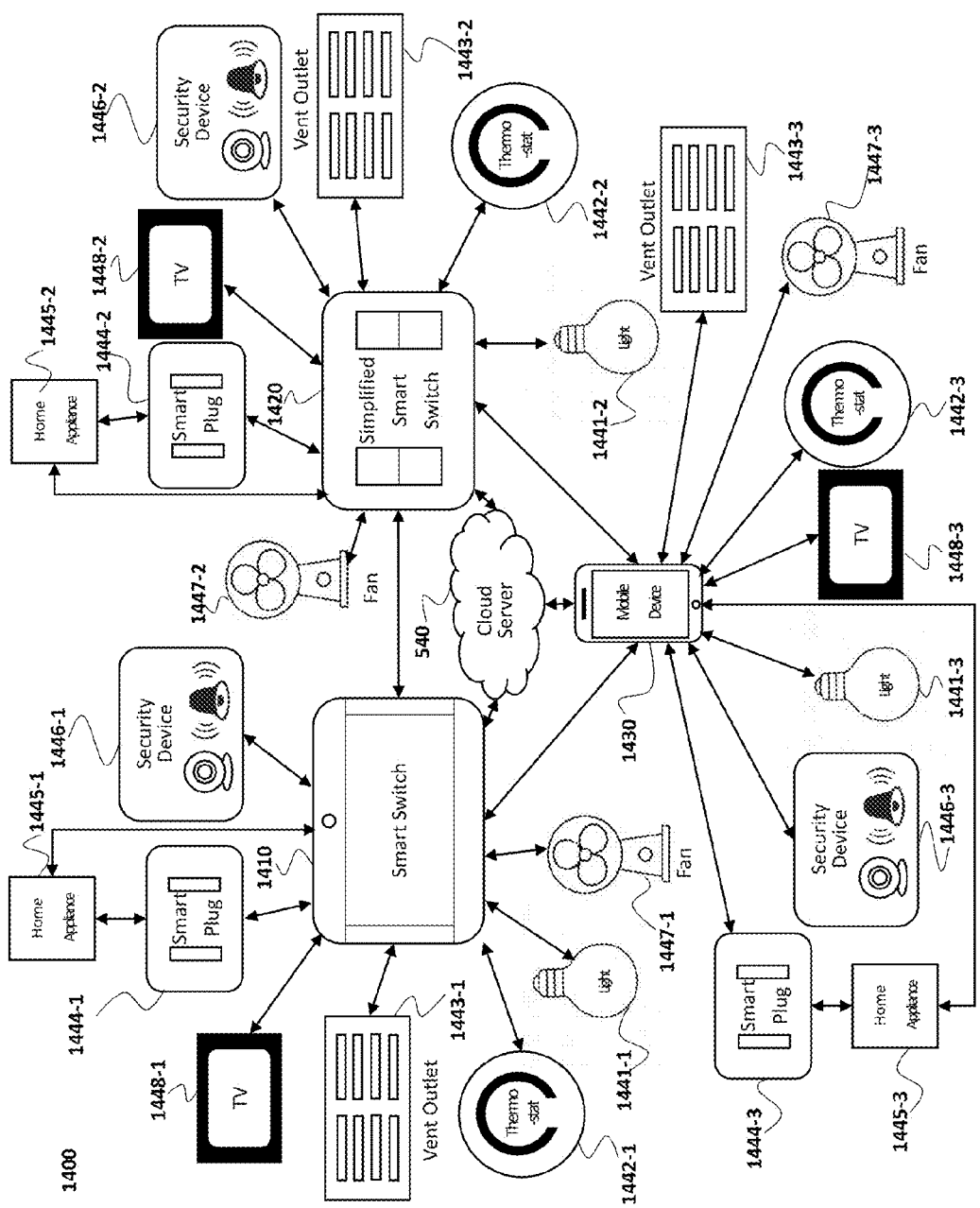
FIG. 14: Diagram of structure of environment control system.

FIG. 14 shows an exemplary embodiment of connection methods between each component of the environment control system. One or more smart switches 1410, one or more simplified smart switches 1420, and one or more mobile devices 1430 may be connected through network and/or master-slave mode. They may also connect to a cloud server 540 separately. In one embodiment, smart switch 1410 may have a first panel (front panel) and a second panel (back panel), and a third panel representing simplified smart switch 1420. The above examples of smart switch 1410 and simplified smart switch 1420 are only intended to provide a better understanding, and there may be other forms. For example, the first panel of smart switch 1410 may also be installed on simplified switch 1420. One example of the aforementioned connection method is provided below: one or more smart switches 1410, one or more simplified smart switches 1420, and one or more mobile devices 1430 may join the same wireless local area network (WLAN) and obtain corresponding network addresses to accomplish pairing. One or more smart switches 1410, one or more simplified smart switches 1420, and one or more mobile devices 1430 may use IEEE 802.15.1 Bluetooth technology standards, and have one of the devices acting as a master device while others as slave devices to accomplish pairing. One or more smart switches 1410, one or more simplified smart switches 1420 and one or more mobile devices 1430 may use IEEE 802.15.4 ZigBee technology standards, and make one device a coordinator, with other devices sending connection requests for the coordinator to respond, and accomplish pairing. One or more smart switches 1410, one or more simplified smart switches 1420, and one or more mobile devices 1430 may use infrared communication technology to establishing a piconet and accomplish pairing. One or more smart switches 1410, one or more simplified smart switches 1420, and one or more mobile devices 1430 may use inductive coupling technology in near field communications, and have one device sending electronic signals for another device to receive to accomplish pairing between the two devices, between one panel and another panel. The above examples are only for illustrative purposes, and pairing methods may also be other types. For example, one or more smart switches 1410, one or more simplified smart switches 1420, and one or more mobile devices 1430 may respectively perform face recognition and pairing. Furthermore, when using Bluetooth technology, the pairing process may be done in master-slave modes as mentioned above, or by point-to-point modes. For example, one or more smart switches 1410, one or more simplified smart switches 1420, and one or more mobile devices 1430 may establish a Bluetooth local area network. A Bluetooth local area network may have but is not limited to a point-to-point topological structure. Such Bluetooth local area network may also have a bus topological structure, a star topological structure, a mesh topological structure, a tree topological structure, a mixed topological structure, a daisy chain topological structure, a linear topological structure, and a master-slave topological structure, etc. Additionally, mobile device 1430 may also connect with the environment control system through a router, using carrier operator networks, or using WLAN.

One or more smart switches 1410, one or more simplified switches 1420 and one or more mobile devices 1430 may be connected with the Internet and cloud server 540 through wireless LAN network module. One or more smart switches 1410 may be connected with devices including but not limited to light 1441-1, thermometer 1442-1, vent outlet 1443-1, smart plug 1444-1, home appliance 1445-1, security device 1446-1, fan 1447-1, and television 1448-1, etc. One or more simplified smart switches 1420 may be connected with devices including but not limited to light 1441-2, thermometer 1442-2, vent outlet 1443-2, smart plug 1444-2, home appliance 1445-2, security device 1446-2, fan 1447-2, and television 1448-2, etc. One or more mobile devices 1430 may be connected with devices including but not limited to light 1441-3, thermometer 1442-3, vent outlet 1443-3, smart plug 1444-3, home appliance 1445-3, security device 1446-3, fan 1447-3, or television 1448-3, etc. Fan 1447 may also be a mechanical fan, a desk fan, an exhaust fan, a box fan, or an air conditioning fan (i.e., a cooling fan), etc. Fan 1447 may be any type of the examples mentioned above or any combination thereof. The connection methods mentioned here are, by way of example and without limitation, Bluetooth technology, WLAN technology, ZigBee technology, infrared technology, and near field communication technology, etc. The examples of connection methods mentioned here are only for illustrative purposes, and connection methods may be in other forms, such as, cellular networks, GPS satellite signals, other 2.4 GHz wireless communication technologies, and any other connection methods mentioned above. Home appliances (1445-1, 1445-2, and 1445-3) may be directly connected with one or more smart switches 1410, one or more simplified smart switches 1420, and one or more mobile devices 1430, and may also be connected to one or more smart switches 1410, one or more simplified smart switches 1420, or one or more mobile devices 1430 through smart plugs (1444-1, 1444-2, and 1444-3). Connection methods between home appliances (1445-1, 1445-2, and 1445-3) and smart plugs (1444-1, 1444-2, and 1444-3) may include, without limitation to, standard plugs, etc.

The examples for wired or wireless connection methods in FIG. 14 are only for illustrative purposes, and wired or wireless connection may come in other forms. These connection methods have been described above in detail, and will not be repeated here. The examples of devices in the environment control system are also only for illustrative purposes. In addition to devices mentioned above such as lights, thermometers, and vent outlets, there may be other types of devices such as smart switch tags, which may be used to control multi-control switches. Newly purchased or upgraded home appliances may be configured through any of smart switch 1410, simplified smart switch 1420, and mobile device 1430, in order to join the network of the environment control system.

Figure 15:
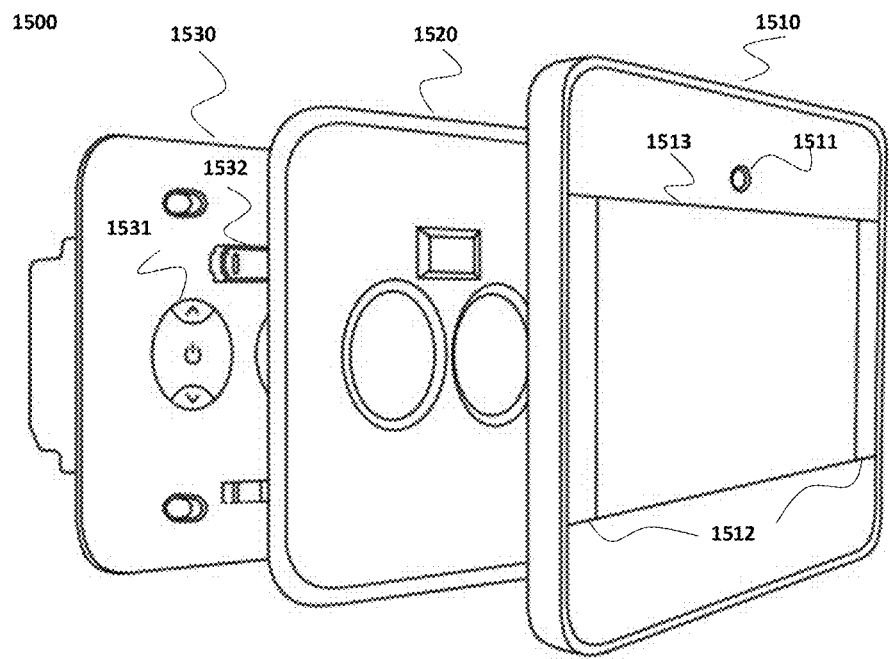
FIG. 15: Diagram of smart switch structure.

FIG. 15 is a structural diagram of a smart switch of the environment control system. An environment control system may include one or more smart switches, and FIG. 15 is a diagram of a smart switch's structure. The smart switch used herein may include a first panel 1510 and a second panel 1530. The first panel 1510 may be connected to the second panel 1530 in a detachable manner. Methods used to achieve the detachable connection include but are not limited to one or more of magnetic connection, pin connection, elastic deformation connection, buckle connection or plug-in connection, etc., and may be any method that may connected two independent panels in a detachable way, such as expansion bolt or data port. In practical applications, the second panel 1530 may be placed on a wall or any other appropriate position, and the first panel 1510 could be installed or buckled on the second panel 1530. In this situation, because the first panel 1510 faces the user directly, it may be referred to as the front panel, and because the second panel 1530 is covered, it may be referred to as the back panel. However, different terms may be used in different installation situations. The first panel may be removed or detached, then a user may see the second panel 1530 or manipulate the second panel 1530. The first panel 1510 may be removed or detached repeatedly from the second panel and may be installed or buckled onto the second panel. Additionally, a physical cover may exist between the first panel 1510 and the second panel 1530. When the first panel 1510 is detached, the physical cover 1520 may provide shielding to at least part of the second panel 1530 (such as the power line, circuit board or other structures of the second panel), avoiding that part being exposed to the user directly.

The exterior of first panel 1510 may include, without limitation to, a camera device 1511, and an input/output module. The camera device 1511 may collect video and/or audio; images of the video could be static or dynamic. The point of view, focus length, resolution, shooting mode and shooting time period of the camera device 1511 may be set or modified by a user or the system. The camera device 1511 may include an anti-peeping design, i.e., placing a physical cover on the first panel 1510, such that a user may choose to turn on or off the camera freely, and avoid remote operation by others (such as malicious remote operation etc.) of the camera to acquire information.

The input/output module may include, and without limitation to, button 1512 and touch screen 1513. The button 1512 may be used as a shortcut button, such as function shortcut button, return shortcut button or menu shortcut button, etc. The touch screen 1513 may have both input and output functions, and is the operation interface for a user to use the control system environment. Types of inputted and outputted information may include but is not limited to number, analog quantity, character symbol, voice, graphic image, etc. The type of the touch screen 1513 may be chosen according to a user's specific need, and may include but is not limited to resistive touch screen, capacitive touch screen, infrared touch screen, surface acoustic wave touch screen, etc. It should be noted that it is possible but is not required to install the input/output module on the first panel 1510. Other technology may be used to realize the input/output function. For example, the touch screen 1513 on the first panel 1510 may be replaced by one or more devices with input and/or output function. When a single device is used, it may include but is not limited to a cellular phone, a PDA, a tablet computer, a touch screen television, a wearable smart device (such as glasses, gloves, bracelet, watch, clothes, shoes, etc.), etc. When more than one devices are used, they may include but are not limited to a computer (desktop computer, laptop computer, etc.) with a keyboard (or mouse), a television (flat-panel television, cathode ray tube television, rear-projection television, three-dimension television, etc.) with a remote controller (or cellphone), etc. These devices may be used alone or in combination to achieve the input and output of data. For example, if a television and a remote controller are used instead of the touch screen 1513, the data interface may be displayed on the television and the remote controller may be used to input and output the data.

Moreover, the first panel 1510 may further include other modules or parts, including but not limited to connection port, sensing module, control module, and communication module (see FIG. 17), etc. The connection port may be used for data exchange with other devices, which includes but are not limited to the second panel 1530, USB, power supply, sound box, earphones, etc. The number and position of the ports are not limited, and may be determined according to specific needs. For example, the port connecting the first panel 1510 and the second panel 1530 may be located at any place between them, while the port connecting the first panel and the smart switch external devices may be placed around the first panel 1510. The port may be wired or wireless. The types of wired port include but are not limited to UART (Universal Asynchronous Receiver/Transmitter), I2C (Inter-Integrated Circuit), SPI (Serial Peripheral interface), etc. The type of the port may be customized, and may include, and without limitation to, customizing the numbers and functions of the port pin. Functions of the port pin may include, and without limitation to, power supply, hardware connection handshaking or communication, etc. The types of wireless port may include but are not limited to Bluetooth or Wi-Fi. When connecting the port wirelessly, the first panel 1510 may be connected with other devices spatially in a detachable way, such as, but not limited to, through magnetic connection. For example, if a set of Bluetooth speakers need to be connected to a smart switch, the Bluetooth speakers having a small dimension may approach the smart switch by magnetic force to transmit data via Bluetooth. It should be noted that the disclosure of ports is not limited to the situations mentioned above. A person of ordinary skill in the art may modify a port according to its specific features. For example, placing the port for connecting external devices on the second panel 1530 may achieve the same or similar functions.

The side of the second panel 1530 that is closer to the first panel 1510 (when installed or used according to design) may include one or more physical controllers 1531. A physical controller 1531 may be a physical switch that has the on and off mode. A physical controller 1531 may also control the on and off of devices, such as light, air-conditioner, heat, and similar devices, etc. A physical controller 1531 may control current load of a device between on status and off status, e.g., a physical controller 1531 may be a physical dimmer, which may be used by the user to modify luminance of a light manually. A physical controller 1531 may also be a physical temperature controller, which may be used by the user to modify temperature of air-conditioner and/or heat manually. The number of physical controllers 1531 is based on the specific need of a user, such as one, two, three or more. Physical controllers 1531 may be in compliance with the UL 514A, UL 514B, UL 514C, UL 514D series standards (see FIG. 4-B) of the Underwriter Laboratories Inc. (UL) and other standards based on the user's practical application situation. If the second panel 1530 has more than one physical controllers, in some situations, at least two of these physical controllers may achieve similar functions. For example, at least two of these physical controllers may be connected to a lighting power circuit as physical dimmers to control the same light or different lights. At least two of these physical controllers may be connected to the air-conditioner system as physical temperature controller to control the temperature of the same room/region or of different rooms/regions. In some situations, at least two of these physical controllers 1531 may control different devices. For example, of these two physical controllers 1531, one may be a physical dimmer while the other one may be a physical temperature controller. The second panel 1530 may further include a port 1532 that is connected to the port of the first panel 1510.

Figure 16:
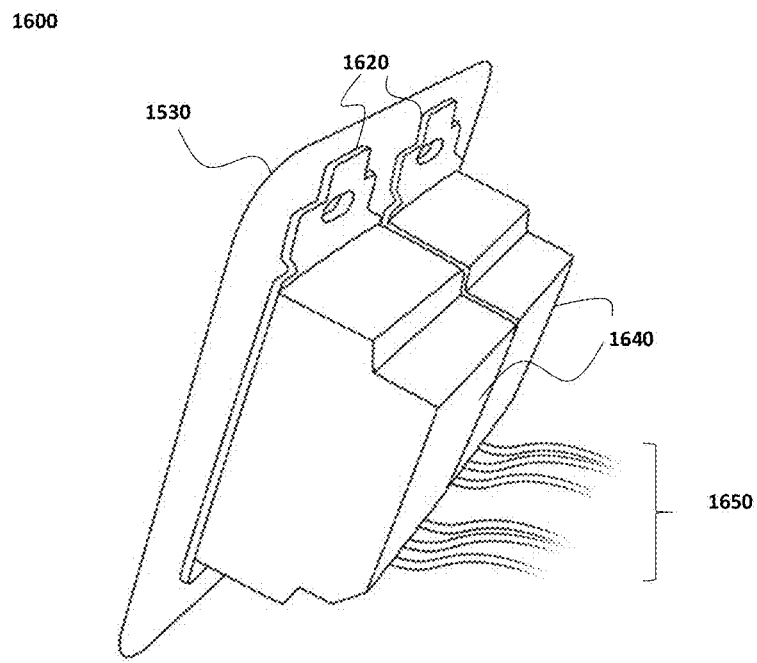
FIG. 16: Diagram of smart switch structure.

An exemplary structure of the side of the second panel 1530, which is far away from the first panel 1510 (when installed or used according to design) is shown in FIG. 16. The structure may include the second panel 1530, fixation device 1620, power dimmer module 1640, and power line 1650. The second panel 1530 may connect to the panel fixation device 1620. The power line 1650 may extend from the bottom of the power dimmer module 1640 or from other parts of the power dimmer module 1640. The external junction box matches the number of the physical controllers 1531, and may be in compliance with the UL 514A, UL 514B, UL 514C, UL 514D series standards (see FIG. 4-B) of the Underwriter Laboratories Inc. (UL) and other standards based on the user's practical application situation. The second panel 1530 of the environment control system may be connected to an existing power circuit to control the existing power circuit without setting up new power circuit for the environment control system. For example, the second panel 1530 may be connected to an existing lighting control circuit to achieve the control of the lighting control system. The second panel 1530 may also be connected to an existing temperature (air-conditioner or heat) control circuit to achieve the control of the temperature (air-conditioner or heat) control system. The environment control system may also control other devices (such as home appliances, automobile, etc.).

It should be noted that the smart switch structures described in FIG. 15 and FIG. 16 are not limited to the modules or parts shown in those figures. To achieve the same or a similar function, a person of ordinary skill in the art may simplify or extend these modules or parts, or add other affiliated modules. For example, the touch screen 1513 on the first panel 1510 may be used as the input/output interface, or may be replaced by application software installed on the user terminal (such as cellphone, computer, tablet PC, PDA or television, etc.), or communication of the environment control system. For another example, an affiliated module may be installed on the first panel 1510 or the second panel 1530. The affiliated module may include, without limitation to, a LED breath light. Functions of the LED breath light may include for example hinting positions and/or status of buttons of the smart switch or physical controller, thus helping the user find operation keys more quickly, reflecting power status of the smart switch, reminding unread message, etc. The breath light may help the user interact with the environment control system in dim light (such as cloudy days or nights). Many similar variations are still within the scope sought by the present application, for example, the first panel 1510 or the second panel 1530 may be equipped with at least one background light.

Figure 17:
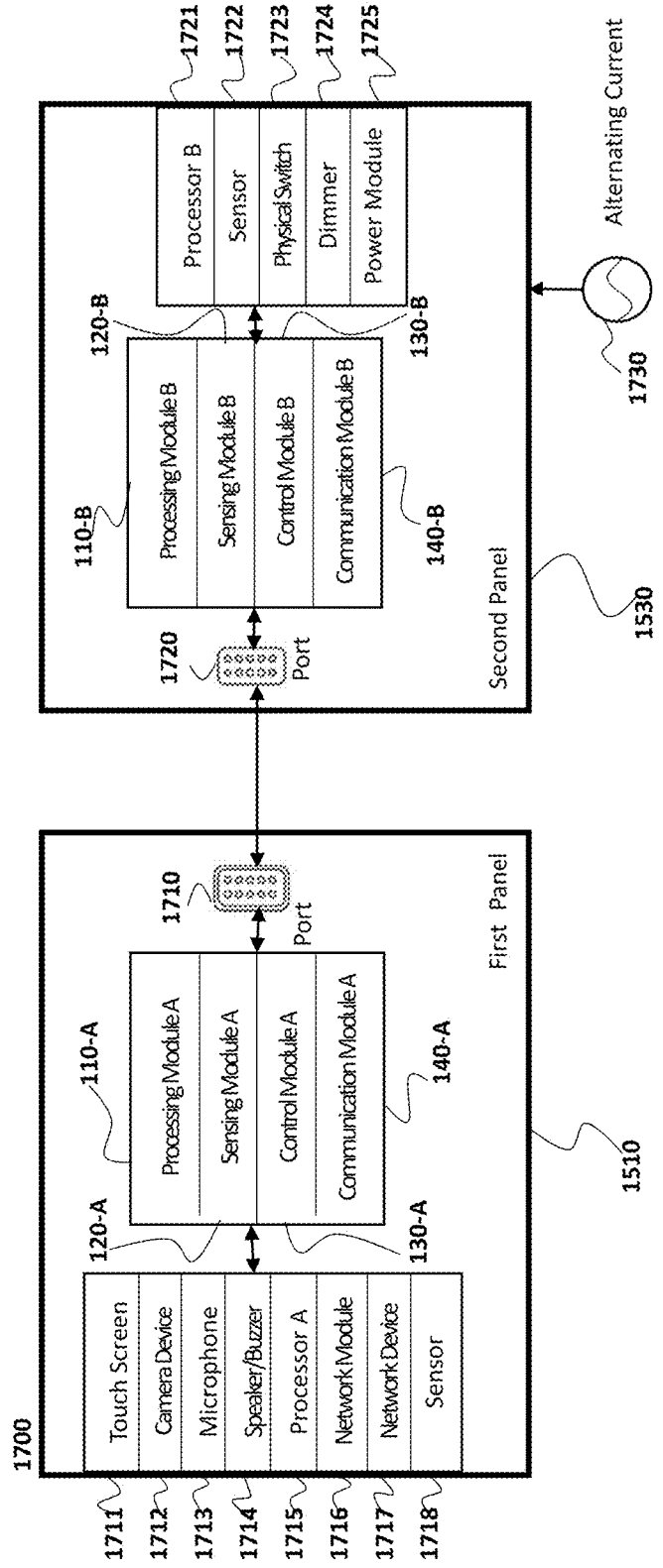
FIG. 17: Diagram of smart switch connection structure.

FIG. 17 shows an exemplary embodiment of the structure of the smart switch in the environment control system. The first panel 1510 is the front panel and the second panel 1530 is the back panel, while the external power source of the back panel is an alternating current power 1730 that supplies direct current power for the first panel 1510.

The first panel 1510 is a series of parts or modules of the system, including but not limited to the processing module 110-A, sensing module 120-A, control module 130-A, communication module 140-A, etc. These modules may be touch screen 1711, camera 1712, microphone 1713, speaker/buzzer 1714, processor A, network module 1716, network device 1717, sensor 1718, etc., and may include other devices. Data transmission between the front panel 1510 and back panel 1530 may be through porting, where the port 1710 of the front panel 1510 and the port 1720 of the back panel 1530 may form a connector. The types of port interface may include but not limited to UART (Universal Asynchronous Receiver/Transmitter) (including interface standard specifications and bus standard specifications, such as RS232, RS449, RS423, RS422, and RS485, etc.), I2C (Inter-Integrated Circuit), SPI (Serial Peripheral interface), etc. Meanwhile, the types of port interface may be customized, and may include but are not limited to customizing the number and function of the interface pin, where the function may include, and without limitation to, power supply, hardware connection handshaking or communication, etc. The connector or connection method between the first panel 1510 and the second panel 1530 may also be mechanic support to the first panel 1510, when it is mounted on or buckled on the second panel 1530.

Structure of the back panel 1530 may include, and without limitation to, the processing module 110-B, sensing module 120-B, control module 130-B, communication module 140-B, etc. These modules may be touch screen 1721, sensor 1722, physical switch 1723, dimmer 1724 and power module 1725, and may additionally include other devices. The processing module 110-A and processing module 110-B as shown in FIG. 17 may be similar or different in their mechanisms, functions and/or structures; the sensing module 120-A and sensing module 120-B may be similar or different in their mechanisms, functions and/or structures; the control module 130-A and control module 130-B may be similar or different in their mechanisms, functions and/or structures; the communication module 140-A and communication module 140-B may be similar or different in their mechanisms, functions and/or structures.

It should be noted that the internal structure of the smart switch as shown in FIG. 17 is only for illustrative purposes, and the relative positions, connection styles and functional relations of each module are not limited to those shown in the diagram. The processing module 110, sensing module 120, control module 130, and communication module 140 may be connected in a certain order or interconnected mutually in a wired or wireless manner. Processing module 110, sensing module 120, control module 130, and communication module 140 may be each equipped with its own independent power supply, or one power supply may be shared among two, or more modules. The processing module 110, sensing module 120, control module 130, and communication module 140 may be individually connected to external devices, and a single external device may be connected to one or more modules in a wired or wireless fashion. Many similar variations are still within the scope of the present application.

Figure 18:
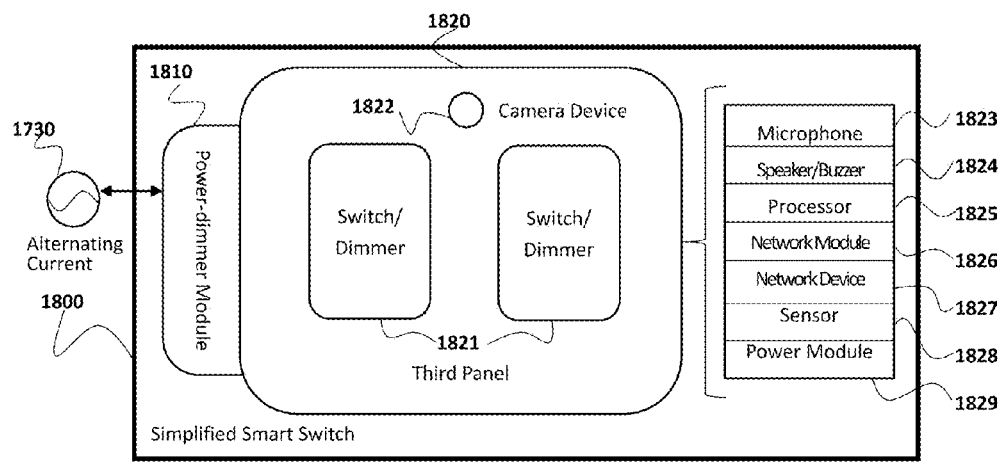
FIG. 18: Diagram of simplified switch structure.

FIG. 18 shows an exemplary embodiment of a simplified smart switch in the environment control system. The simplified smart switch 1800 may include a power-dimmer module 1810, a third panel 1820, etc., where the power-dimmer module 1810 may be connected to an alternating current power 1730. The third panel 1820 may include, and without limitation to, switch/dimmer 1821, camera device 1822 and other components, etc. The switch/dimmer 1821 may be a physical dimmer for the user to control luminance manually. The switch/dimmer 1821 may also be a physical temperature controller for the user control the air-conditioner or heat manually. The number of the switch/dimmer 1821 may be one, two, three or more, and in compliance to the UL 514A, UL 514B, UL 514C, UL 514D series of standards (see FIG. 4-B) by the Underwriter Laboratories Inc. (UL) and other standards based on the user's practical application situation. If the simplified smart switch 1800 includes multiple physical controllers, in some cases, at least two of them may have the similar function. For example, at least two physical controllers may be connected to the lighting power circuit and both are physical dimmers. Alternatively, at least two of physical controllers are connected to the control circuit of the air-conditioner system and both are physical temperature controllers. In some cases, at least two physical controllers may control different devices. For example, between the two physical controllers, one is a dimmer and the other is a physical temperature controller.

Other components or modules in the simplified smart switch may include, and without limitation to, microphone 1823, speaker/buzzer 1824, processor 1825, network module 1826, network device 1827, sensor 1828 and power module 1829, etc. It should be noted that the structures described above are only one exemplary embodiment provided for a better understanding of the simplified smart switch, and do not include all the possible types of the simplified smart switch. Scope of disclosure of the simplified smart switch in this application still includes any simplification of the smart switch according to practical needs, and a person of ordinary skill in the art may make other modifications according to the described mechanisms of the smart switch and simplified smart switch. Such modifications may include, and without limitation, to adding new components (such as adding input device or output device, etc.), omitting some components (such as omitting camera device or microphone, etc.), etc., and they are still within the scope sought by the present application. For example, the third panel 1820 may further comprise a structure similar to the port 1532 on the second panel 1530. Via this port, a simplified smart switch 1800 may be connected to the first panel 1510. This connection may realize data or information communication between the first panel 1510 and the simplified smart switch 1800, and can also provide mechanical support for the connection between the first panel 1510 and the simplified smart switch 1800. The connection between the first panel 1510 and the smart switch 1800 may be detachable, which is similar to the detachable connection between the first panel 1500 and the second panel 1530.

According to the present disclosure, the smart switch 1410 and/or simplified smart switch 1420 may be or include a smart controller. Compared with physical switches or physical controllers, the smart switch, simplified switch, or smart controller may control a device controllable by physical switches or physical controllers. For example, the smart switch, simplified the switch, or smart controller may exert control over the device via a physical switch or physical controller. For another example, the smart switch, simplified the switch, or smart controller may control the device via other methods. The smart switch, simplified switch, or smart controller may control other devices, and/or have functions other than controlling the device (such as smart monitoring, smart security and other functions as described herein). For example, a smart switch 1410 may be equipped with a sensing module capable of collecting one or more parameters. For another example, a smart switch 1410 may be equipped with a touch screen that is able to receive user input and/or display information to the user. A smart switch 1410 may also have other structures and/or functions as described in this specification.

Figure 19:
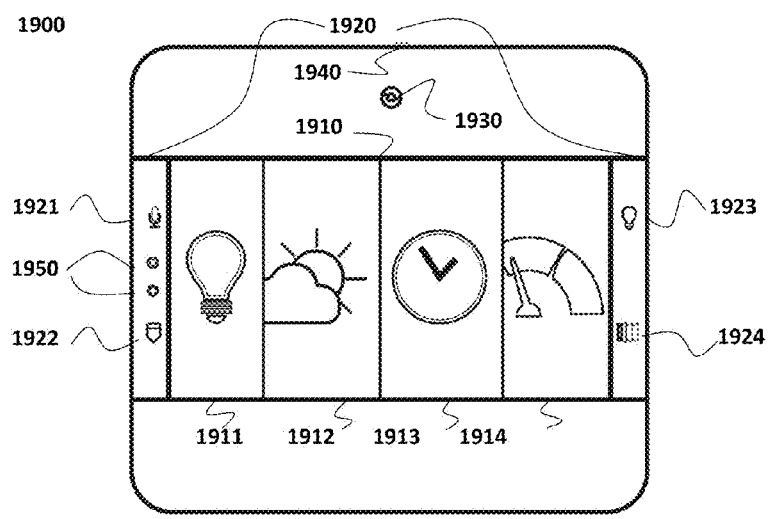
FIG. 19: Diagram of an exemplary embodiment of user interface menu.

FIG. 19 is a diagram of an exemplary embodiment of user interface menu. 1930 is a camera device and 1940 is a physical cover that may shield the camera device 1930 via varying its position to the camera device 1930. 1910 is a control menu, and 1920 is a shortcut menu. The control menu 1910 may include smart lighting mode 1911, weather update and warning mode 1912, clock mode 1913 and energy consumption monitoring mode 1914. The above examples are just for convenience of illustration, and the control menu 1910 may include other modes, such as infant monitoring mode 1915, etc. The control menu 1910 may include setting 1916. Menu interface may be displayed on different devices, such as, without limitation to, smart switch 1410, mobile device 1430 or TV 1448-1, 1448-2, 1448-3, computer, tablet, PDA, and on-vehicle multimedia systems, etc. Devices that are able to display the menu interface are not limited to the devices mentioned above, and other devices with display function may also be included, such as screen of refrigerators, washing machines and so on. Layout and display scale of the menu interface may be different according to specifications of the device, such as size. Number of displayed functional mode and type of mode displayed in the menu interface may also be different according to usage of the device. Display scale and layout of menu interface may be automatically adjusted according to the size and other characteristics of the display device by the environment control system, the display device, or a user. The user may adjust the position of one or more icons of the functional mode. For example, the user may control the position of some icons on the display device (e.g., move the icon to a front position) according to how often one or more functional modes as shown on FIG. 19 to FIG. 19E are used. Users may also customize the icon of a function module. For example, a user may use a photo of his/her child or family, or choose a picture as an icon of the functional mode. One exemplary embodiment of the menu interface display is shown in FIG. 19-A and FIG. 19-B. The touch screen 1711 of the smart switch 1410 shows a group of modes includes, and without limitation to, smart lighting mode 1911, weather update and warning mode 1912, clock mode 1913, energy consumption monitoring mode 1914, infant monitoring mode 1915, and setting 1916, etc. Another embodiment of the menu interface display is shown in FIG. 19-C, FIG. 19-D and FIG. 19-E. The menu interface shown on mobile device 1430 includes smart lighting mode 1951, security mode 1952, family calendar mode 1953, smart ventilation mode (or temperature/humidity control mode) 1954, message board mode (or video and voice intercommunication mode) 1955, energy consumption monitoring mode 1956, music playing mode 1957, infant monitoring mode 1958, and settings 1959, etc. The menu interface may further include other buttons. Taking the smart switch 1410 as an example, the shortcut menu 1920 may include video and/or voice intercommunication button 1921, security mode starting button 1922, light control button 1923, and menu button 1924. The smart switch 1410 may have one or more sensors, including ambient light and proximity sensor 1950, etc.

FIG. 19 is one exemplary embodiment of the environment control system. The environment control system may include the following functions: smart lighting learning, customized lighting mode, indoor security system or security mode, family interphone, family calendar, energy consumption monitoring, weather updating and warning, smart ventilation (or temperature/humidity control), clock, infant monitoring, music playing, message board(or video and voice intercommunication), local Internet of Things of the family, local semantic net of the family, smart space. It should be noted that the functions mentioned above are just for the convenience of illustration, while the functions of the environment control system may be determined according to specific application scenarios that are not limited to the particular embodiments mentioned above.

Figure 27:
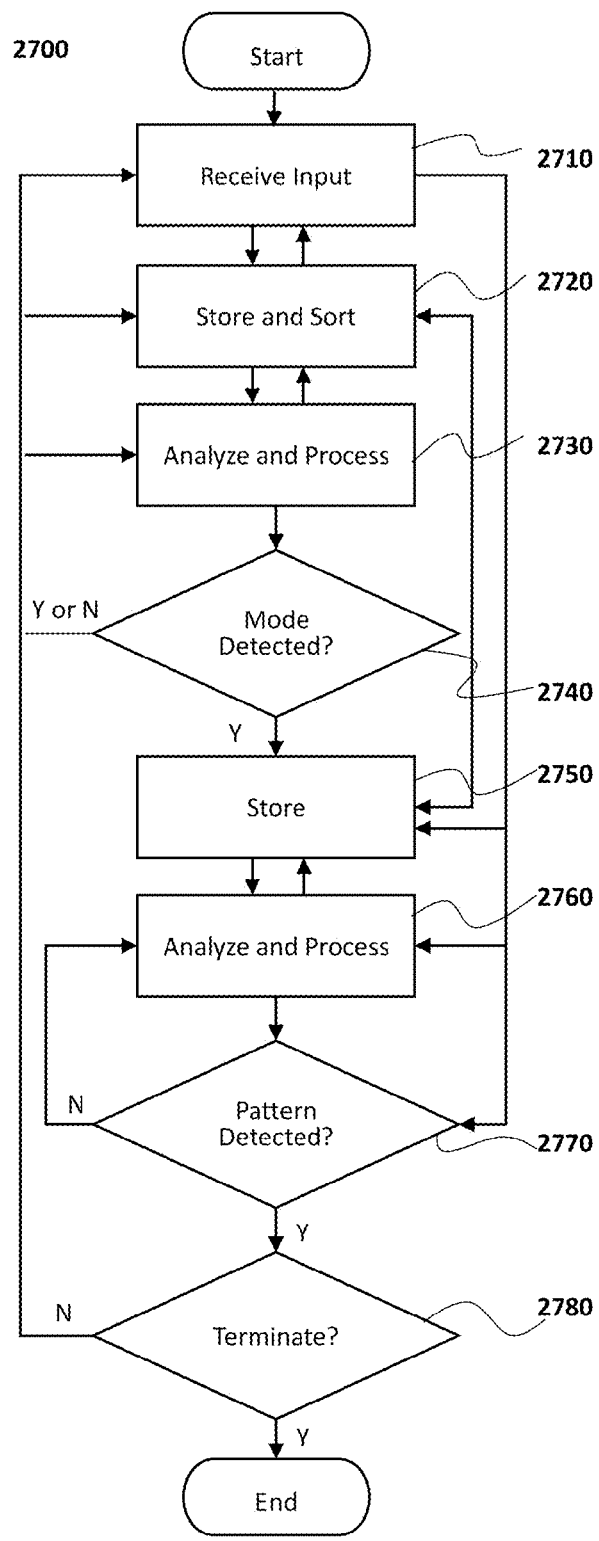
FIG. 27: Flow chart of an exemplary embodiment of self-learning function.

When initializing the environment control system, the sensing module 120 initiates, and detects and/or monitors variables of the environment in real time or according to a regular schedule. The sensing module 120 may trace and detect and/or monitor various kinds of physical quantities such as voice, light, time, weight, location, temperature, humidity, voltage, current, speed and acceleration, inhalable particle, radiation, text, image, touching, pupil, finger print, etc. The sensing module may detect and/or monitor one or more of these parameters and may also store and organize them for further analysis and processing. The sensing module 120 may take full advantage of all usable devices, including but not limited to a temperature sensor, luminance sensor, humidity sensor, ambient light sensor, gas sensor, pheromone sensor (which may also be a kind of gas sensor), motion sensor, etc. Via tracing and detecting and/or monitoring changes of a physical quantity of the environment, the sensing module 120 may transform the physical quantity into an electrical signal. The electrical signal may be stored in sensing module 120 as data, which may be in the form of, for example, binary system, octal system, decimal system, hexadecimal system, sexagesimal system, etc. The data may possess characteristics such as time, subject, unit, weather, etc. The sensing module 120 may acquire time information via communicating with the control module 130 in real time, and the time information may include, and without limitation to, nanosecond, microsecond, millisecond, second, minute, hour, year, month, day, morning, afternoon, noon, dawn, dusk, midnight, etc. The data may possess one or more subjects, and/or belong to one or more the subjects, and/or be given to one or more the subjects via the control module 130. The subject may include, and without limitation to, lounge, bedroom, dining room, bathroom, balcony, basement, kitchen, refrigerator, microwave oven, TV, the personal computer, and porch, etc. It should be noted that the subjects to which the data belong as mentioned herein are just for the convenience of illustration, while the subjects to which the data belong may be defined and classified flexibly according to the application scenarios, application field, and application object, etc., The subjects to which the data belong may be any one or more extensive subjects. The data may have but are not limited to the following units: Celsius degree, Fahrenheit degree, lux, Pascal, meter, millimeter, micron meter, ampere, volt, ohm, mu, etc. The control system may have a special or common storage format, and the data, time, subject, unit may be stored in the storage device 520 or cloud server 540 of the environment control system in the special or common storage format. The environment control system may have a special or common recognition method, and may achieve mode recognition by applying the special or common recognition method to the data. Via recognizing the physical quantity and characteristics of the data, the environment control system may recognize one or more special or common mode by the mode recognition method. Content of the one or more special or common modes may include, without limitation to, the time range of sun rise and position and behavior of one or more subjects in this time range, the time range of noon and position and behavior of one or more subjects in this time range, the time range of sun set and position and behavior of one or more subjects in this time range, the time range of breakfast and position and behavior of one or more subjects in this time range, the time range of gaming and position and behavior of one or more subjects in this time range, the time range of bath and position and behavior of one or more subjects in this time range, the time range of reading and position and behavior of one or more subjects in this time range, the time range of sleeping and position and behavior of one or more subjects in this time range. It should be noted that the listed one or more special or common modes are just for the convenience of illustration, while the one or more special or common mode may be obtained according to the time and behavior of one or more subjects, and may be updated anytime. The one or more special or common mode may be stored by certain storage method in the storage device 520 or the cloud server 540. The control module 130 of the environment control system has one or more statistical algorithms, of which the calculation target is the one or more special or common modes. The control module 130 may apply the statistical algorithms to the one or more special or common modes, and thus derive one or more special or common patterns. The control module 130, according to the one or more special or common patterns, may store one or more predefined or customized trigger modes in the storage device 520 or the cloud server 540, the trigger mode may be updated continuously over time. The control module 130 may compare the trigger mode to the one or more special or common mode, and initialize or terminate the function module of the environment control system according to a certain algorithm. It should be noted that the data, the recognized one or more special or common modes and one or more predefined or customized trigger modes are not necessarily stored in storage device 520, while they may also be stored in cloud server 540 and one or more other servers. FIG. 27 and the related description thereof offer more illustration on the mode recognition or the self-learning function of the environment control system.

Figure 20:
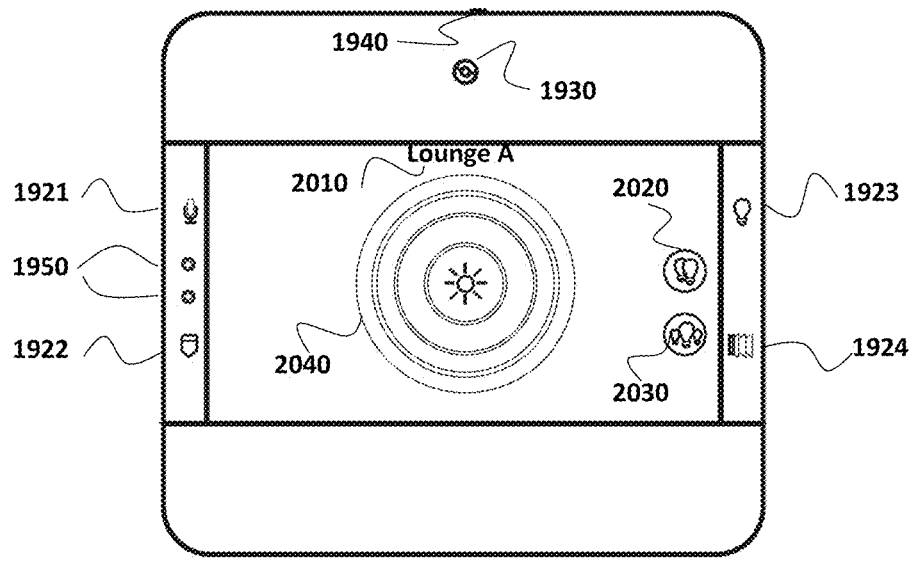
FIG. 20: Diagram of an exemplary embodiment of light control user interface.

FIG. 20 is a diagram of the light control user interface. Region indication 2010 shows the currently controlled regions. The region indication 2010 may be text, image, number, any symbol or combination of symbols that have specific semantics. Light control button 2020 may be used to enter the light control mode. The light control button 2020 may be text, image, number, any symbol or combination of symbols that have specific semantics. Region selection button 2030 may be used to select a target area. The region selection button 2030 may be text, image, number, any symbol or combination of symbols that have specific semantics. Ripple light luminance control button 2040 may be used to control the luminous intensity of the target region. The ripple light luminance control button 2040 may be text, image, number, any symbol or combination of symbols that have specific semantics.

When the environment control system is initiated, the sensing module 120 (or temperature sensor, light sensor, current sensor, touching sensor, motion sensor, image sensor, etc. initiates) may detect and/or monitor variables of the ambient environment, and the sensing module 120 may be responsible for converting variables of the ambient environment into electronic signals. The storage device 520 or the cloud server 540 may store predefined or customized trigger modes. For example, detecting and/or monitoring object's motion, wake up mode, sleeping mode, leaving mode and night mode. After the analog signal of ambient environment variables and/or user commands or other inputs are converted into electrical signals, the control module 130 of the environment control system may apply a specific mode recognition method to the electrical signals to recognize them as one or more modes. The control module 130 of the environment control system may compare the one or more recognized modes with one or more predefined or customized trigger modes. The comparing behavior is based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. If one or more mode detected by the control module 130 of the environment control system matches the predefined or customized trigger mode, for example, if object motion is detected, then turn on the light for several minutes then turn it off; if the wake up mode is detected, then take several minutes to turn lights from off to on; if the sleep mode is detected or monitored, then take several minutes to turn lights from on to off; if the leaving mode is detected or monitored, then turn corresponding lights on at a particular moment and off at another moment; if the night mode is detected, and if continuous object motions are detected and/or monitored, then increase light luminance, and if no continuous object motion is detected and/or monitored, then decrease light luminance. It should be noted that the above descriptions of the modes or behaviors (such as the time for lights to be turned from the state of "off" to the state of "on") are only provided for a better understanding, and the recognized modes and the corresponding behaviors may be defined flexibly according to specific needs.

Figure 21:
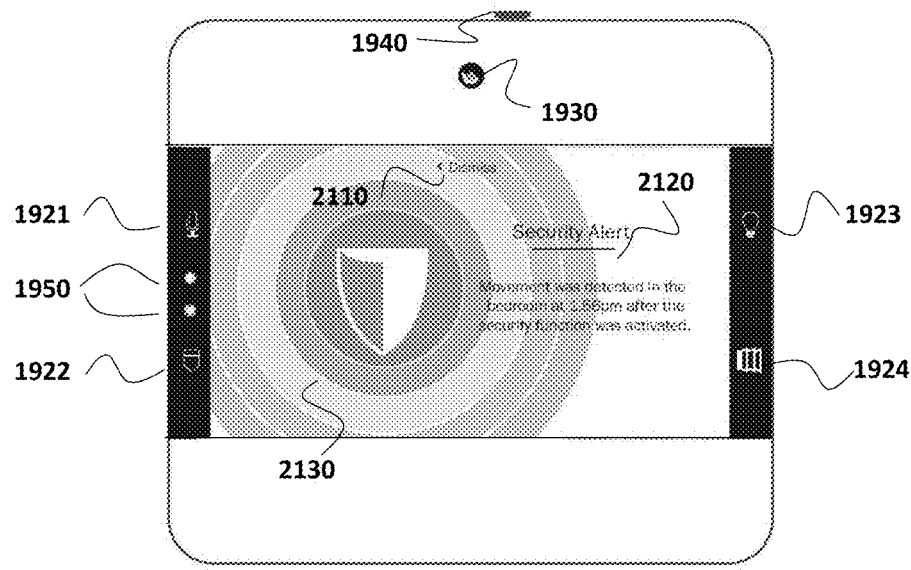
FIG. 21: Diagram of an exemplary embodiment of security mode user interface.

FIG. 21 is a diagram of the security mode user interface. Cancel button 2110 may be used for disabling or quitting the security alarm function of the security mode. The cancel button 2110 may be text, image, number, any symbol or combination of symbols that have specific semantics. Security alarm text notification 2120 may be used to alarm a user about a detected security event. The security alarm text notification 2120 may be text, image, number, any symbol or combination of symbols that have specific semantics. Security alarm icon 2130 may be used for reminding a user the starting of the security alarm function. The security alarm icon 2130 may be text, image, number, any symbol or combination of symbols that have specific semantics. When the environment control system is initiated, the sensing module 120 (or a temperature sensor, light sensor, current sensor, touching sensor, motion sensor, image sensor initiates) may detect and/or monitor variables of the ambient environment, and the sensing module 120 may be responsible for converting variables of the ambient environment into electronic signals. The storage device 520 or cloud server 540 may store predefined or customized trigger events. After analog signals of ambient environment variables and/or the user's commands or other inputs are converted into electrical signals, the control module 130 of the environment control system may apply a specific mode recognition method to the electrical signals to recognize them as one or more modes. The mentioned control module 130 of the environment control system may compare the recognized one or more modes to one or more predefined or customized trigger modes. The comparing behavior is based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. If one or more mode detected by the control module 130 of the environment control system matches the predefined or customized trigger mode (for example a trigger mode is triggered when object motion is detected in a bedroom at 1:56 p.m.), then the alarm of the security mode will be initialized.

Figure 22:
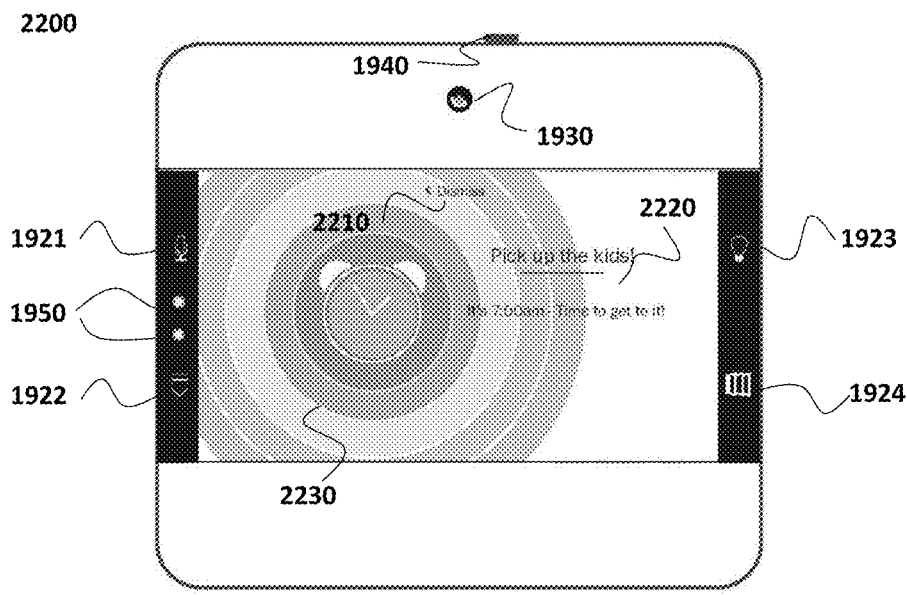
FIG. 22: Diagram of an exemplary embodiment of family calendar user interface.

FIG. 22 is a diagram of the family calendar user interface. Cancel button 2210 may be used for canceling a notification event. The cancel button 2210 may be text, image, number, any symbol or combination of symbols that have specific semantics. Family calendar text notification 2220 may be used for reminding a user a predetermined event. The family calendar text notification 2220 may be text, image, number, any symbol or combination of symbols that have specific semantics. Family calendar icon 2230 may be used for reminding a user that the current mode is the family calendar mode. The family calendar icon 2230 may be text, image, number, any symbol or combination of symbols that have specific semantics. When the environment control system is initiated, the sensing module 120 (or a temperature sensor, light sensor, current sensor, touching sensor, motion sensor, image sensor initiates) may detect and/or monitor variables of the ambient environment, and the sensing module 120 may be responsible for converting variables of the ambient environment into electronic signals. Storage device 520 or cloud server 540 stores predefined or customized trigger events (such as events to be reminded in a calendar). After analog signals of ambient environment variables and/or the user's commands or other inputs are converted into electrical signals, the control module 130 of the environment control system may apply a specific mode recognition method to the electrical signal to recognize them as one or more modes. The mentioned control module 130 of the environment control system may compare the recognized one or more modes to one or more predefined or customized trigger modes. The comparing behavior is based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. If one or more mode detected by the control module 130 of the environment control system matches the predefined or customized trigger mode (for example, a notification event is to pick up kids at 7 p.m., or notifying weather change or alarming an illegal invasion via indoor broadcast), then the event notifications of the family calendar will start.

Figure 23:
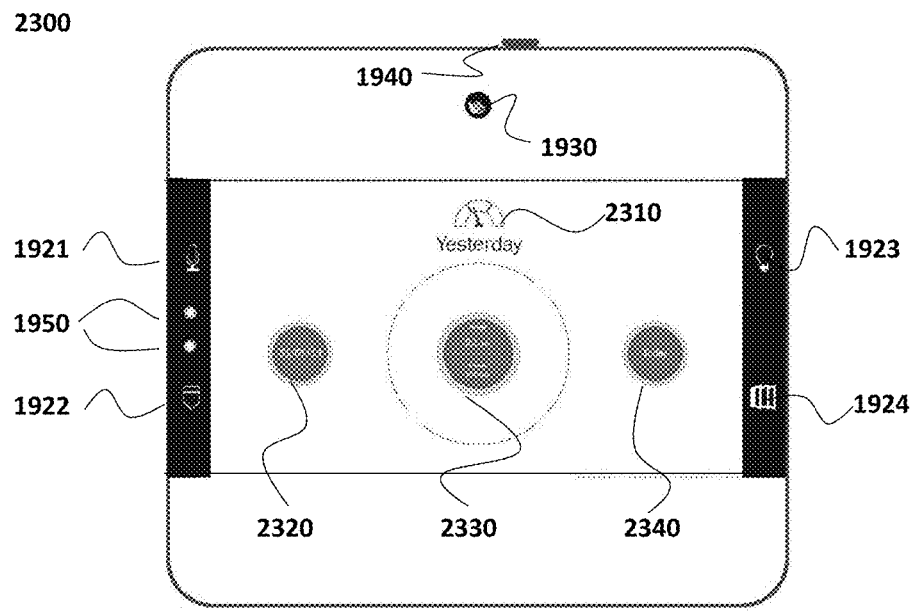
FIG. 23: Diagram of an exemplary embodiment of energy consumption monitoring user interface.

FIG. 23 is a diagram of the energy consumption monitoring user interface. Current date notification 2310 may remind a user the date that is currently chosen by the user. The current date notification 2310 may be text, image, number, any symbol or any combination of symbols that have specific semantics. 2320 may be used to show energy consumption of the day before the current day. The energy consumption data 2320 may be text, image, number, any symbol having a specific semantics or any combination thereof. 2330 may show the energy consumption of the current day. The energy consumption 2330 may be text, image, number, any symbol or combination of symbols that have specific semantics. 2340 may show energy consumption of the day after the current day. The energy consumption data of the day after the current day 2340 may be text, image, number, any symbol or combination of symbols that have specific semantics. When the environment control system is initiated, the sensing module 120 (or a temperature sensor, light sensor, current sensor, touching sensor, motion sensor, image sensor imitates) may detect and/or monitor variables of the ambient environment, and the sensing module 120 may be responsible for converting variables of the ambient environment into electronic signals. After analog signals of ambient environment variables and/or user commands or other inputs are converted into electrical signals, the control module 130 of the environment control system may apply a specific mode recognition method to the electrical signals to recognize them as one or more modes. The control module 130 of the environment control system may store the recognized one or more modes in a storage device (such as storage device 520, cloud server 540, etc.). The display device of the environment control system receives the mode data stored in the storage device in the control module 130, and displays the stored mode data according to a certain display algorithm (for example, on Feb. 11, 2015, the energy consumption was 2.1 kWh, and the average consumption rate was 805 Watts).

Figure 24:
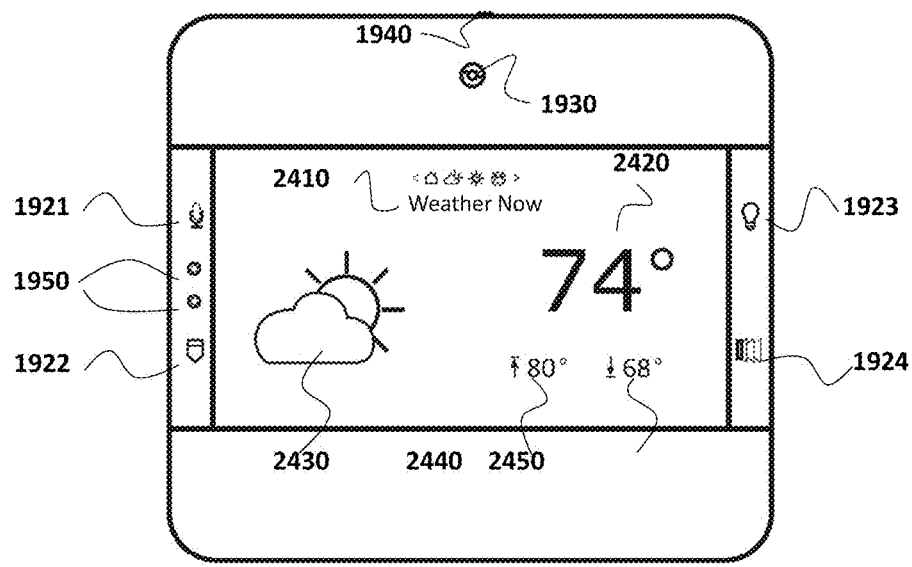
FIG. 24: Diagram of an exemplary embodiment of weather warning user interface.
Figure 25:
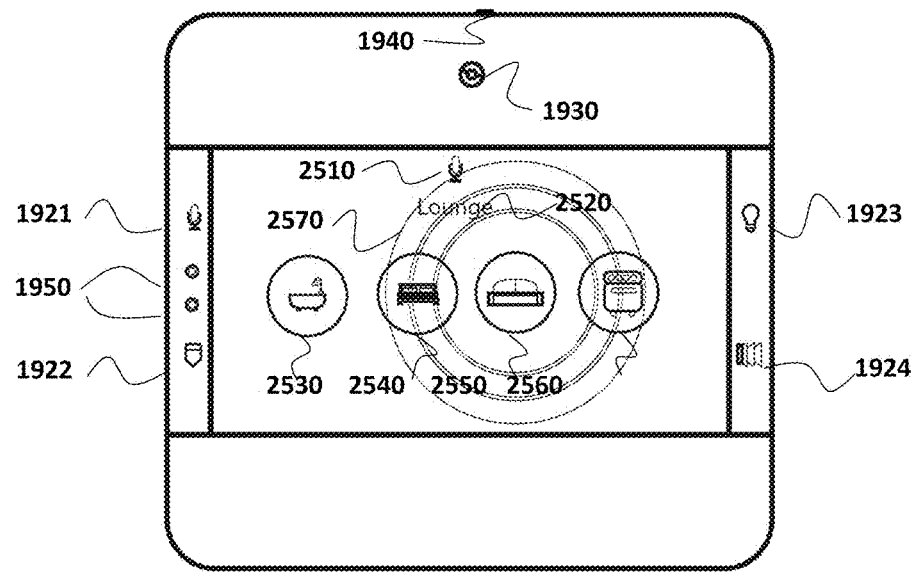
FIG. 25: Diagram of an exemplary embodiment of video and voice intercommunication user interface.

FIG. 24 is a diagram of the weather warning user interface. 2410 may show the current weather condition. The current weather icon 2410 may be text, image, number, any symbol or combination of symbols that have specific semantics. 2420 may show the current temperature. The icon of the current temperature 2420 may be text, image, number, any symbol or combination of symbols that have specific semantics. 2440 may show the highest temperature of the current date. The icon of the highest temperature of current date 2440 may be text, image, number, any symbol or combination of symbols that have specific semantics. 2450 may show the lowest temperature of the current date. The icon of the lowest temperature of current date 2450 may be text, image, number, any symbol or combination of symbols that have specific semantics. 2430 may show the weather condition. The weather condition 2430 may be text, image, number, any symbol or combination of symbols that have specific semantics. When the environment control system is initiated, the sensing module 120 (or a temperature sensor, light sensor, current sensor, touching sensor, motion sensor, image sensor initiates) may detect and/or monitor variables of the ambient environment, and the sensing module 120 may be responsible for converting variables of the ambient environment into electronic signals. The sensing module 120 may communicate with the communication module 140, and the communication module 140 may receive external information input (such as weather information, etc.), and the information may be recognized as one or more special or common mode. The control module 130 of the environment control system may compare one or more recognized modes with the predefined or customized trigger modes. If one or more mode detected by the control module 130 of the environment control system matches the predefined or customized trigger mode (such as real-time display of weather, temperature, humidity, early-warning of cloudy or rainy weather), then the weather warning mode will be turned on.

Figure 26:
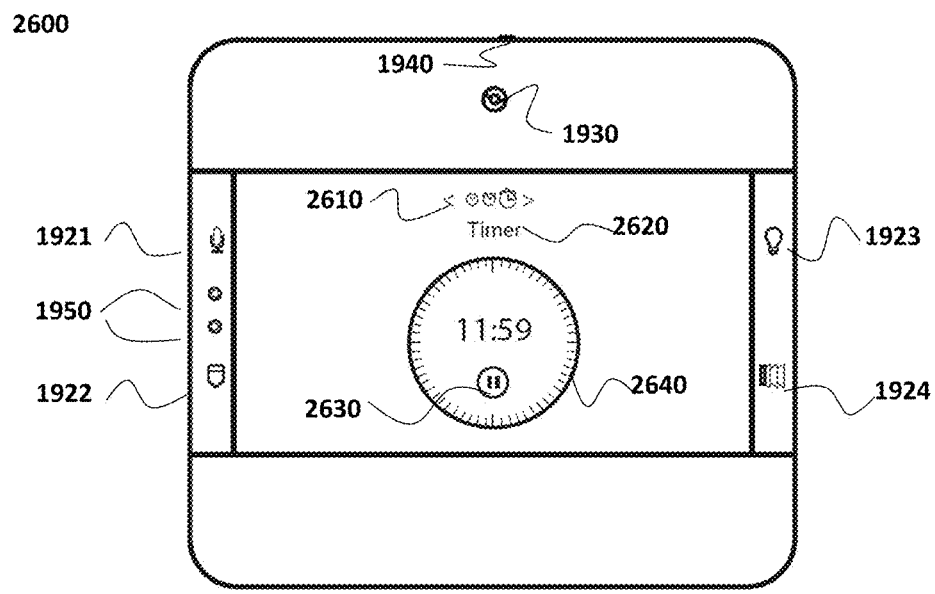
FIG. 26: Diagram of an exemplary embodiment of clock user interface.

FIG. 26 is a diagram of the clock user interface. 2610 is the clock mode selection menu for selecting corresponding clock modes. The selectable clock modes may include, and without limitation to, time display mode, timer mode, alarm clock mode, etc. The clock mode selecting interface may be text, image, number, any symbol or combination of symbols that have specific semantics. 2620 is clock mode indication that indicates the current clock mode. The clock mode indication 2620 may be text, image, number, any symbol or combination of symbols that have specific semantics. 2640 is the pause button under the timer mode for pausing the current selected timer. The pause button 2640 may be text, image, number, any symbol or combination of symbols that have specific semantics. 2630 may indicate that the current mode is the timer mode. The clock icon 2640 may be text, image, number, any symbol or combination of symbols that have specific semantics. When the environment control system is initiated, the sensing module 120 (or a temperature sensor, light sensor, current sensor, touching sensor, motion sensor, image sensor initiates) may detect and/or monitor variables of the surrounding environment, and the sensing module 120 may be responsible for converting variables of the surrounding environment into electronic signals. Storage device 520 or cloud server 540 may store predefined or customized trigger events (for example, events to be reminded in a calendar). After analog signals of surrounding environment variables and/or user commands or other inputs are converted into electrical signals, the control module 130 of the environment control system may apply a specific mode recognition method to the electrical signals to recognize them as one or more modes. The mentioned control module 130 of the environment control system may compare the recognized one or more modes to one or more predefined or customized trigger modes. The comparing behavior is based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. If one or more modes detected by the control module 130 of the environment control system matches the predefined or customized trigger mode (such as count 3 minutes and 30 seconds), then the timer will be initialized.

FIG. 27 is a flow chart of the self-learning function of the environment control system. After initialization of the self-learning mode, at step 2710, the environment control system may collect variables of surrounding environment and/or user commands or other inputs, and input all these data into the system. After completion of step 2710, the environment control system may go to step 2750, step 2760 and step 2770 directly. After receiving the input, the environment control system may return to the start or go to step 2720. In step 2720, the environment control system may store and classify the collected data and/or user commands or other inputs. For example, collected data may be related to the temperature and luminance of environment, and the user commands or other inputs may be related to temperature control and lighting. Then data related to environmental temperature and user commands or other inputs related to temperature control may be classified into a same category, and data related to environmental luminance, and user commands or other inputs related to luminance may be classified into a same category. For another example, the environment control system may store and classify the collected data and/or user commands or other inputs as location, time, organism, human, animal, electronic device, cellphone, smart switch, chemicals, light, environment light, ultraviolet, command, user command, other external command, and data type, etc. The above classifications may be in a parallel relation or a hierarchical relation (for example, human and animal may belong to the organism class, and user command and other external command may belong to the command class). After step 2720 is completed, the environment control system may return to step 2710 or go to step 2730. Storage devices presented in step 2720 and step 2750 may be the same or different device(s). After step 2720 is completed, environment control system may enter step 2750 directly. And after step 2750 is completed, environment control system may enter step 2720 directly. It should be noted that the classifications mentioned above are provided for illustrative purposes, and the classifications of the environment control system may be defined flexibly according to the application situation. Step 2730 analyzes and processes the classified data. After the processing and analyzing are completed, the environment control system may return to step 2730 or enter into step 2740. In step 2740, whether input data may be recognized as one or more modes is determined. If the data fail to be recognized as one or more modes, the environment control system will return to step 2710 to continue collecting data. If the input data are recognized as one or more modes, the recognized mode in step 2750 will be stored in the knowledge database. The mode recognition is to achieve the recognition of the ambient environment via the construction of a language that may be understood by the environment control system. For example, the language may be: 17:45, Mar. 25, 2015, Wednesday, temperature near the entryway is 27° C., no life activity is detected in field of view, carbon dioxide concentration is 0.04%, droplight of the porch is turned off, no moving object is detected in the entryway, Tom is detected watching TV in the lounge. It should be noted that the description above is provided for the convenience of illustration, while the language of the system may be flexibly constructed according to specific grammars and semantics. The mode recognition described in step 2740 may be operated based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. After step 2740 is completed, the environment control system may return to step 2730, step 2720 and step 2710. Step 2760 may analyze and process the mode stored in the knowledge database. After the completion of step 2760, the environment control system may return to step 2750 or enter into step 2770. Step 2770 may determine whether the input mode may be recognized as one or more patterns. If the input mode fails to be recognized as one or more patterns, then the environment control system will return to step 2760 and continue analyzing and processing the input mode. If the input mode can be recognized as one or more patterns, then the recognized one or more patterns will be stored in the knowledge database in step 2770. It should be noted that the patterns mentioned above may not be a common law of nature. The recognized mode may be recognized as a pattern when its accumulation based on a specific algorithm exceeds a certain threshold value. For example, if a user leaves home between 9:30 and 10:00 97% of the time in a month, then the user leaving home between 9:30 to 10:00 may be recognized as a pattern. It should be noted that the examples above are provided for the convenience of illustration, while the time range, possibility, accumulated time range, etc., of the user's behavior may be defined flexibly, such as in one week, in one year, in one quarter of a year, 60%, 80%, 22:30 to 23:00, etc. The pattern may be updated, for example, if the time when the user leaves home has changed, then a new pattern may be recognized to adapt to the user's behavior. The pattern recognition described in step 2770 may be conducted based on a specific algorithm, which may include but is not limited to linear discriminant analysis, quadratic discriminant analysis, maximum entropy classifiers, decision trees, decision tables, kernel estimation, K-nearest neighbor, naive Bayes classifier, neural network, perceptron, support vector machines, gene expression programming, hierarchical clustering, k-means clustering, correlation clustering, kernel principal component analysis, lifting scheme, Bayesian networks, Markov random field, multiple linear principal component analysis, Kalman filter, particle filter, Gaussian process regression, linear regression or expansion, independent component analysis, principal component analysis, conditional random field, hidden Markov model, maximum entropy Markov model, recurrent neural networks, association rules, inductive logic programming, the similarity measure learning, deep neuron networks, problems of deep neuron networks, deep belief networks, convolution neural network, and convolution deep belief network, etc. The specific algorithm may be any one of the algorithms described above or any combination thereof. After step 2770 is completed, the environment control system may return to step 2760. Step 2780 may detect whether an instruction to terminate self-learning function is received. The instruction may come from a user or the environment control system. For example, the environment control system may be pre-installed with a termination algorithm, and when the condition set by the algorithm is met (such as having continuously performed the self-learning function for one year), the environment control system may send the termination instruction to terminate the self-learning function. As another example, the termination algorithm of the environment control system may detect some mode related to the ambient environment (for example, detecting nobody indoor), then the mode mentioned above may trigger the environment control system to send the termination instruction. If the instruction to terminate the self-learning function has been received, the environment control system will terminate the self-learning function and quit the self-learning mode. If the instruction to terminate the self-learning function has not been received, the environment control system will store the recognized patterns into the knowledge database. After the completion of step 2780, the process may return to step 2750. The knowledge database may be a storage device, which may be inside or outside of the environment control system, such as a remote sever, a cloud sever, etc.

Figure 28:
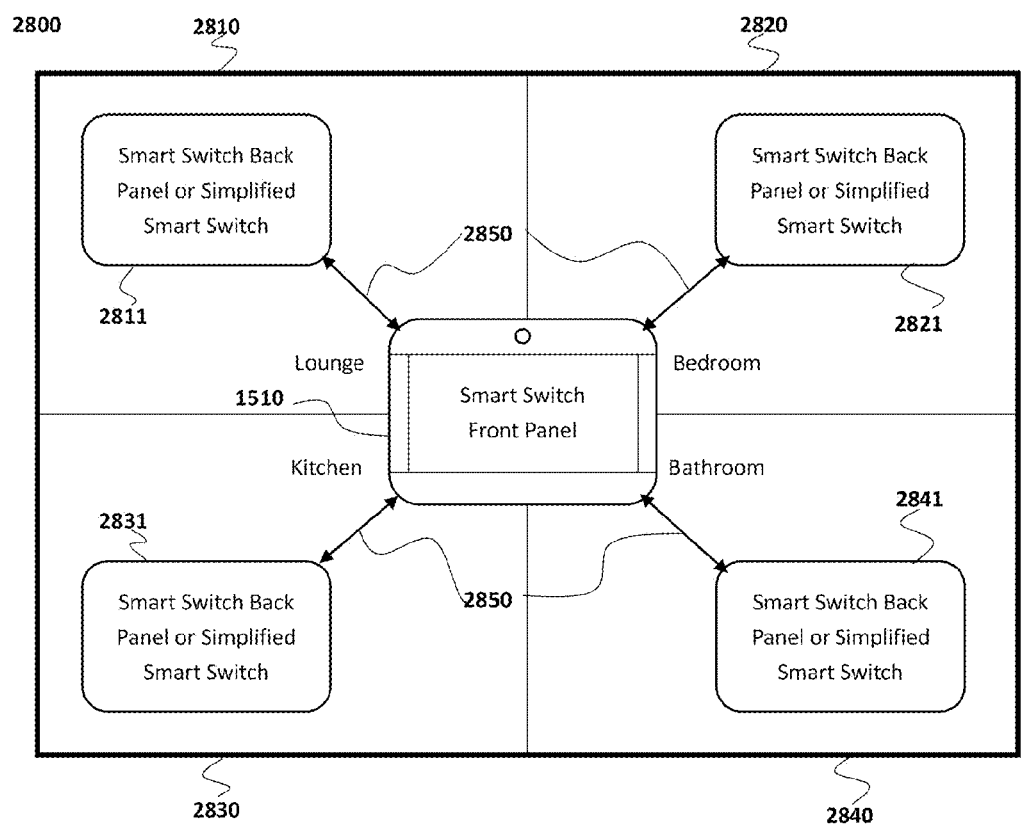
FIG. 28: Diagram of an embodiment of flexible panels attachment.

FIG. 28 is an exemplary embodiment of the combination of the front panel, back panel and smart switch. Lounge 2810 may be pre-installed with the smart switch back panel or simplified switch 2811. The bedroom 2820 may be pre-installed with the smart switch back panel or simplified switch 2821. Kitchen 2830 may be pre-installed with the smart switch back panel or simplified switch 2831. Bathroom 2840 may be pre-installed with the smart switch back panel or simplified switch 2841. The smart switch front panel 1510 may be a hand-held mobile device, while the user may connect the smart switch front panel 1510 to the back panel or simplified switch 2811 of the lounge 2810, to the back panel or simplified switch 2821 of the bedroom 2820, to the back panel or simplified switch 2831 of the kitchen 2830, to the back panel or simplified switch 2841 of the bathroom 2840, according to his/her particular need. Front panel 1510 of the smart switch may connect, through port 2850 of a connector, with the back panel or simplified switch 2811 in the lounge 2810, or the back panel or simplified switch 2821 in the bedroom 2820, or the back panel or simplified switch 2831 in the kitchen 2830, or the back panel or simplified switch 2841 in the bathroom 2840. The port may be wired or wireless. The types of wired port include but are not limited to UART (Universal Asynchronous Receiver/Transmitter), I2C (Inter-Integrated Circuit), SPI (Serial Peripheral Interface), etc. Meanwhile, the type of port may be customized, including, without limitation to, the number and function of the port pin. The functions may include, without limitation to, power supply, and hardware connection handshaking or communication. The types of wireless port may include, without limitation to, Bluetooth or Wi-Fi. It should be noted that the description of the port is not limited to the situations mentioned above, and persons of ordinary skill in the art may make other modifications according to the feathers of the port. For example, technologies such as USB, IEEE 1394, ExpressCard, eSATA, SCSI, IDE, PCI, etc., may be used to achieve the same or similar functions.

Figure 29:
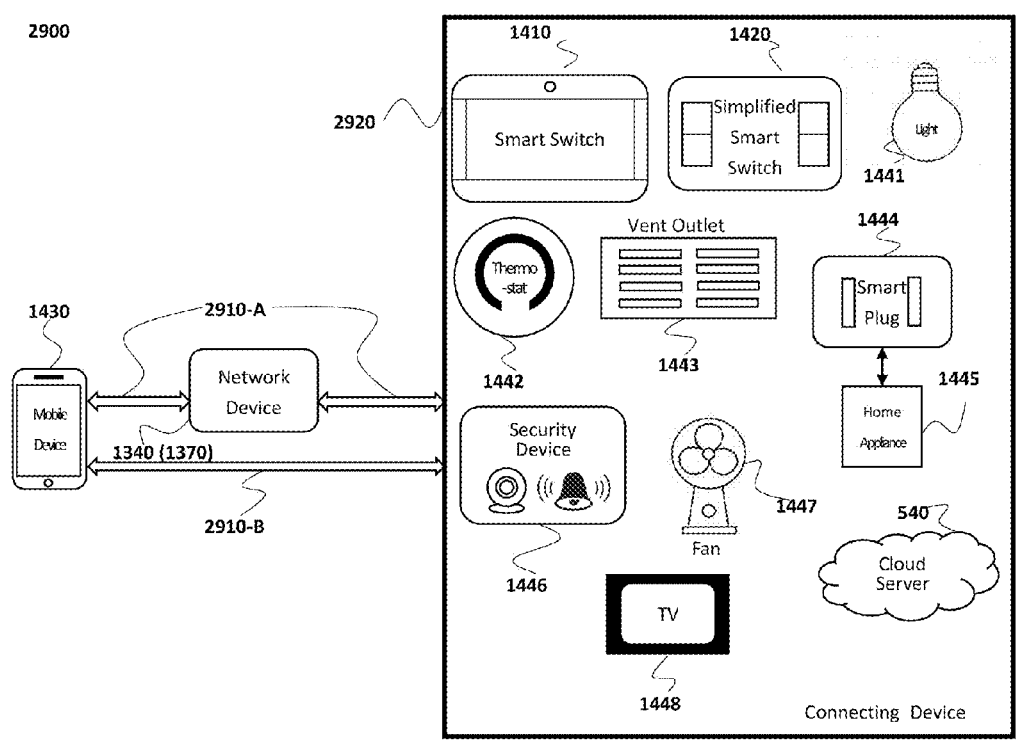
FIG. 29: Diagram of an embodiment of mobile device control.

FIG. 29 is an illustration of an exemplary embodiment of the mobile device control. Connectable devices 2920 include, without limitation to, smart switch 1410, simplified smart switch 1420, light 1441, thermometer 1442, vent outlet 1443, smart plug 1444, home appliance 1445, security device 1446, fan 1447, TV 1448, and cloud sever 540. Specifically, the fan 1447 may be a fan, desk fan, ventilator, box fan, air conditioner fan (i.e., cooling fan), etc. The fan 1447 may also be any combination of fans mentioned above in any kind or number. It should be noted that the connectable devices 2920 are not limited to the devices mentioned above, while the user may add other devices flexibly as needed, such as washing machines, televisions, air conditioners, humidifiers, water heaters, and gas stoves, etc. The mobile device 1430 may communicate with a connectable device 2920 via one of the following two ways: as in 2910-A, the mobile device 1430 communicates with the connectable device 2910 via network device 1340 (1370); and as in 2910-B, the mobile device 1430 communicates with the connectable device 2920 via built-in SIM cards of carrier operator networks (2G, 3G, 4G, 5G, etc.). The network device 1370 may be a built-in device of the smart switch 1410 and the simplified smart switch 1420, and the network device 1340 may be an external device of the smart switch 1410 and the simplified smart switch 1420. Network devices include but are not limited to a router, Bluetooth network device, the carrier operator network device, payment device, pairing device, ZigBee network device. As in 2910-A, the mobile device 1430 may conduct bi-directional communications with the smart switch 1410 and the simplified smart switch 1420 using network device 1340 (1370). The smart switch 1410 and the simplified smart switch 1420 may receive instructions from the mobile device 1430, and according to the received instructions, the smart switch 1410 and the simplified smart switch 1420 may send corresponding instructions to the light 1441, the thermometer 1442, the vent outlet 1443, the smart plug 1444, the home appliance 1445, the security device 1446, the fan 1447, the TV 1448, and the cloud sever 540, etc. As in 2910-B, the mobile device 1430 may conduct bi-directional communications with the smart switch 1410 and the simplified smart switch 1420 via built-in SIM cards of carrier operator networks (2G, 3G, 4G, 5G, etc.). The smart switch 1410 and the simplified smart switch 1420 may receive commands from the mobile device 1430, and the smart switch 1410 and the simplified smart switch 1420 may, according to the received commands, send relative commands to the light 1441, the thermometer 1442, the vent outlet 1443, the smart plug 1444, the home appliance 1445, the security device 1446, the fan 1447, the TV 1448, and the cloud sever 540, etc. It should be noted that the above communication control methods are not the only embodiments. The mobile device 1430 may conduct bi-directional communications without the smart switch 1410 or the simplified smart switch 1420, but directly with the light 1441, the thermometer 1442, the vent outlet 1443, the smart plug 1444, the home appliance 1445, the security device 1446, the fan 1447, the TV 1448, and the cloud sever 540 through either one of the two ways of communication mentioned above. Home appliance 1445 may have bi-directional communications with the mobile device 1430 directly through either one of the aforementioned two ways of communication. Alternatively, it may have bi-directional communications with the mobile device 1430 through either one of the aforementioned two ways of communication via the smart plug 1444. Specifically, the aforementioned two ways of communication are provided only for the convenience of illustration. A person of ordinary skill in the art, after understanding the basic principles of communication, may make various modifications or variations in forms and details as to the implementation of communication between devices, without departing from those principles. For example, the communication may be conducted in a wired way, and these modifications and variations are still within the scope of the present disclosure.

In one exemplary embodiment, when the mobile device 1430 is networked into the environment control system (e.g., connecting directly through Bluetooth networking technology or connecting via a router to the communication module 140 of the environment control system, etc.), corresponding operations may be performed by the APP installed in the mobile device 1430. When running an APP for the first time or restarting an APP, a welcome page may be displayed, which may include but is not limited to a demonstration and feature introduction, etc. Furthermore, the user may log in the family account by username and passcode authentication, or sign up a new account or set a nickname, etc. When entering the main page of the APP, the APP may show a menu interface, and the user may control different devices and/or modes of the environment control system from the menu interface, such as, without limitation to, smart lighting mode 1951, security mode 1952, family calendar mode 1953, smart ventilation mode (or temperature/humidity control mode) 1954, message board mode (or video and voice intercommunication mode) 1955, energy consumption monitoring mode 1956, music playing mode 1957, infant monitoring mode 1958, and settings 1959, etc. The user may drag the icons in the menu interface to change the positions of these function buttons.

In one embodiment of the smart lighting mode 1951, a region to be under the lighting control may be selected, and the region may be one or more rooms, or all lights, or one or more lights etc., such as the kitchen, bedroom, lounge, and restroom, etc. Icons indicating different regions may be dragged to change their positions on the interface. Detailed descriptions of the control of the smart lighting mode 1951 may be found in the descriptions of FIG. 25, FIG. 27, FIG. 30, FIG. 31, FIG. 32, FIG. 33, FIG. 34, FIG. 35, FIG. 48, and other descriptions of smart lighting and artificial intelligence, which descriptions will not be repeated here. In an exemplary embodiment of the security mode 1952, the user may watch via an APP real-time or non-real-time images taken by a camera device, or activate the security mode using a security key. Once a security event happens, such as an illegal invasion, the security mode may generate a notification and/or alarm on the APP, and the user may check the notification history. Detailed descriptions of the control of the security mode 1952 may be found in the descriptions of FIG. 21, FIG. 27, FIG. 38, FIG. 39, FIG. 40, FIG. 41, FIG. 42, FIG. 48, and other descriptions of security mode and artificial intelligence, which descriptions will not be repeated here.

In one exemplary embodiment of family calendar mode 1953, the user may set events for the current day or other dates, and the events may be downloaded and/or synchronized from the cloud server 540 or Internet. User may check events that are going to happen or have happened, such as in one day, week, month or year. Additionally, the user may set the notification type of an event when the event occurs, such as voice prompts, alarms, light flashes, and pushing notifications on an APP and/or panel devices, etc. The above descriptions are provided only for illustrative purposes, while there are many other types of notifications, such as cellphone vibrations, changes in the height and angle of a bed, etc. Detailed descriptions of the control of the family calendar mode 1953 may be found in the descriptions of FIG. 22, FIG. 27, FIG. 48, and other descriptions of family calendar mode, which descriptions will not be repeated here.

In one embodiment of smart ventilation mode (or temperature/humidity control mode) 1954, the user may check and/or adjust certain parameters, such as temperature, humidity or sensible temperature, etc. of each room or region. The control of relative parameters may be real-time or predetermined, such as changing the parameters at the current moment, or predetermining the parameters for a given time of a given day in the future. Detailed descriptions of the control of the smart ventilation mode (or temperature/humidity control mode) 1954 may be found in the descriptions of FIG. 27, FIG. 43, FIG. 44, FIG. 48 and other descriptions of smart ventilation mode and artificial intelligence, which descriptions will not be repeated here.

In one embodiment of message board mode (or video and voice intercommunication mode) 1955, the user may send and/or receive messages such as a text, audio record, image, video clip, and the user may also launch or answer voice communication or video communication. Devices for transmitting messages and video and/or audio intercommunications may be for example other mobile devices 1430, smart switch 1410, computer, tablet PC, PDA, television 1448-1, television 1448-2 or 1448-3, phone or mobile phone, etc. Detailed descriptions of the control of message board mode (or video and voice intercommunication mode) 1955 may be found in the descriptions of FIG. 25, FIG. 27, FIG. 45, FIG. 46, FIG. 48 and other descriptions of smart ventilation mode and artificial intelligence, which descriptions will not be repeated here.

In one embodiment of energy consumption monitoring mode 1956, the user may check energy consumption of the current day or other days, and the energy consumption may be displayed in different units or forms, such as using kilo-watt as the unit, using average watt-consumption of a certain period of time as the unit, or related equivalent amount of currency (for example, equivalent amount equals electricity unit price times consumption in the season) as the unit. The user may check total electricity consumption in a period of time, such as one day, week, month or year. In addition, an APP may generate an energy consumption report for the user's reference. Detailed descriptions of the control of the energy consumption monitoring mode 1956 may be found in the descriptions of FIG. 23, FIG. 27, FIG. 48 and other descriptions of energy consumption monitoring mode and artificial intelligence, which descriptions will not be repeated here.

In one embodiment of the music playing mode 1957, the user may choose one or more rooms or regions for music playing, while the device of music playing may be any device with a music-playing function, such as the smart switch 1410, the Bluetooth voice box magnetically connected under the smart switch 1410, other wired or wireless voice box connected to the environment control system, wearable playing devices (such as earphone, audiphones, etc.), smartphone, tablet PC, PDA, computer, television 1448-1, television 1448-2 or 1448-3, and vehicle-mounted voice box, etc. The APP may show related information such as name of the music, artist, album, playlist, etc. The user may choose to synchronize with other devices for transmitting or receiving music files, may select to play certain music or playlist, may select a playing mode (e.g. order playing, loop playing, shuffle playing, etc.). The user may also set (or the environment control system may self-learn) the time and volume for music playing. For example, playing music of bird chirp at 8 am with crescendo volume every day; reducing volume and shutting down the player for example 20 minutes after detecting sleep of the user. Detailed description of the control of music playing mode 1957 may be found in the descriptions of FIG. 27, FIG. 48 and other descriptions of music playing mode and artificial intelligence, which descriptions will not be repeated here.

In one embodiment of infant monitoring mode 1958, the user may choose to turn on or off the infant monitoring mode. When the infant monitoring mode 1958 is on, the environment control system may detect and/or monitor the infant and related parameters within a certain range, and send notifications or alarms to devices such as the mobile device 1430, smart switch 1410, computer, tablet PC, PDA, television 1448-1, television 1448-2 or 1448-3, phone or mobile phone, etc. The content that the environment control system detect and/or monitor may include an infant's crying, breath, heartbeat, body temperature, and emotion, whether someone is in or something is moving in the infant room, identity characteristics such as the face and biological information of a person who enters the infant room, temperature and humidity of the infant room, air quality of the infant room, cleanliness of infant diaper and so on. The content that the environment control system may detect and/or monitor is not limited to those mentioned above, while other parameters may be included, such as noise volume of the environment where the infant room locates, etc. The user may watch real-time or non-real-time video and voice information of the infant and its environment, or may interact with the infant via video and voice intercommunication mode, or may control parameters of the infant room such as the temperature, humidity and luminance, etc. The environment control system may also control automatically via self-learning function or artificially intelligence. For example, the environment control system may automatically rise the room temperature when detecting that infant has kicked away the quilt, etc. The infant monitoring mode 1958 may not only be used for monitoring an infant, but also for monitoring others such as an old person, a young kid, a pregnant woman, a patient, a pet and so on. Detailed descriptions of the control of the infant monitoring mode 1958 may be found in the description of FIG. 27, FIG. 48 and other descriptions of infant monitoring mode and artificial intelligence, which descriptions will not be repeated here.

In one embodiment of settings 1959, a user may operate settings such as settings of an APP and settings of a smart switch, etc. Particularly, the settings of APP may include but are not limited to security setting, family calendar notification setting, energy consumption setting, temperature unit setting, nickname editing, answering help, related information, and e-mail help, etc.; the settings of the smart switch may include but are not limited to smart lighting mode setting, home address setting, room type editing, mute mode, picture uploading, answering help, and related information, etc. Detailed descriptions of settings 1959 may be found in the descriptions of FIG. 27, FIG. 30, FIG. 48 and other descriptions of setting and artificial intelligence, which descriptions will not be discussed here.

When the environment control system needs to send notifications and/or alarms to the APP, the APP will show the notification. Content of notification may include, without limitation to, icon, text information, quick operation button and so on. Events that may trigger the notification may include weather forewarning, security warning, family calendar reminder, infant monitoring reminder, video and voice intercommunication (or message board) reminder and so on. Detailed descriptions of reminding may be found in the descriptions of FIG. 27, FIG. 48 and other descriptions of emergency events handling and artificial intelligence, which descriptions will not be repeated here. Furthermore, in any interface of the APP, the user may use voice command to input or control or return to the menu, etc. The APP may have various presentations for different interfaces, functions and modes. The above-described presentations are not limited to APP on a mobile device 1430, but may also be in other devices, such as but not limited to smart switch 1410, mobile device 1430 or TV 1448-3, 1448-1, 1448-2, computer, tablet, PDA, and automotive multimedia systems, etc. Devices that may display the APP interfaces are not limited to those described above, while other devices having a display function may also be used, such as screens of refrigerators, washing machines and other home appliances. Display scales and layouts of APP interfaces may be different according to characteristics of the device, such as the size of the device. Also, the number of icons and displayed modes or functions in the APP interface may be different according to the particular use of the device.

FIG. 29-A and FIG. 29-B show an exemplary embodiment of displaying the message board mode (or video voice intercommunication mode) 1955 on the mobile device 1430 by the APP. The APP interface displayed by 2900-A and 2900-B may have icon indication 2901 and text indication 2902, etc. for reminding the user that the system is the message board mode (or video voice intercommunication mode) 1955. In the exemplary embodiment shown in FIG. 29-A and FIG. 29-B, users may have text information communication (or chatting). 2903 shows information (such as avatar, nickname and name, etc.) of different users, and 2904 shows the content of the text information. User may input text information via typing bar 2905 and add Emoji using the Emoji icons 2906. The bottom of the interface may have a voice control button 2908 to achieve voice input and voice control. A user may press the menu return button 2909 to return to the main menu, and press other function button 2907 to open the submenu of other functions. Submenu of other functions may include picture sending 2911, history record deleting 2914 and notification setting 2913 and so on. The user may close the submenu of other functions and return to the typing interface by pressing other function button 2907 again.

The smart lighting mode may have one or more features presented below. 1. It may be set remotely or manually in a short range. 2. It may be set through wired or wireless communication. 3. It may control the lighting mode within each room or region based on the user's movements indoor or outdoor, or the user's moving in or out of a room, or different time periods during a day or night, or whether the user would be out for a long time. 4. It may conduct self-learning or self-adapting according to the user's habit and daily routine.

The smart lighting mode, as a component of the environment control system, may select corresponding lighting change modes according to a user's manual setting or automatic setting, from a close range or far away, in wired or wireless manner. The selection of lighting modes is based on various types of information and data received (such as security alarm, emergency weather, emergency event, temperature changing, moving or in-and-out of the user indoor and outdoor, different time periods of daytime and night, natural light changing of environment). Meanwhile, the smart lighting mode has a self-learning function, thus the lighting change modes may achieve environment control and energy saving simultaneously, through the learning of the user's habits and preferences as well as requirements for energy saving and environmental protection.

A user may operate the smart lighting mode through different interfaces, such as smart user interface or non-smart user interface, or short-range interface and remote interface, etc. In one embodiment, when the smart user interface detects that the user approaches the smart user interface, the interface will automatically change into the user interface for lighting control. In one embodiment of the short-range interface (see FIG. 19), a user may enter the smart lighting mode by pressing the light control button 1923 located on the upper right corner of the main interface, or by pressing icon 1911 located on the screen of the main interface.

Figure 30:
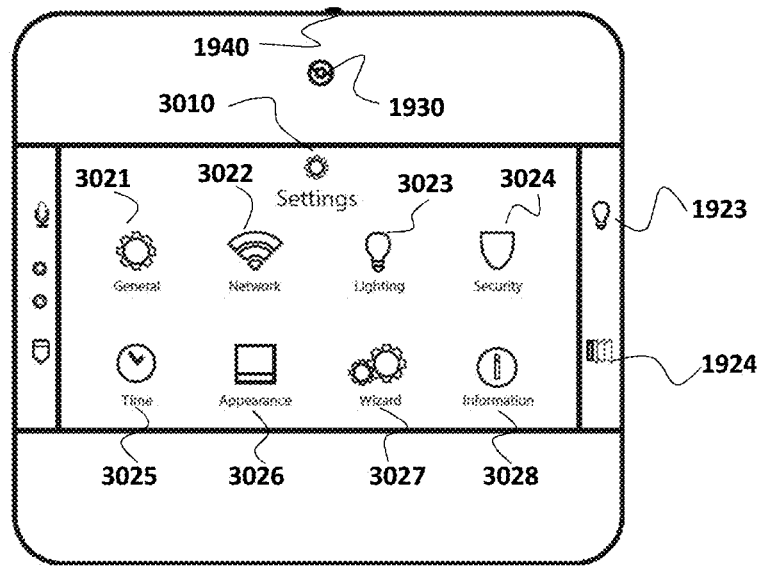
FIG. 30: Diagram of an exemplary embodiment of user interface settings.

In the short-range interface, the light setting method of the smart lighting mode may be entered by pressing the menu button 1924 located at the bottom right of the main screen. As shown in FIG. 30, the touch screen may display the settings 3010 to remind the user that the current page is the settings main interface. By pressing the lighting button 3023 on the settings main interface, the user may enter smart lighting mode settings. Interface showed in FIG. 30 may include general 3021, network 3022, security 3024, time 3025, appearance 3026, wizard 3027 and information 3028, etc., and the setting of a function may be entered by pressing the corresponding button. The content that may set by the settings interface is not limited to the description above, and other setting content may be included. For example, new home appliances or other devices may be connected to or paired with the environment control system through the setting function. The environment control system may include or provide one port or connection standard. One home appliance or other device may pair with the environment control system if the home appliance or other device has the corresponding port or connection standard. The environment control system may have one or more functions below, such as collecting or acquiring parameters or information of that device, user commanding, communicating with that device, and controlling that device, etc.

Figure 31:
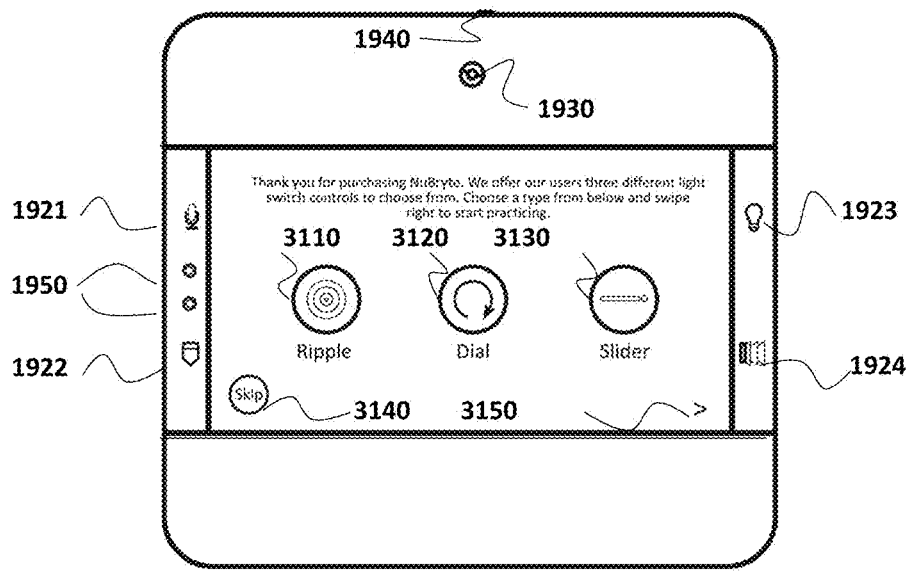
FIG. 31: Diagram of an exemplary embodiment of smart lighting mode selection.
Figure 32:
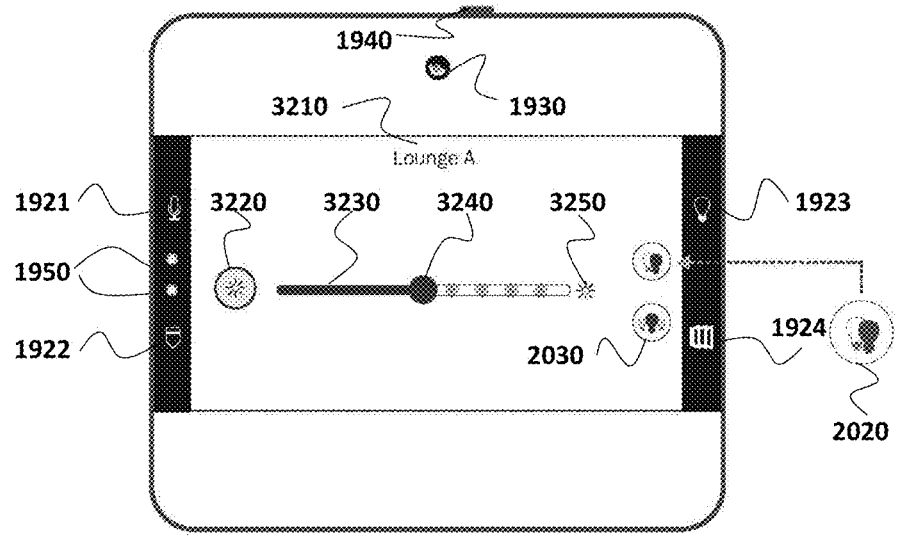
FIG. 32: Diagram of an exemplary embodiment of smart lighting mode.
Figure 33:
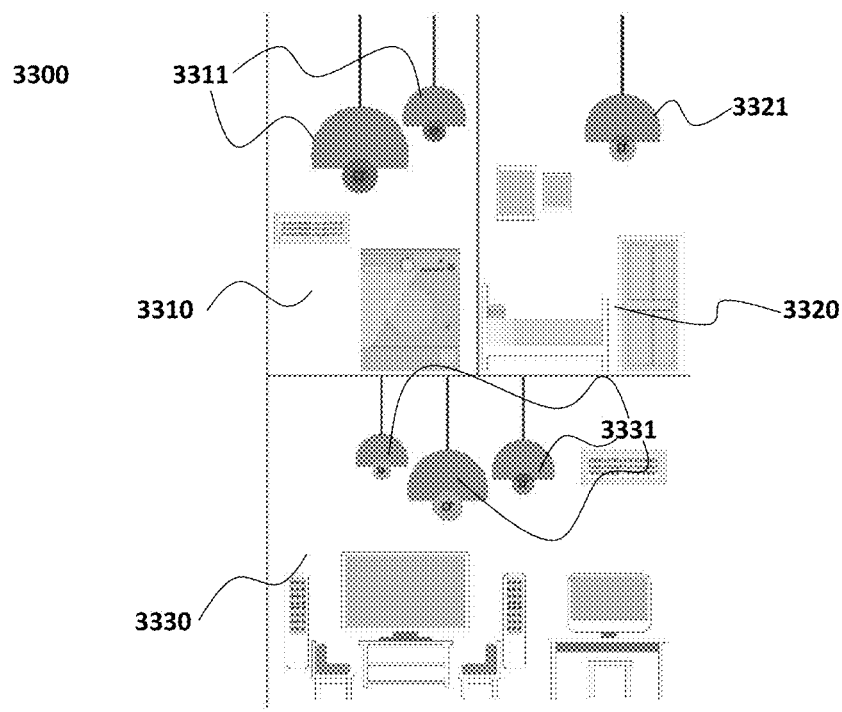
FIG. 33: Diagram of an exemplary embodiment of smart lighting multi-region control.

The luminance control of the smart lighting mode may be implemented in different ways. As shown in FIG. 31, a user may select the manual operation of ripple 3110, dial 3120 or slider 3130 on a touch screen to turn on or off a light or control luminance of the light. The interface 3100 has the skip 3140 and the more 3150 buttons. Using the dial 3120 manual operation as an example, in FIG. 32, after pressing the light control button 2020 at the upper right, the user may control the indoor light luminance via sliding the position of the slider, which indicates the luminance of indoor light. After pressing the region selection button 2030, the user may control light luminance in the different rooms shown in FIG. 33 via sliding the position of sliding button 3240 on light luminance control button 3230. Particularly, the left side of the interface indicates the darkest icon 3220 and the right side indicates the brightest icon 3250. As shown in FIG. 33, this interface may control the devices including but not limited to light device 3311, 3321, 3331 in kitchen 3310, bedroom 3320 and lounge 3330, etc.

Figure 34:
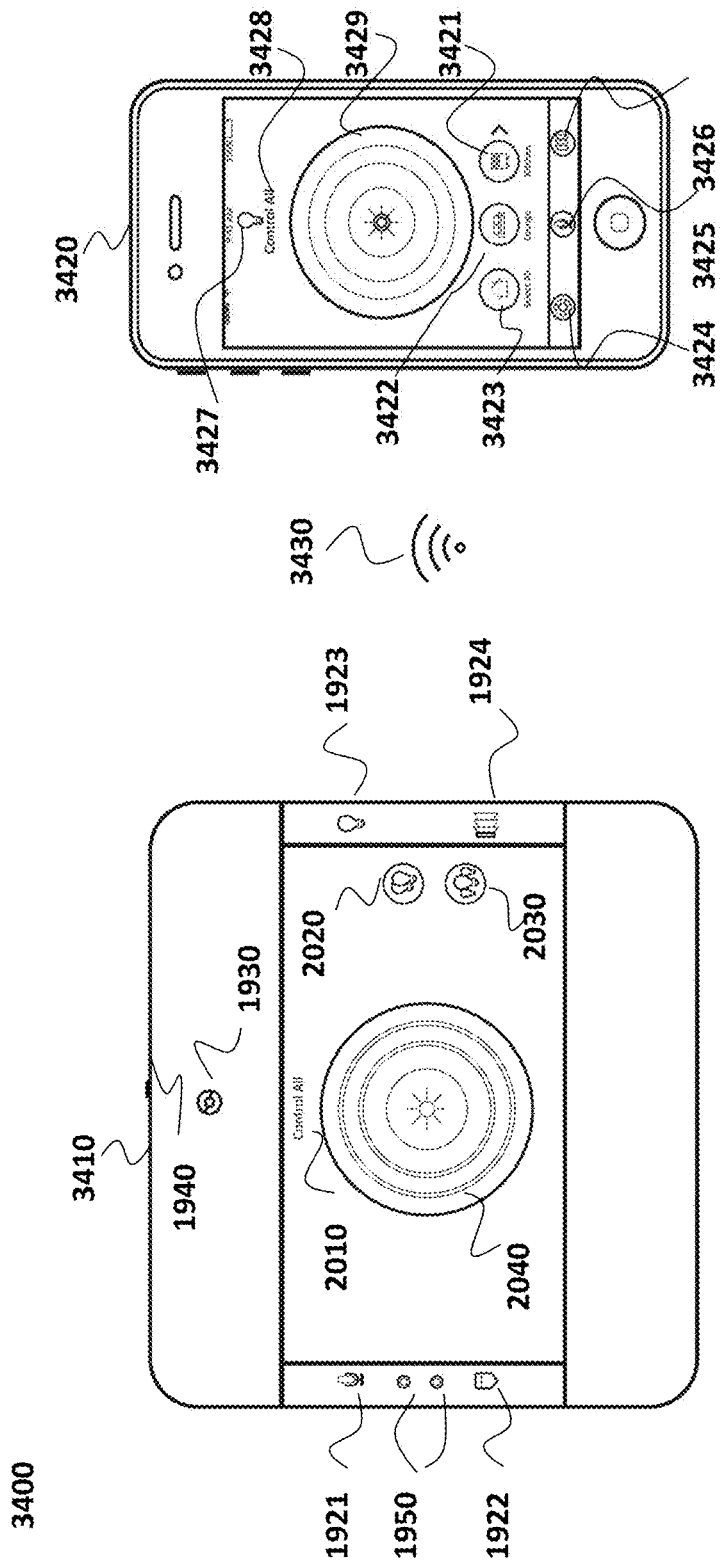
FIG. 34: Diagram of an exemplary embodiment of smart lighting remote control.
Figure 35:
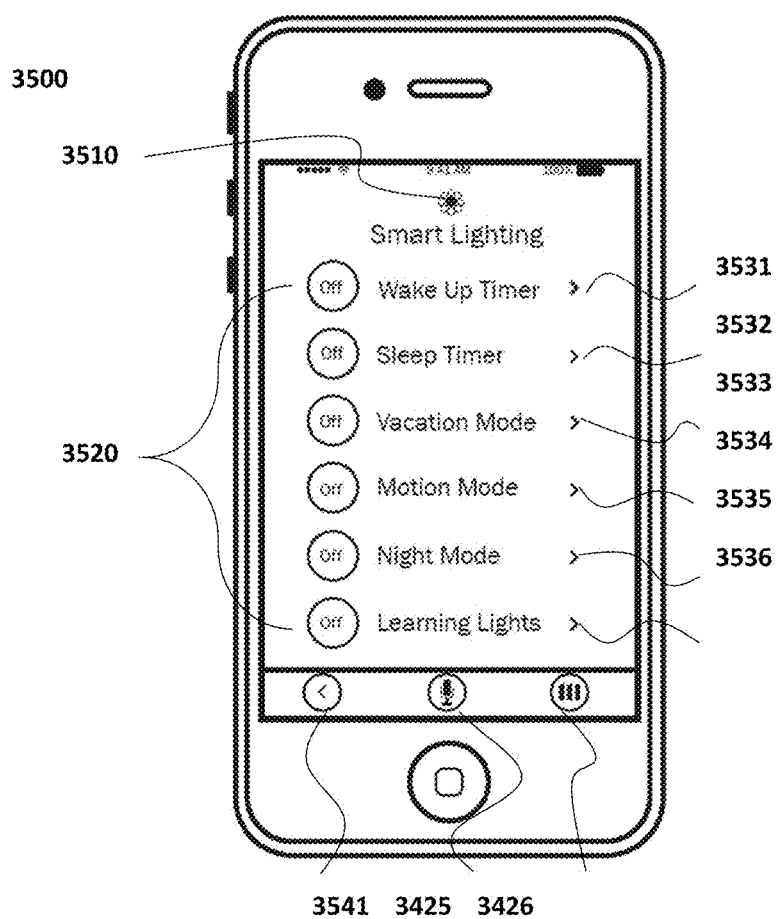
FIG. 35: Diagram of an exemplary embodiment of smart lighting.

The control of smart light mode may also be implemented in a wireless way by a user's operating through a remote interface of a mobile APP. In this application, "app" and "APP" may be used interchangeably to represent a software application. FIG. 34 is an exemplary embodiment of the mobile remote control interface: the mobile device 3420 connects to the smart switch 3410 via wireless network 3430. After a user logs in the APP interface via a family account, the touch screen may show the control panel, in the middle of which is the light icon 3427 for reminding the user that the current page is the main interface of the smart lighting mode in the remote interface. At the bottom of the interface, the smart lighting mode 3424, voice communication mode 3425 and menu 3426 may be selected. Different lighting regions may be selected in the smart lighting interface, which include, and without limitation to, select all 3423, lounge 3422, kitchen 3421, etc. The top of the interface may show region indicator 3428 and ripple light luminance control button 3429. When the smart lighting mode 3424 is chosen, the user may switch between several different smart lighting modes. These modes may selectively set corresponding lighting change modes, according to different input data of the environment control system. The input data of the environment control system include, without limitation to, security alarm caused by unknown invasion; or sudden weather change, such as rainstorm, thunder, fog and haze, typhoon, tornado, etc.; or emergency caused by geologic hazard such as earthquake, tsunami, volcanic eruption; and different time periods such as morning, noon or night; indoor and/or outdoor temperature changing detected by the temperature sensor; motion of human, animal or other moving object detected by the motion sensor, etc. As shown in FIG. 35, different smart lighting modes include, and without limitation to, wake up timer 3531, sleep timer 3532, vacation mode 3533, motion mode 3534, night mode 3535, and learning lights 3536, etc. At the bottom of the interface 3500 are return 3541, voice communication mode 3425, menu 3426, etc. Meanwhile on the top of the interface is a smart lighting notification 3510 and on the left side is a button off-on notification 3520, etc. The aforementioned description on the modes does not exhaust all possibilities of similar smart lighting modes. Apparently, for a person of ordinary skills in the art, after understanding the content and principle of the current disclosure, the form and details in the system may be modified or changed without deviating from certain principles and structures. The modifications and variations may include any combination of the modes, and these modifications and variations are still within the scope of the claims of the present application.

The following describes exemplary embodiments of the function and process of the motion mode 3534 in the smart lighting mode.

The smart lighting mode may distinguish whether the user has come back home according to information collected by sensing module 120, and if yes, then turn on the "welcome back" motion mode in smart lighting mode. Particularly, the sensing module 120 may include at least one sensor, and the sensor, other modules and external devices may have several corresponding relations as shown in FIG. 7. The sensing module 120 is also connected to the control module 130 and the external device 160. The sensor may be an external device or a component of the external device. FIG. 7 is just one embodiment of the internal structure and surrounding structure of the sensing module 120, while the sensing module 120 may have different structures and may connect to other external device in. The connection methods suggested here may be wired or wireless.

Meanwhile, the sensing module 120 may send the detected information to processing module 110 for analysis and judgment. Such information includes, without limitation to, voice, light, weight, position, temperature, humidity, pressure, current, speed and acceleration, image, text touch, pupil, fingerprint, etc., or any combination thereof. The above types of sensible data are just used for illustrative purposes, while the sensing module 120 may sense other types of data, such as user emotion and magnetic field, etc. The analysis and judgment methods of the processing module 110 may include but are not limited to comparing collected information to certain parameter (such as a reference value, reference range, threshold value, preset value or predicted value). The parameters may be set by the user or obtained by the environment control system via machine training. After analyzed by the processing module 110, if the collected information meet some parameter requirement (such as matching some reference value, entering some reference range, exceeding some threshold value/preset value/predicted value and so on), then the information may be considered as user information.

When the process module 110 makes the judgment that the user has come back home, it may call the control module 130 to implement the motion mode in the smart lighting mode, which may be but is not limited to turning on family lighting and smart lighting mode using a light-on algorithm matching the user's habits. Based on pre-set implementations, this light-on algorithm may, for example, automatically or manually turn on lights in the porch or lounge immediately, initiate smart lighting mode in the master bedroom, guest bedroom and the garage, and automatically or manually control light luminance of a room according to detected temperature change in the room, etc. Setting of light luminance may be based on the user's preference. Once triggered, the light may be maintained for a period of time, such as at least 30 minutes, until turned off by the light-on algorithm. The longest time for maintaining the light may be, without limitation to, two hours.

The implementation methods of the light-on algorithm may include software implementation mode and hardware implementation mode. Software implementation mode may include C, C++, Python, Java, JavaScript, Fortran, Visual C++, and assembly language. Hardware implementation mode may include single chip, integrated circuit, and chip, etc. Computer devices that may be used include, and without limitation to, personal computer, server and microelectronic devices, such as personal desktop, personal laptop computer, PDA, tablet computer and other embodiments disclosed in the present specification. The embodiments mentioned above are just for the convenience of illustration, while the controllable software and hardware may include other aspects, such as, smart anti-theft mode and vehicle electronic mode, etc.

The following describes exemplary embodiments of the function and process of the night mode 3535 in the smart lighting mode:

The smart lighting mode may determine whether the current time is within a certain preset time range, such as late night, and whether a user is still wake and active in a room based on activity information collected by the sensing module 120. Based on these judgments, the smart light mode may initiate the soft-light night mode in the smart lighting mode. Particularly, the sensing module 120 may include at least one sensor, and the senor, other modules and external devices may have several corresponding relations as shown in FIG. 7. The sensing module 120 is also connected to the control module 130 and the external device 160. The sensor may be an external device or a component of the external device. FIG. 7 is only one embodiment of the internal and surrounding structures of sensing module 120, and sensing module 120 may also have different structures and connect with different peripheral devices. The connection methods suggested here may be wired or wireless.

Meanwhile, the sensing module 120 may send the detected information to the processing module 110 for analysis and judgment. Such information may include but is not limited to voice, light, weight, position, temperature, humidity, pressure, current, speed and acceleration, image, touch, pupil, fingerprint, etc., and any combination thereof. The above mentioned types of sensible data are just provided for illustrative purposes, while the sensing module 120 may sense other types of data, such as time, user emotion and magnetic field, etc. The analysis and judgment methods of the processing module 110 may include but are not limited to comparing collected information to certain parameters (such as a reference value, reference range, threshold value, preset value or predicted value). The parameters may be set by the user or obtained by the environment control system via machine training. After analyzed by the processing module 110, if the collected information meets some parameter requirement (such as match some reference value, enter some reference range, exceed some threshold value/preset value/predicted value and so on), the processing module may determine that the user is up and active at night.

After the processing module 110 makes the judgment that the user is up and active, the control module 130 may be called to implement the night mode of the smart lighting mode, which may be but is not limited to initiating a light-on algorithm for soft light. Based on pre-set implementation procedures, or based on the user's activity type, range and habits this light-on algorithm may automatically control light luminance in the user's room or nearby rooms, or automatically or manually control light luminance of a room according to detected temperature change in that room, etc. In one embodiment, the light-on algorithm may set a time range of the user's night activity (including but not limited to, for example from 11 p.m. to 5 a.m.), and rise the light luminance to the user's anticipated level in a short time (such as 10 seconds). If the user stops the activity, the light sensor will gradually reduce its input, and extinguish the light after, for example, 15 seconds.

The implementation methods of the light-on algorithm may include, without limitation to, software implementation mode and hardware implementation mode. Software implementation mode may include, without limitation, C, C++, Python, Java, JavaScript, Fortran, Visual C++, and assembly language. Hardware implementation mode may include, without limitation to, single chip, integrated circuit, and chip, etc. Computer devices that may be used include, without limitation to, personal computer, server and microelectronic devices, such as personal desktop, personal laptop computer, PDA, tablet computer and other embodiments disclosed in the present specification. The embodiments mentioned above are just for the convenience of illustration, while the controllable software and hardware may include other aspects, such as smart anti-theft mode and vehicle electronic mode, etc.

The following is a description of exemplary embodiments of the function and process of the self-learning mode 3536.

The smart lighting mode may adjust the manner of its initiation and use, according to data of the user's daily activity and habits collected by the cloud server 540, which is connected to the communication mode 140. Particularly, first, the storage unit of the processing module 110 may record the user's habits in operating and adjusting the smart lighting mode under different conditions. The different conditions may include, and without limitation to, security alarm caused by unknown invasion; or sudden weather change, such as rainstorm, thunder, fog and haze, typhoon, tornado, etc.; or emergency caused by geologic hazard such as earthquake, tsunami, volcanic eruption; and different time periods such as morning, noon or night; indoor and/or outdoor temperature changes detected by the temperature sensor; motion of human, animal or other moving object detected by the motion sensor, etc. These data of the user's daily habit and preference may be uploaded via the communication module 140 to a server, such as the cloud server 540, local area network server, wide area network server, etc. The cloud server 540 may be built into the environment control system, or may be a third party server external to the environment control system. The communication mentioned herein generally refers to two-way signal acquisition, and the signal may include, without limitation to, code, numeral, text, image, audio or video, etc.

According to the server data of a user's daily habit and preference, the processing module 110 may call the control module 130 to implement self-learning mode in the smart lighting mode, which may include but is not limited to a light learning algorithm based on the user's habit. In one embodiment, the light learning algorithm may automatically save and upload the user's habit data, analyze the user's habitual behaviors of adjusting lighting, and simulate the user's behavior. Particularly, this algorithm may compare the user's habit data to certain parameters (such as a reference value, reference range, threshold value, preset value or predicted value). The parameters may be set by the user, or may be obtained by the smart lighting mode via machine training. After processed by the processing module 110, if these data meet some parameter requirements (such as conforming to some reference value, entering some reference range, exceeding some threshold value/preset value/predicted value, etc.), then these data may be modified according to certain predetermined optimization algorithms, including but not limited to least squares method, variational method, steepest descent method or other dynamic optimization algorithms, adjust light luminance accordingly, and record user's feedback.

The implement methods of light learning algorithm may include, without limitation to, software implementation mode and hardware implementation mode. Software implementation mode may include, without limitation to, C, C++, Python, Java, JavaScript, Fortran, Visual C++, and assembly language. Hardware implementation mode may include, without limitation to, single chip, integrated circuit, and chip, etc. Computer devices that may be used include, without limitation to, personal computer, server and microelectronic devices, such as personal desktop, personal laptop computer, PDA, tablet computer and other embodiment disclosed in the present specification. The examples mentioned above are just for the convenience of illustration, while the controllable software and hardware may include other aspects, such as smart anti-theft mode and vehicle electronic mode, etc.

The following is a description of the exemplary embodiments of function and process of the wake up timer 3531 and sleep timer 3532:

Smart lighting mode may distinguish different time periods and user's status according to the information collected by the sensing module 120, thereby entering the wake up mode 3531 or sleep mode 3532 accordingly. Particularly, the sensing module 120 may include at least one sensor (e.g. a timer). The senor, other modules and external devices may have the various corresponding relationship as shown in FIG. 7. The sensing module 120 is also connected to the control module 130 and the external device 160. The sensor may be an external device or a component of the external device. FIG. 7 shows only one exemplary embodiment of the internal structure of sensing module 120 and some peripheral devices. Sensing module 120 may also have different structures and be connected with different peripheral devices. The connection methods suggested here may be wired or wireless.

The sensing module 120 may determine corresponding time periods via the timer, including, without limitation to, midnight, early morning, morning, dusk, night, late night, etc. Meanwhile, the sensing module 120 may send the detected information to processing module 110 for analysis and judgment. The forms of information may include, without limitation to, any one or combination of voice, light, weight, position, temperature, humidity, pressure, current, speed and acceleration, image, touch, pupil, fingerprint etc. The content of information also includes, without limitation to, the detected change of sunlight intensity in the morning, change of seasons or weather conditions, the wake-up time (e.g., seven o'clock) set by the user through the user interface of mobile device, computer or the environment control system. The exemplary types of sensible data mentioned above are just intended for illustration, and the sensing module 120 may also sense other types of data, such as user's emotion and magnetic field, and user's status of deep sleep, etc. The analysis and judgment method of the processing module 110 includes, without limitation to, comparing collected information to certain parameters (such as a reference value, reference range, threshold value, preset value or predicted value). The parameters may be set by the user or obtained by the environment control system via machine training. After processed by the processing module 110, if these data meet some parameter requirements (such as conforming to some reference value, entering some reference range, exceeding some threshold value/preset value/predicted value, etc.), then the control module may then judge that the user is in corresponding state of activity, including but not limited to sleep such as shallow sleep and deep sleep; low-strength activity such as but not limited to reading, walking and watching TV; high-strength activity, such as physical training, exercising, partying, etc.

After the processing module 110 makes a judgment about the user's status of activity, it may call the control module 130 to execute the wake up mode 3531 or sleep mode 3532, so as to modify the family smart lighting mode through for example algorithms adapted to the user's habit. The wake up mode algorithm may wake a user naturally and gradually by increasing the room luminance progressively. As one embodiment of the wake up mode algorithm, the wake up mode algorithm may raise the luminance from 0% to 100% in a short time according to current season and/or weather. Particularly, 0% represents the minimum luminance of the light and 100% represents the maximum luminance of the light (the given numerical range is only for illustrative purpose). The user may also manually control the luminous intensity of the light. After a period of time, the luminous intensity may recover gradually (e.g., in five seconds) to the normal indoor luminous intensity. Events that trigger gradual increase of luminous intensity and/or the normal indoor luminous intensity may be set by the user. The sleep mode algorithm may gradually reduce indoor light luminance, thereby decreasing the user's activity level to be ready for sleeping. As one exemplary embodiment of sleep mode algorithm, the luminous intensity of light may gradually drop to 0% and then completely shut down after some buffering time.

The implementation methods of the light wake up mode 3531 and sleep mode 3532 may include but are not limited to software implementation mode and hardware implementation mode. Software implementation mode may include but is not limited to C, C++, Python, Java, JavaScript, Fortran, Visual C++, and assembly language. Hardware implementation mode may include but is not limited to single chip, integrated circuit, and chip, etc. Computer devices that may be used include but are not limited to a personal computer, server and microelectronic devices, such as personal desktop, personal laptop computer, PDA, tablet computer and other embodiment disclosed in the present specification. The examples mentioned above are just for the convenience of illustration, while the controllable software and hardware may include other aspects, such as smart anti-theft mode and vehicle electronic mode, etc. The above descriptions only cover the main process of the above specific embodiment, and should not be deemed as the only embodiment. Each mentioned step is not essential, and the whole process along with specific steps may not be limited to the drawing or the descriptions above. Obviously, for a person of ordinary skill in the art, after understanding the content and principle of the current disclosure, the form and details in the process may be modified or changed without departing from principles and structures of the present disclosure. The modifications and changes are still within the scope of claims in the current disclosure.

Figure 36:
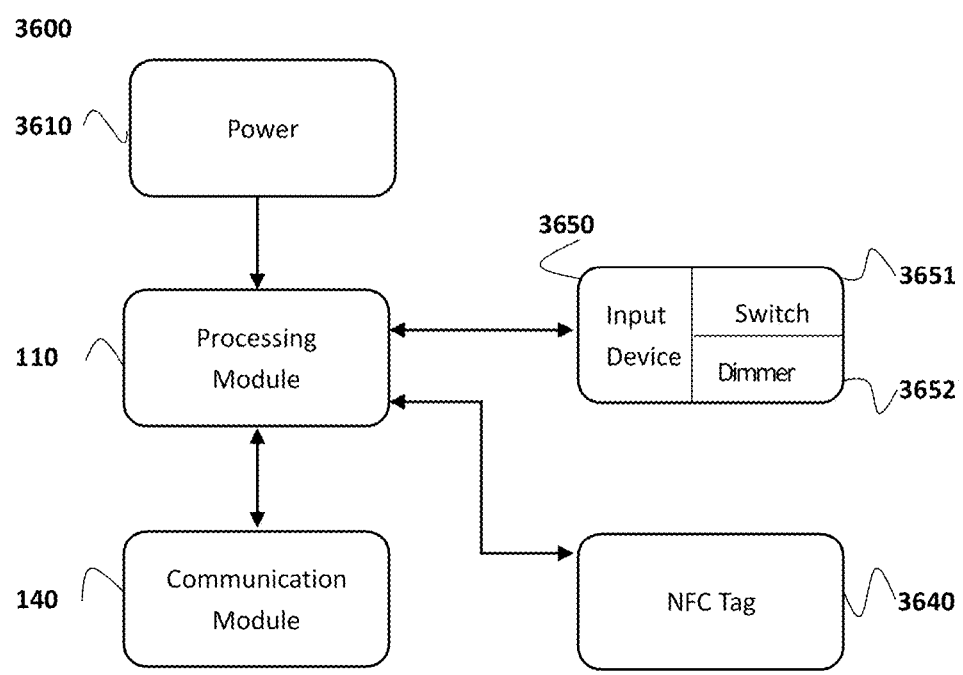
FIG. 36: Diagram of an exemplary embodiment of smart switch tag.

FIG. 36 is an exemplary embodiment of the smart switch tag. Power 3610 is responsible for charging the processing module 110. The power 3610 includes, without limitation to, an external power, an internal storage battery or a built-in power-generating device. The processing module 110 may be used as a processing unit, and the processing module 110 may establish bi-directional communications with the communication module 140, the processing module 110 may establish bi-directional communications with the input device 3650, and the processing module 110 may establish bi-directional communications with the NFC tag 3640. The processing module 110 may be an integrated circuit of any type, including but not limited to a small scale integrated circuits, a medium scale integrated circuits, a large scale integrated circuits, a very large scale integrated circuits, an ultra large scale integrated circuits or a Gigascale integrated circuits. The communication module 140 is mainly responsible for the communication within the environment control system, between the environment control system and external devices, and between the environment control system and/or external devices and other systems or devices. The communication includes, without limitation to, wired communication and wireless communication. The wireless communication includes, without limitation to, radio communication, free-space optical communication, sonic communication, electromagnetic induction, etc. The NFC tag 3640 is an integrated circuit that is designed based on some specific standards. It may have its own storage unit and may have the reading-and-writing function. The NFC tag 3640 may be responsible for conducting near field communications with other devices, and smart switch tag 3600 may pair with other devices via near field communications. The input device 3650 may receive external input data. The input data may be characterized by the processing module 110 into three modes: on, off, and load control. The three modes control connections, disconnections and powers of the load, respectively. The three modes may be controlled by the switch 3651 and the dimmer 3652. After a corresponding mode has been recognized, the processing module 110 transmits an instruction to other paired devices via the communication module 140 according to the recognized mode, and the other paired devices may receive and execute the instruction transmitted by the processing module 110.

FIG. 37 is an appearance design of a smart switch tag. The appearance of a smart switch 3600 may be as shown in FIG. 3700-A or FIG. 3700-B. In FIG. 3700-A, 3710-A is a frame of the smart switch tag 3700-A; 3720-A is a circular knob used for lighting adjustment, which may be turned to adjust luminous intensity. 3710-B is a frame of the smart switch tag 3700-B; 3720-B is a bar-shaped knob of lighting adjustment, which may be turned vertically to adjust the luminous intensity.

Figure 38:
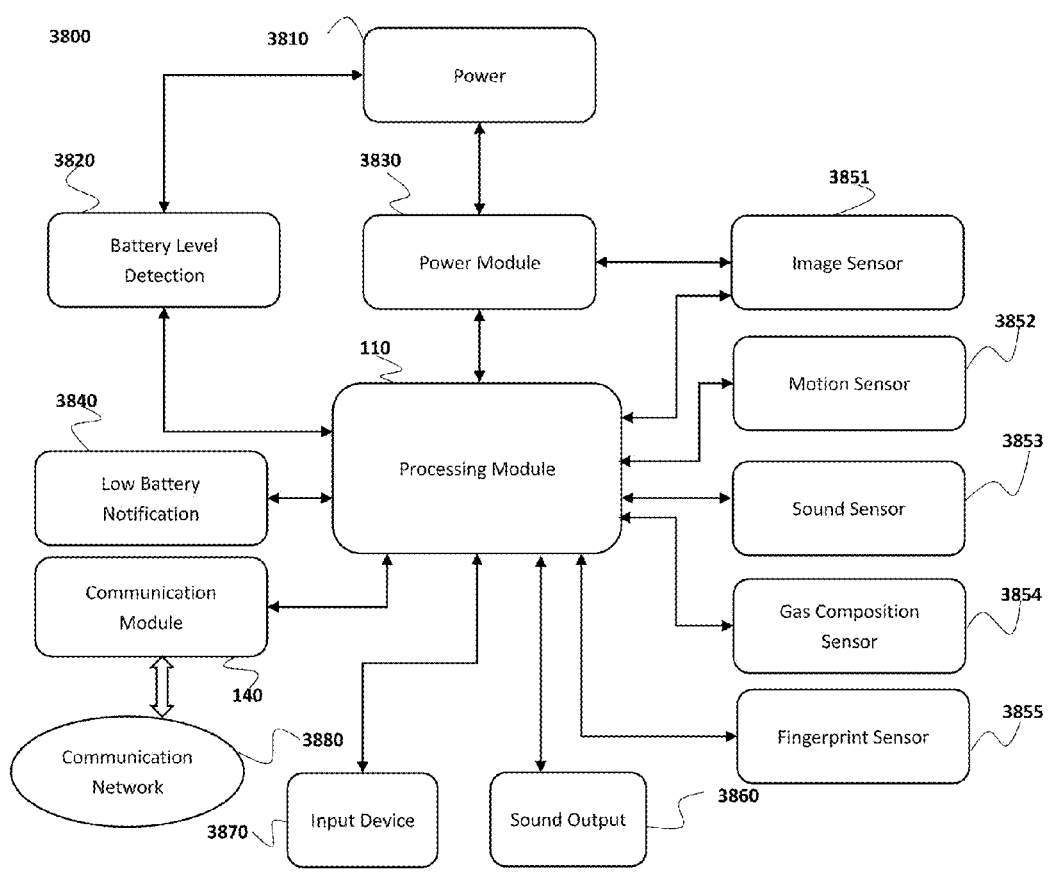
FIG. 38: Diagram of an exemplary embodiment of security mode.

FIG. 38 shows a smart doorbell mode. In some embodiments, the smart doorbell mode may be part of the smart security mode. The processing module 110 may communicate bi-directionally with a battery level detector 3820, an image sensor 3851, a communication module 140, a motion sensor 3852, a sound sensor 3853, a gas composition sensor 3854, a fingerprint sensor 3855 and an input device 3870. The processing module 110 may receive electrical signals transmitted by sound sensor 3853. After being received and processed by the processing module 110, the electrical signals are then transferred to the sound output 3860. The sound output 3860 outputs the received electrical signals. The input device 3870 includes, without limitation to, a keyboard, a button, a touch screen, a scanner, a light pen, a mouse, a handwriting panel, a joystick, etc. Input device 3870 may be one device or a combination of any number of devices from the above-mentioned devices. The power 3810 is responsible for supplying power to the security mode; the power module 3830 transforms the current generated by the power 3810 to a certain form and transfers it to the processing module 110 and the image sensor 3851. The battery level detector 3820 is responsible for detecting the status of the power 3810; the battery level detector 3820 is responsible to transmit the detected status of the power 3810 to the processing module 110, and the processing module 110 may configure the battery level detector 3820 such that it works in a specific way. When detecting a certain power status transmitted from the battery level detector 3820, the processing module 110 may send certain instructions to the low battery indicator 3840. The processing module 110 may receive data transmitted by the image sensor 3851, and the processing module 110 may send certain instructions to the image sensor 3851. The image sensor 3851 may recognize a plurality of contents, including but not limited to, any one or combination of facial characteristics, body characteristics, voice/sound characteristics and motion characteristics. Facial characteristics include, and without limitation to, one or more characteristics of body height, volume, body proportion, etc. Voice/sound characteristics include, without limitation to, any one or combination of pitch, quality, frequency, fluency, or key words, of users' voice or walking sound. Motion characteristics include, and without limitation to, one or more of body movements (such as movements of heads, arms or legs), speed, or acceleration, etc. The motion sensor 3852 detects whether motion exists in the ambient environment by monitoring one or more environmental variables. For example, the motion sensor 3852 may irradiate microwaves to the ambient environment, and the motion sensor 3852 may determine whether motion is occurring based on the reflected microwaves using the Doppler effect. It should be understood that the irradiation of microwaves by the motion sensor 3852 mentioned above is merely an illustrative example. Apparently, after understanding basic principles of the Doppler effect, a person skilled in the art may make various modifications and variations in forms or details (such as using an infrared radiation) in regards to the manner and steps of the motion sensor 3852 without departing from the basic principles. These modifications or variations are considered to be within the scope of present disclosure. Sound sensor 3853 may collect sound information, including but not limited to pitch, quality, and frequency of any sound. The gas composition sensor 3854 may monitor and/or detect gas composition and/or content within a specific space. The gas may be from the environment or from human bodies. Gases from the environment include, and without limitation to, carbon monoxide, carbon dioxide, oxygen, ozone, ammonia, methane, formaldehyde, benzene and its analogues, smoke and fog, and any other organic or inorganic gases. Gases from human bodies include pheromones and other smells originated from the human body. The fingerprint sensor 3855 may recognize fingerprints. Fingerprints may include, and without limitation to, human fingerprints, fingerprints of certain animals (e.g., gorillas, chimpanzees), palm prints of human and/or some animals, toe prints of human and/or some animals and foot palm prints of human and/or some animals. The communication module 140 is mainly responsible for the communication between the environment control system and external devices, as well as communication between the system and/or external devices and other systems or devices. The communication module 140 communicates with the external environment via communication network 3880, and the means of communications include, and without limitation to, wired communications and wireless communications. Wireless communications include, and without limitation to, radio communication, free-space optical columniation, sonic communication, and electromagnetic induction, etc.

It should be noted that the above illustrations of the exemplary sensors are only to provide a better understanding. Apparently, after understanding basic principles of various sensors, a person skilled in the art may make various modifications and variations in forms or details in regards to the manner and steps of sensors, add new sensors, or simplify some existing sensors, according to the practical needs. These modifications or variations should be considered within the scope of present disclosure.

Figure 39:
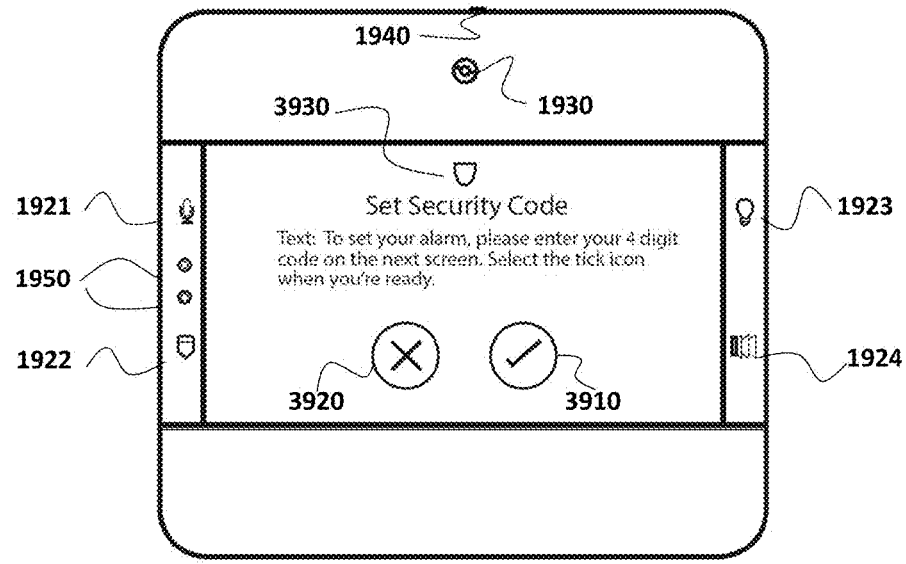
FIG. 39: Diagram of an exemplary embodiment of security mode.
Figure 40:
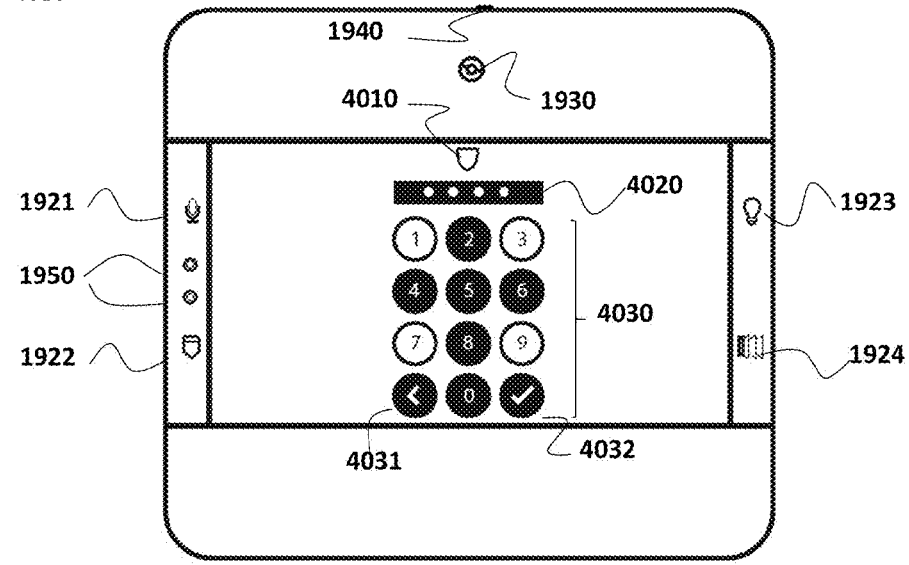
FIG. 40: Diagram of an exemplary embodiment of security mode.

FIG. 39 is an embodiment of the security mode in the environment control system. Via the operation interface of the environment control system, the user may set the security password to start the security mode. A touch screen may display instructions to notify the user that the present interface is related to the security mode. There may be instructions 3930 on the touch screen to tell the user that a security password needs to be input to start the security mode. If the user chooses not to start the security mode, the user may click on the cross mark (X) 3920. The user may click on the check mark (√) 3910 to continue to enter an interface for inputting password. The user may input the password via a numeric keyboard on the touch screen. If the environment control system enables passwords that may include other characters (for example, letters and special symbols), the keyboard on the touch screen may include corresponding characters. When clicked by the user, the number may be illuminated to enable the user to see the input content. The illumination of the numbers may end in a period of time after the clicking ends, for example, 1 second, 2 second, 3 seconds, or longer. As shown in FIG. 40, the touch screen may display the security mode instruction icon 4010, the number of digits in a user-input password 4020, and numeric keyboard 4030. A user may click on the check mark (√) 4032 to confirm the completion of input, and may also click on the backward mark (←) 4031 to undo the latest input.

Forms of a security password may include, and without limitation to, a physical key, a numeric password, an alphabet password, a sound/voice password, an image password, a fingerprint password, an iris password, and an electromagnetic password. A password may also be a combination of the forms mentioned above. If the security password is a combination of symbols and numbers, the respective length of symbols and numbers and total length of the password may be determined based on specific scenarios. The environment control system may specify the composition of the security password to enhance its security level. For example, the environment control system may specify the shortest length for the password, or the composition of password (e.g., at least one digit of number, one letter in upper case, one letter in lower case, and one special symbol), etc. The password may be used as an authentication of a user's privilege to enter a house or certain part of the house. Besides, the password may also be used to confirm a user's access permission to the environment control system. One environment control system may have several passwords and different passwords may specify different entrance permissions and/or access permission. For example, a first password may provide the full entrance privilege (e.g., the privilege to enter any part of the house) and access privilege (e.g., privilege to set and change the whole or part of the environment control system, for example, air conditioning modes, security modes, or smart lighting modes). The first password may be provided to administrators of the environment control system where the environment control system is installed (the administrators may be, for example, the owners of the house). The first password may be provided by the environment control system as the primary password. The first password may be set by the administrator. The environment control system may ask the administrator to provide the primary password prior to setting the first password. If an administrator forgets the first password, the environment control system may allow the administrator to retrieve or reset the first password. A second password may provide partial entrance privileges without providing any access privilege. The second password may be offered to other persons such as children in a family. The children may enter certain parts of the house, but not other parts where the children may encounter dangers, such as a swimming pool, a bathroom, or a workshop where machines are installed. The children may not change system devices when they are provided with the second password. A third password may provide partial entrance privileges (such as, the privileges to access part rather than all areas of the house), along with partial access privileges (such as the privileges to set and change certain devices within the environment control system to modes other than security modes, for example, air conditioning mode, and smart lighting mode, etc.). The third password may be provided to persons such as housekeepers, as they may need to enter rooms that require cleaning, whereas other parts of the house have restricted access. The housekeepers may be able to change several devices within the environment control system when they are provided with the third password. The security passwords are stored in the environment control system and may be retrieved when other modules are executing the functions of the security mode.

Figure 41:
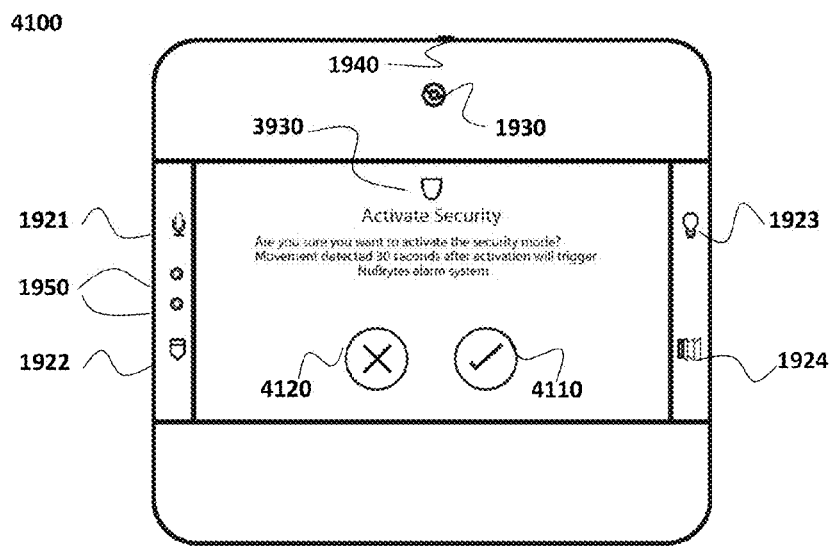
FIG. 41: Diagram of an exemplary embodiment of security mode.

As shown in FIG. 41, after a password is input into the security mode, the interface 4100 may display instructions 4130 asking whether or not to initiate the security mode, along with a cross mark (X) 4120 indicating "cancel" and a check mark "√" 4110 indicating "confirm." The security mode may have two states, enabled and disabled. If the security mode is enabled, the sensing module 120 may then start to monitor and information collected may be used to determine whether certain suspicious target (such as an unknown person, a robber, and any other target who does not know the security password has appeared). Sensing module 120 may include several sensors, as described in other parts of this disclosure. For illustrative purpose only, the sensing module 120 may detect information regarding the existence of moving objects. The methods of detecting such information may include, and without limitation to, acquisition of video containing image and sound information using a video recording device. It shall be noted that the exemplary embodiment of the detection of moving objects by sensing module is provided for better understanding. Other information by which the appearance of a suspicious target may be determined, such as sound, light, weight, temperature, pressure, velocity and acceleration, iris, human face and combinations thereof, may also be detected by the sensing module 120. For example, the sensing module 120 may detect human facial information for further analysis.

The sensing module 120 transfers detected information to the processing module 110 to conduct analysis and determination. The determination includes, without limitation to, comparison of collected information with a certain parameter (such as a reference value, a reference range, a threshold, a preset value, or a predicted value). The parameter may be set by a user, or acquired by the environment control system via a self-learning process. After analyzed by the processing module 110, if collected information satisfies requirement of certain parameters (such as conforming to some reference value, entering in some reference range, exceeding some threshold or predetermined or predicted value, etc.), then the information is deemed to be suspicious information, and the environment control system may take a corresponding reaction to the suspicious information. The reaction is for the further determination of whether the suspicious information is a security breach or not. The ways of determination include, and without limitation to, a time constraint imposed on the user to input the correct security password to the environment control system to lift the suspicious information. The length of the time period, such as 20, 40 or 60 seconds, may be preset by the user, or acquired by the environment control system according to a self-learning function. If information transmitted into processing module 110 from the sensing module 120 does not fulfill the requirement of certain parameter (such as inconsistency with some reference value, being out of some reference range, failing to reach some threshold or predetermined or predicted value) the information will be deemed safe and may be deleted or stored for other purposes.

If the suspicious information fails to be lifted within a period of time, the processing module 110 starts to send instructions to one or more modules of the sensing module 120, the control module 130, and the communication module 140. Particularly, instructions sent to the sensing module 120 may include action instructions to the sensing module, if the sensing module 120 has a camera. The action instructions include, and without limitation to, controlling an angle, focal length, resolution, shooting modes, shooting duration, etc. Instructions sent to the control module 130 may include turning on, off, or adjusting content controlled by the control module 130. The contents that may be controlled by the control module 130 include, and without limitation to, controlling electric current, motors, or computing devices, etc. Particularly, the current control includes, without limitation to, control of connecting and disconnecting currents of external devices; control of motors includes, without limitation to, control of the "on/off" states, displacement, velocity, acceleration, rotating angle, angular velocity, angular acceleration of the motors, etc.; the control of computing devices includes, and without limitation to, controlling personal computers, servers, and micro electronic devices. If the control module 130 has an alert device, instructions may include, and without limitation to, turning on or off the alert device. Instructions sent to the communication module 140 may be to detect the network environment, to confirm the receiving terminal, to connect or terminate communication, to transfer destination information, etc. It should be noted that instructions sent to other modules by the processing module 110 are not limited to the examples listed above. Those skilled in the art may make adjustments according to particular needs without further innovation. At night, infrared technology may be selected by the video collecting sensor in the sensing module 120 in order to record without disturbing the suspicious target. Besides, if the processing module 110 sends instructions to several modules, the order, level of control, frequency of action may be set by the user, or acquired by the environment control system or the security mode through self-training according to the practical scenario. For example, the processing module 110 may first send an instruction to the sensing module to let its camera track and record suspicious information; then send instructions to the control module 130 to turn on the alert device and let the light flash; finally send an instruction to the communication module 140 to establish communication connection and transfer the suspicious information to the user's reading terminal. The processing module 110 also may send above instructions to the sensing module 120, the control module 130 and the communication module 140 simultaneously.

Figure 42:
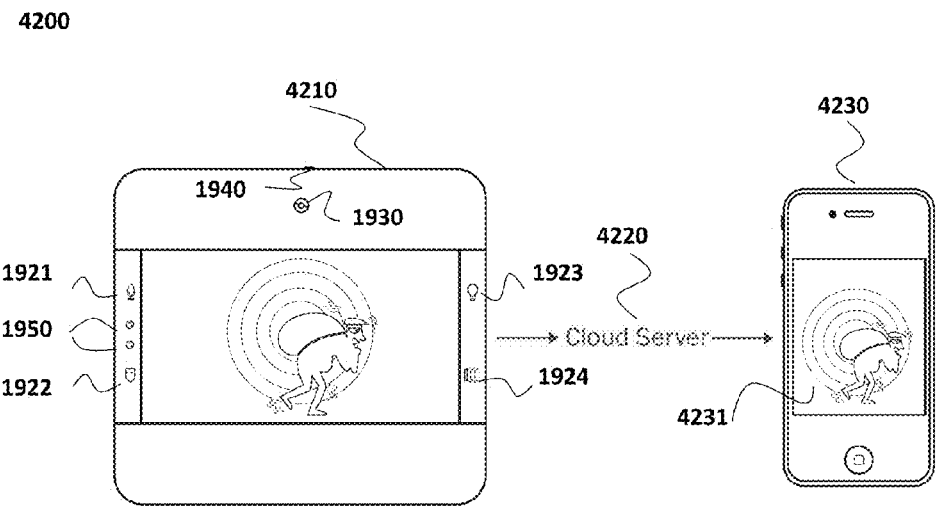
FIG. 42: Diagram of an exemplary embodiment of security mode remote control.

Further, as shown in FIG. 42, the smart switch 4210 may send the collected information, such as but not limited to sound, video, actions, and any other information of objects, etc., to the user's mobile device 4230 via the cloud server 4220, and the mobile device 4230 may display the corresponding information 4231. In addition to monitoring and sending alerts for the indoor living environment, the security mode may also monitor and send alerts for the external environment. Furthermore, a device in the security mode may be installed on the porch to monitor the security condition near the porch and the front or rear yard. For example, the device may monitor if anybody passed through the porch. In the case that a motion of an object is detected and the object's dimension and moving pattern satisfy some reference values (such as a threshold, a predetermined or predicted value), information related to these changes may be recorded automatically. The related information includes but is not limited to, sounds, images, videos, actions or identity of objects, etc. The information may be sent to the user in a way as shown in FIG. 42, and the user may be able to take further actions on a device such as a mobile device or personal computer. This function may prevent a delivered package a courier has laid at the porch from being stolen, or prevent somebody from entering the front or rear yard illegally. The above examples are for illustrative purpose and applications of the security mode may be of other types as well, such as time-dividing or zone-dividing control over a target area. Various rooms in a house may be assigned with different weights according to the values of items stored in the rooms. For instance, a study room, a collection room, and rooms having a window that may be easily broken through may be assigned a highest security level; rooms such as a lounge, a kitchen, a bedroom may be assigned a moderate security level; and rooms such as a restroom or a bathroom may be assigned a lowest security level. For different security levels, the strength of security (such as if the security mode is on for the whole day or if password authentication is required) may be different. Additionally, the rooms may be divided into different zones according to their relative positions, such as upstairs rooms or downstairs rooms. During daytime, when the family is not at home, security mode for upstairs and downstairs rooms may be turned on; at night, when the family is upstairs, security mode for upstairs rooms may be turned off temporally, while security mode for downstairs rooms may be turned on. The time-dividing and/or zone-dividing may serve the energy-savings and/or other purposes. Persons skilled in the art, may also make other expansions or modifications, and such variations are deemed to be within the scope of the present application.

The user, after receiving suspicious information, may make the final judgment. Assuming the suspicious information is confirmed, the system itself may take some defensive measures such as automatic calling the police, sending the alerting information, determining whether or not doors of bedrooms are closely locked to ensure personal safety, etc., after the instructions are transmitted to the environment control system.

It is noteworthy that the steps and modules of security mode described above are for illustrative purpose only. In real implementation scenarios, a person having ordinary skill in the art may make expansions or modifications to the steps or modules without any innovation. For example, the sensing module 120 may bypass the processing module 110 to exchange data with the control module 130 or communication module 140 directly. Accordingly, with respect to the processing flow, information collected by the sensing module 110 may influence the control module 130 or be transmitted via the communication module 140 directly, without being processed by the processing module 110. These variations are still within the scope of the present application.

Figure 43:
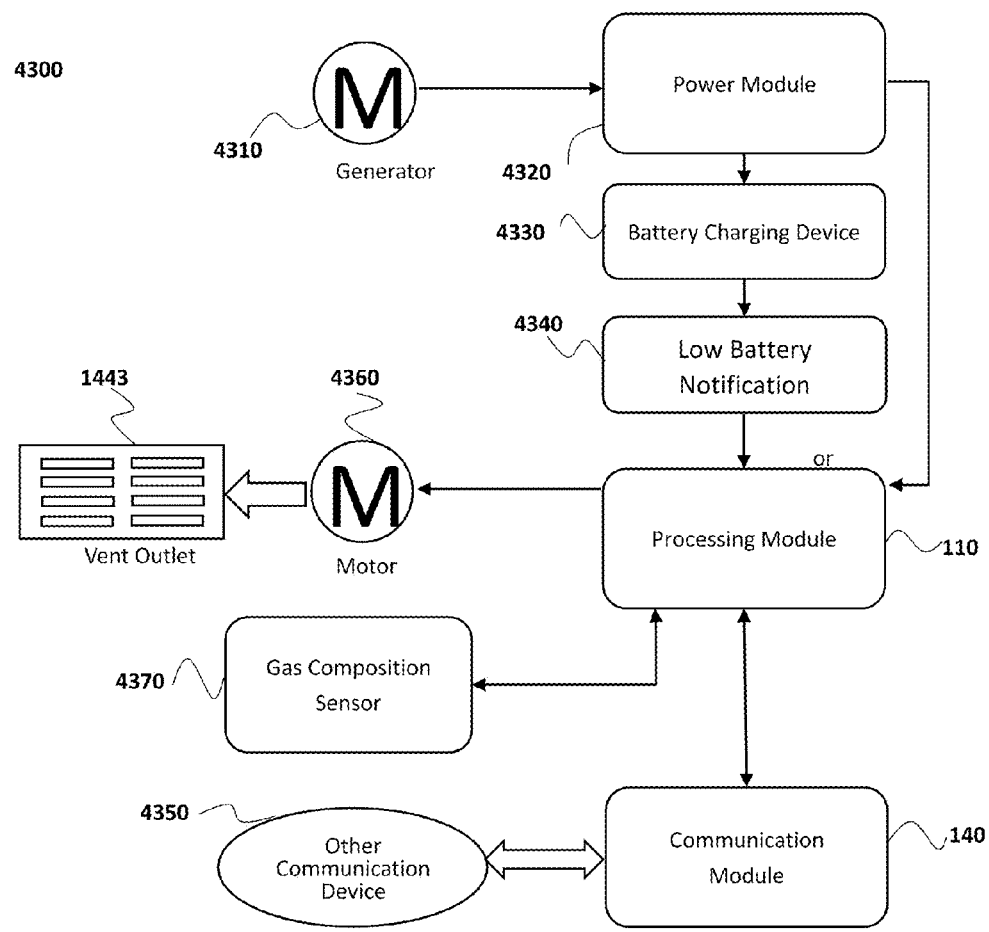
FIG. 43: Diagram of an exemplary embodiment of smart ventilation mode.

FIG. 43 illustrates an exemplary embodiment of the control of an external device by the environment control system.

As shown in FIG. 43, the generator 4310 is in connection with the processing module 110 via the power module 4320 of the environment control system. The generator 4310 may be a power source capable of supplying power to the environment control system, including but not limited to an external power, a storage battery, and a generator, as described in other disclosures herein. The power module 4320 may supply power to the processing module 110 directly, or may supply power to the processing module 110 via a battery charging device 4330. The battery charging device 4330 may use a rechargeable battery. Detailed descriptions of the battery charging device can be found in other parts of the disclosure herein. In the environment control system, certain ways may also be adopted for the convenience for the power management. By way of example and without limitation, setting low battery notifications 4340, setting specific icons on the user operation interface to show parameters such as the mode of power supply (such as external power, storage battery, or power generator, etc.) and the mode of existing power (for example, indicated by blocks or percentages) or the state of charging (charging or not charging). The system may set a lowest threshold or safety threshold for the existing power, and when the existing power is lower than the threshold, some measures may be taken by the system to notify the user. By way of example and without limitation, the system may send automatic notification to ensure normal operating of the system. For example, if system is working with power supplies from a storage battery, and remaining power in the battery is lower than the preset threshold, and the battery is not being charged, then the automatic alerting goes off until the user makes some improvement to the above situation, such as but not limited to replacing, charging the battery, switching to the AC power, etc. The processing module 110 may send a series of action instructions; the targets which receive the instructions include but are not limited to current devices, motors and computing devices as those described in the present disclosure. For example, the controlled object may be a motor 4360, and the content of its control includes but is not limited to control over the "on/off" states, displacement, velocity, acceleration, rotating angle, angular velocity, angular acceleration of the motors. The processing module 110 may transmit a specific action instruction to the motor 4360, the motor 4360 then drives an external device to generate a corresponding action. The external device 1443 may include, and without limitation to, a power, a network communication device, communication modules, and home appliances, etc. Further, home appliances may include, and without limitation to, a fan, a refrigerator, a washing machine, a television, an air conditioner, kitchen appliances, bathroom appliances, etc. For example, the external device 1443 may be a vent outlet of a smart fan, and the types of the fan may include, and without limitation to, a household electric fan and industrial fan. The household electric fans may include, and without limitation to, a fan, desk fan, floor fan, wall fan, roof fan, exhaust fan, wind wheel fan, air-conditioning fan, etc. The instructions received by the smart fan from the processing module 110 may include, without limitation to, the control over the dimension and direction of the outlet of the fan, the control over the rotating speed, acceleration, and delivery of the fan blade, for controlling the room temperature. Thus the temperature in each room may be adjusted in real-time according to various needs, thereby also achieving energy-saving purposes. On the other hand, action instructions sent by the processing module 110 may exert control over other communication devices 4350 via the communication module 140. The communication of the communication module 140 may be wired or wireless, and the wireless communication may include, and without limitation to, radio communication, free-space optical columniation, sonic communication, electromagnetic induction, etc., as described in the present disclosure. The communication device 4350 may include wireless communication devices or wired communication devices, such as but not limited to wireless devices (notebooks, wireless televisions, mobile phones, etc.), Bluetooth devices, near field communication devices, etc.

Figure 44:
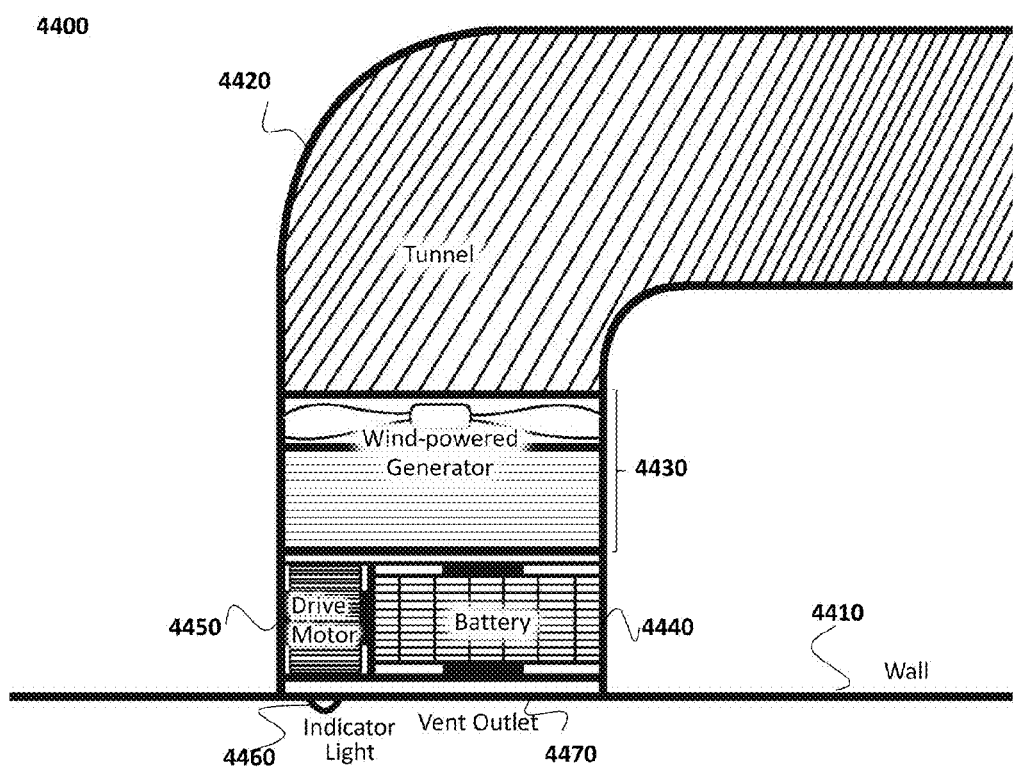
FIG. 44: Diagram of an exemplary embodiment of smart ventilation mode structure.

It should be noted that the above illustrations with respect to smart fans are for the purpose of understanding how the environment control system controls the external devices, and do not limit the scope of controlling modes for all external devices. For example, in some embodiments, the external device may be a smart heating system, and instructions from the processing module 110 may include, and without limitation to, turning the fireplace on, adding fuel, the amount of fuel added, the intensity of the fire, opening the fireplace, turning on the exhaust fan, etc. Persons of ordinary skill in the art may also make modifications and variations to the smart fans. In some embodiments, the controlled target may be an air conditioner having a control module at its outlet, the power supply form of which control module is shown in FIG. 44. Particularly, in some embodiments, the power may be an external power, a storage battery, or a power generator, etc. In some embodiments, the power is a storage battery 4440, and the storage battery may be a disposable battery or a rechargeable battery. In those embodiments where the power is a rechargeable battery, the charging of the rechargeable battery may be by an external electric power source, or an electricity generator 4310. In those embodiments where the rechargeable battery is charged by the electricity generator, the charging may be achieved through for example using a wind-powered generator 4430 in the ventilation pipes 4420 of the house to generate power. Wind-power generated electricity may be pumped into the battery 4440 to drive the motor 4450 for controlling the vent outlet 4470. The battery 4440 may include a function for notifying the battery level, such as an indicator light 4460, and when remaining charge is lower than a certain threshold, an alarm may be generated. For another example, the processing module 110 in the ventilation mode may have a gas composition sensor 4370 to monitor and/or detect composition and/or content of gases in a certain area. These gases may be from the environment, or from the human body. Gases from the environment may include, and without limitation to, carbon monoxide, carbon dioxide, oxygen, ozone, ammonia, methane, formaldehyde, benzene and phenyl group compounds, smoke and fog, and any other organic or inorganic gas. Gases from human body include pheromones and other smells originated from the human body. After transmission of the data relating to the composition and content of these gases to the processing module 110, dimension and direction of the vent outlet 4470, the rotating speed and acceleration of fan blade and the wind delivery may be controlled to keep room air fresh. A device of the smart ventilation mode may be installed on the wall 4410 and connected with the ventilation pipes 4420.

Figure 45:
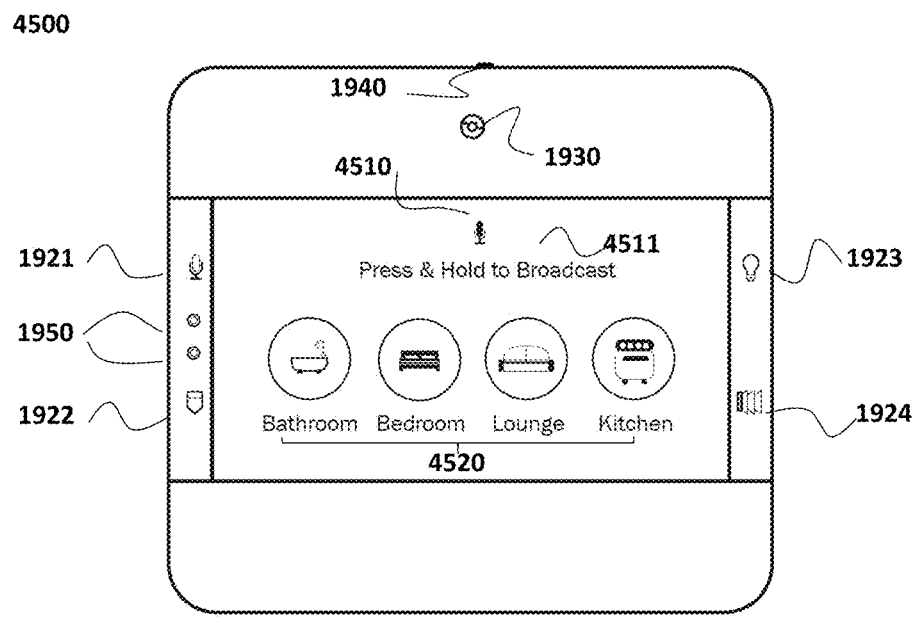
FIG. 45: Diagram of an exemplary embodiment of video voice intercommunication user interface.

FIG. 45 is one exemplary embodiment of video voice intercommunication functions of the environment control system. The interface 4500 shows a video voice intercommunication icon 4510, text descriptions for press & hold to broad cast 4511, operation tips 4520, and call area selection icon 4530.

For illustrative purposes, an embodiment of video voice call is described. The video voice call system consists of a processing module 110, a sensing module 120, a control module 130 and a communication module 140. The user initiates video voice call to input action instruction, the processing module 110 converts the user's action to a control instruction to the sensing module 120, the sensing module 120 transfers collected intercommunication information to the processing module 110, and the processing module 110 sends the instruction to turn on the communication module 140, then communication module 140 transfers the intercommunication information to certain receiving device.

A user initializes a video or voice call by the operating interface of the environment control system or via a user terminal. The user terminals may comprise any device that the environment control system installs, such as a desktop computer, a notebook, a palmtop computer (PDA), a tablet, a mobile terminal (phone), etc. The user may select rooms that he/she desires to speak to via the interface. These rooms may include, and without limitation to, the lounge, lounge, bedroom, nursery, study, kitchen, toilet, bathroom, etc., They may also be rooms defined by the user, these rooms may be close to each other, or be far away from each other. The user may be within one room, or far from these rooms. The user may choose one of the rooms to speak to, or choose several rooms to speak to simultaneously.

The processing module 110 transforms operations from the user into a series of instructions. The processing module 110 may send the instructions to one or more modules in the group of sensing module 120, control module 130, and communication module 140. The content of instructions sent to the sensing module 120 may include, without limitation to, turning on sensors for collecting specific information, including video, audio or text message, etc. The information collection sensor may be a camera, a microphone, or a text input device, etc. The content of instructions sent to the control module 130 may include, without limitation to, turning on a receiver or video playing window, which receiver or video playing window may be in the operating interface of the environment control system, or in the user's terminal. In those embodiments where the user uses a terminal, the content of instructions sent to the communication module 140 includes, without limitation to, turning on the communication module, receiving messages by the user via the terminal, such as voice, video or text messages. The connection between the communication module 140 and other communication modules outside or within the environment control system may be wired or wireless. The wired connections may include, and without limitation to, connections using metal cable, optical cable, or hybrid optical and electrical cables; the wireless connections may include, and without limitation to, radio communication, free-space optical columniation, sonic communication, electromagnetic induction, etc.

Information collected from the sensing module 120, or that received from the user by the communication module 140, is transferred to the processing module 110. The processing module 110 then sends instructions to the communication module 140, and the communication module 140 selects an appropriate way of communication to send the user information to the destination room. The appropriate way of communication is an optimized transmission strategy decided based on conditions such as whether a terminal device exists, the quality of network environment, the volume of the information file, etc. For example, in some embodiments, a user may record a message using the interface of the environment control system for another user within a destination room to receive using a mobile device, such as a mobile phone. In order to improve transmission efficiency, the environment control system may preferably select an appropriate communication for the mobile phone for the transmission, for example via a wireless network such as Bluetooth, WLAN, Wi-Fi, etc., or a mobile network like a 2G, 3G or 4G network, or other connections methods such as VPN connection, shared network, NFC, etc., instead of transmitting to the receiving cell phone indirectly via the environment control system in the destination room.

Message received by a user in the destination room may be opened automatically or opened after the user in the destination room clicks on it. The user in the destination room may choose not to respond to the message, to reply to the message (according to the process described above), to block the message, to store or delete the message, and to forward the message.

Figure 46:
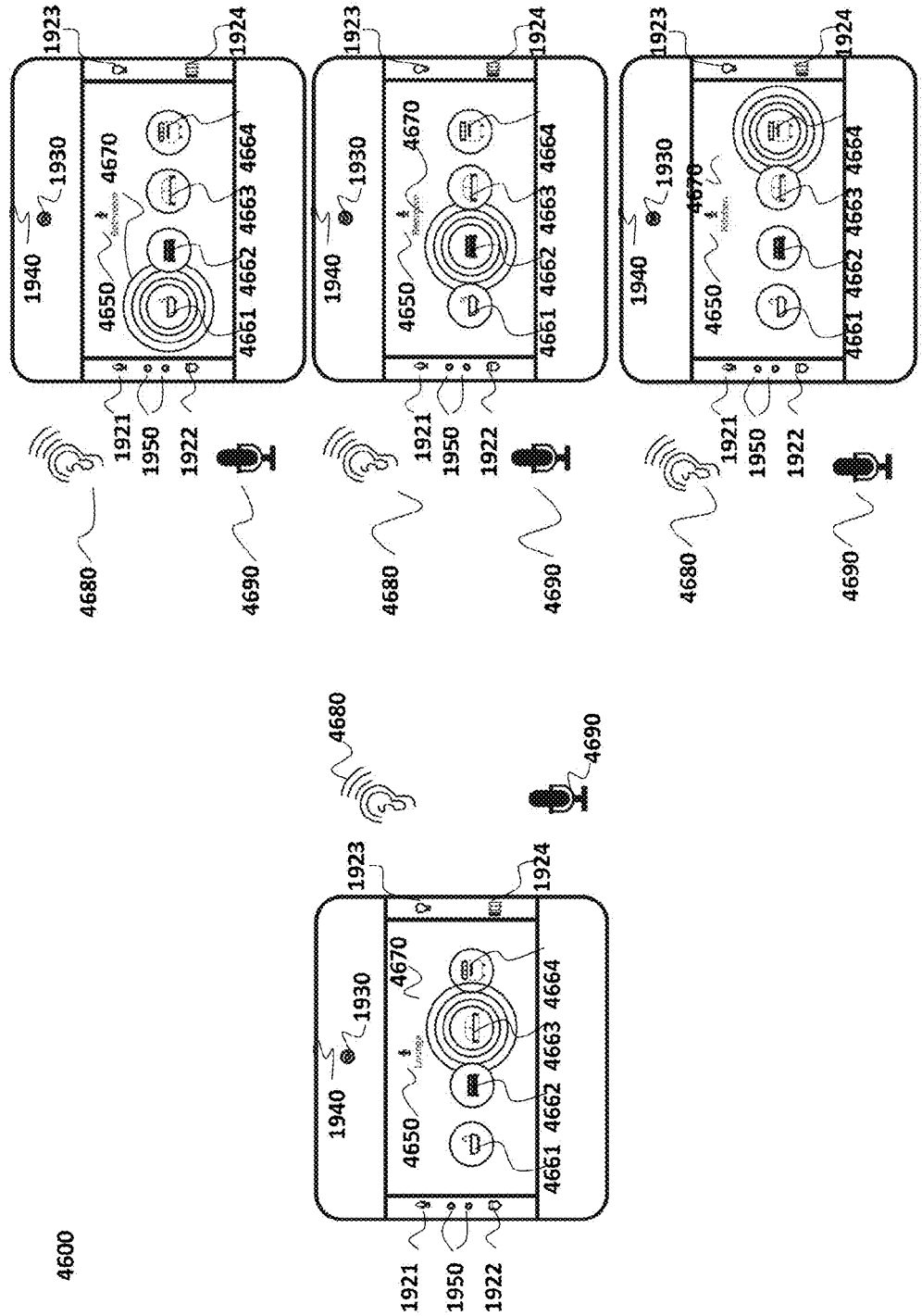
FIG. 46: Diagram of a video voice intercommunication network.

FIG. 46 shows an embodiment of a user interface in the video voice call mode. This embodiment lists communications between the smart switch 4610 and the smart switches 4620, 4630 and/or 4640, where each smart switch is equipped with a loudspeaker device 4680 and voice collecting device 4690, etc. The display area of the smart switch contains an area indicator 4650 and a selection indicator 4670. Areas capable of hosting a video voice call may include, and without limitation to, one or more bathrooms 4661, one or more bedrooms 4662, one or more lounges 4663 and one or more kitchens 4664.

Additionally, the video voice call mode further supports call answering functions, which may be realized by a standalone communication device, such as but not limited to a fixed or mobile phone that is designated a phone number and capable of dialing or answering phone calls. For example, the smart switch may have a slot for inserting a SIM card that enables the phone calling and answering functions. For another example, the call-answering function of the video voice call mode may be realized through its connection to a fixed or mobile phone, where the connection methods may be wired or wireless. Particularly, further detailed descriptions may be found in the description of the communication module of the present disclosure. When the fixed or mobile phone is called, the user may turn on a nearby answering button of the system to speak if the user cannot find the phone right away. For example, if a user is in the bathroom or restroom and the fixed phone being called is in the lounge or the mobile phone being called is not with the user, the user may answer the phone call in the bathroom or restroom directly, instead of declining the call or hurrying to the lounge to answer the call.

In another embodiment of the video voice call mode, devices within an environment control system may conduct a video voice call with devices in one or more other environment control systems, via media such as the internet or carrier operator network. For example, a user may make a video voice call to the smart switch 1410 in another user's home that may be in a different street, city or country, via the smart switch 1410 in his/her home, or make a video voice call to his/her neighbor via the smart switch 1410. The above examples are only for illustrative purposes, and applications of this embodiment may fall under other scenarios. For example, user A connects to the smart switch 1410 through televisions 1448-1, 1448-2, or 1448-3 in environment control system A (such as a television with video and audio acquisition equipment, etc.) and initializes a video voice call to user B. User B then uses a mobile device 1430 in environment control system B to establish the video voice call with the user A.

The video voice signal may be acquired by a video recording device in a smart switch, and the user may choose video and/or voice call. The user may initialize a video voice call from a smart switch, mobile device, television or other devices, or answer a video voice call on a smart switch, mobile device, television or other devices. Answering may be automatic (for example, the environment control system after receiving an invitation of a video voice call may turn on the corresponding device to initialize the video voice call) or via manual operation (for example, the environment control system may generate notifications such as buzzing or flashing upon receiving an invitation of a video voice call, and the user then may choose whether or not to answer the call on the interface). Additionally, the user may set a "do not disturb" time period, for example, to decline video voice calls between 10 p.m. to 6 a.m. The user may also establish a friend list and a black list, in which information such as locations, phone numbers, IP addresses, or user personal information may be recorded.

It should be noted that the above description on the flow and modules of the video voice call merely serves as exemplary illustrations. In actual implementation scenarios, persons having ordinary skill in the art may make expand or simplify the content of the flow or modules without additional innovation. For example, the sensing module 120 may bypass the processing module 110, and directly exchange data with the control module 130 and communication module 140. For another example, data collected by the sensing module 110 may affect the control module 130 or be transmitted via the communication module 140, without being processed by the processing module 110. These variations are still within the scope of the current application.

Figure 47:
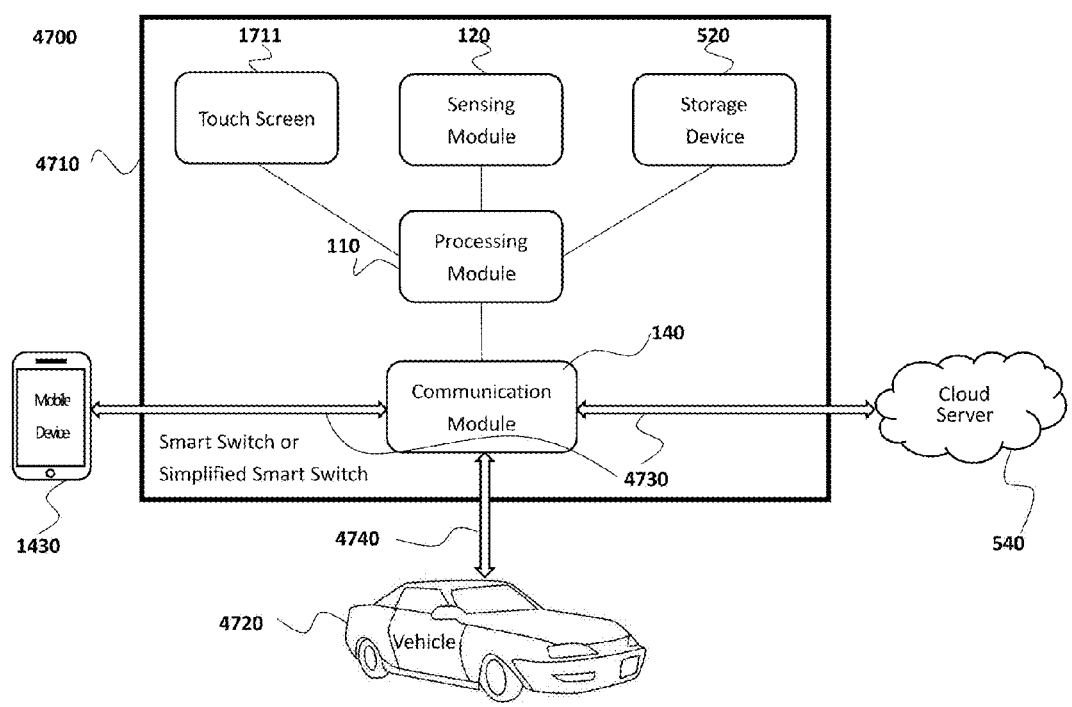
FIG. 47: Diagram of an exemplary embodiment of automobile control.

FIG. 47 is an illustration of an exemplary embodiment of the vehicle control. Particularly, the smart switch or simplified smart switch 4710 has a touch screen 1711, a processing module 110, a sensing module 120 and a storage device 520. The communication module 140 in the smart switch or simplified smart switch 4710 may communicate with the vehicle 4720 wirelessly. The mobile device 1430 and the cloud server 540 may conduct bi-directional wireless communication with the communication module 140. The user may send data to the vehicle 4720 via a mobile device 1430 and the data arrives at the vehicle 4720 via the communication module 140. The vehicle 4720 receives the data and then processes it, to achieve the purpose of controlling the vehicle-mounted devices. The vehicle-mounted devices may include, and without limitation to, engines, motors, vehicle-mounted multimedia or GPS mapping devices, air conditioners, etc. The smart switch or simplified smart switch 4710 may acquire data related to the outer environment via the sensing module 120. The data may be recognized as one mode by the processing module 110, and the mode may be sent to a cloud server 540 via the communication module 140 in a specific manner and be stored in the cloud server 540 after being received by cloud server 540. The smart switch or simplified smart switch 4710 may recognize another mode at a specific time, and the smart switch or simplified smart switch 4710 may communicate with the cloud server 540 via the communication module 140. By applying a specific algorithm to historical modes stored in the cloud server 540, certain patterns may be acquired. The smart switch or simplified smart switch 4710 may take corresponding actions in the specific time according to the pattern. For example, via the sensing module 120 the smart switch or simplified smart switch 4710 may acquire the following information: time, 7:00 p.m. on Dec. 28, 2052; season, winter; external temperature, −20° C.; internal temperature, 20° C. By communicating with the vehicle 4720, the smart switch or simplified smart switch 4710 may acquire the following information: the state of the motor, off; the state of the air conditioner, off; air conditioning temperature, 0° C. By communicating with the cloud server 540, the smart switch or the simplified smart switch 4710 may acquire the following pattern: the user usually leaves the room during the time between 7:30 and 8:00. According to the acquired pattern, the smart switch or simplified smart switch 4710 may send the following instructions to the vehicle 4720: starting the vehicle 20 to 30 minutes ahead of time; initializing the air conditioner; switching the air conditioner to the heating mode; setting the temperature of air conditioners to be 20° C.; initializing the vehicle-mounted multimedia and playing the user's favorite songs or displaying the real-time traffic information; adjusting the seat; initializing the GPS map to receive the destination location transmitted by the smart switch or simplified smart switch 4710 and planning the optimized path according to the destination location automatically; starting the engine 15 minutes ahead of time; preheating the vehicle 4720. Furthermore, the vehicle 4720 may send data to the smart switch or the simplified smart switch 4710 via the communication module 140 in real time or upon regular intervals. The data may include, without limitation to, the fuel-consumption condition of the vehicle, the condition of the battery, the condition of the refrigerant, etc. Especially if a vehicle was stolen, an alarm may be sent to the smart switch or simplified smart switch 4710 to warn that the vehicle 4720 has been stolen. The communication between the smart switch or simplified smart switch 4710 and the vehicle 4720 is not limited by their distance, i.e., wherever the vehicle 4720 is, it is able to communicate with the smart switch or simplified smart switch 4710. It should be noted that patterns acquired by the application of specific algorithm on information acquired by the sensing module 120 described above, the actions taken by the smart switch or simplified smart switch 4710, and the actions of the vehicle 4720 are for illustrative purposes. The information acquired by the sensing module 120 may be any physical quantity detectable in the environment, the patterns may be any habit of any user during specific time periods; the actions may be any actions made by the smart switch or simplified smart switch 4710; the vehicle 4720 may be a motorcycle, an electric car, an electric bicycle, a yacht, a Segway, an airplane, an electric wheelchair, a baby carriage, etc.

Figure 48:
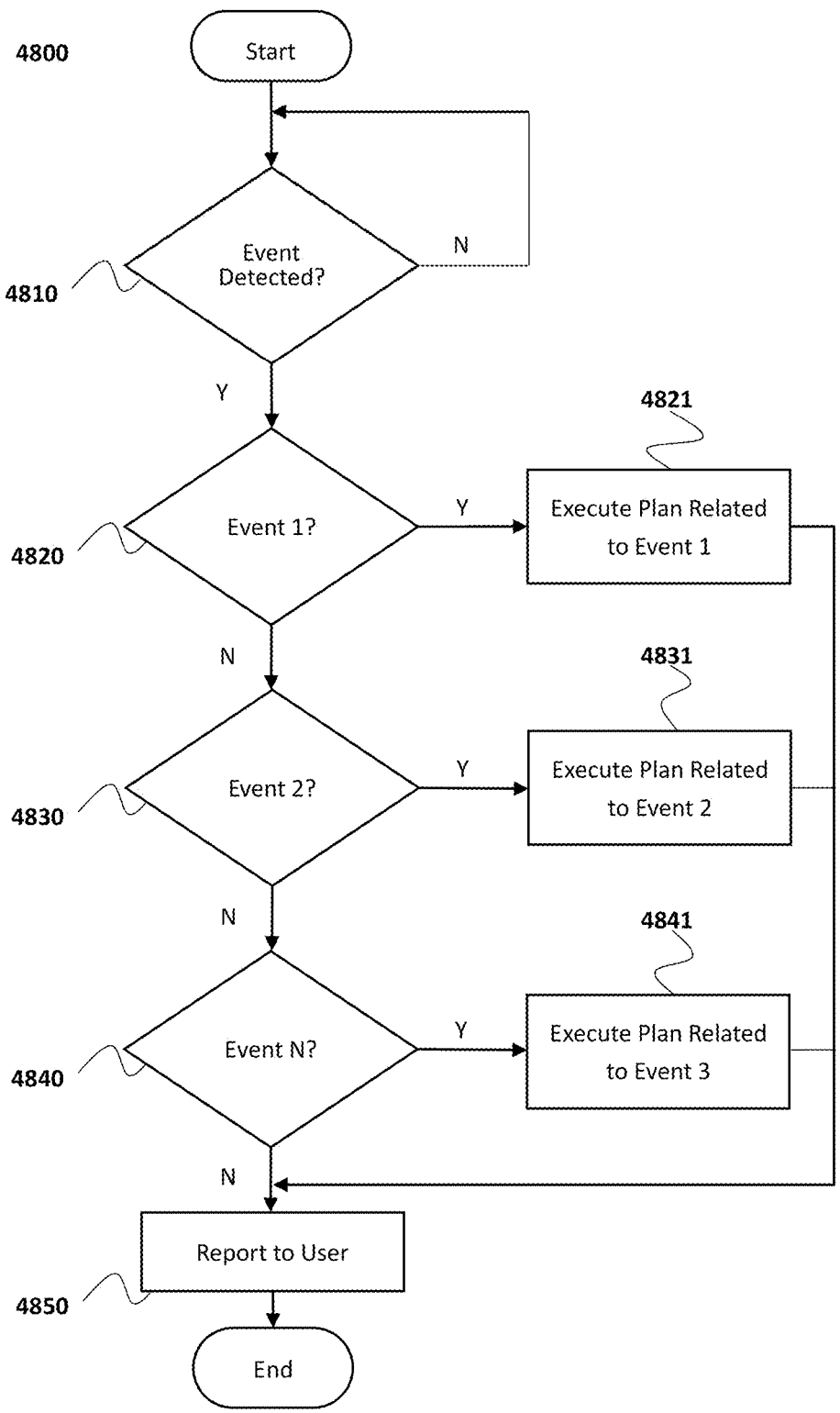
FIG. 48: Diagram of an exemplary embodiment of event plan execution.

FIG. 48 shows a flow chart of how the environment control system may process some preset events. In this embodiment, the processing module 110 determines information detected or received by the sensing module 120, the communication module 140 and/or the cloud server, such as the change of environment, sudden events, or real-time communication. After that, actions may be taken by the control module 130, or via the connection to the external device 160, to deal with the preset events. Hereinafter, a preset event that needs to be dealt with in a certain time are generally referred to as an emergency event, while the term "emergency event" does not necessarily suggest that the event has strong time-sensitivity or hazardousness.

First, the Step 4810 determines whether or not an emergency event is detected. Steps of 4820, 4830 and 4840 may then determine if the emergency is one of the preset events. If the emergency event is one of the preset events, the corresponding plan is executed in steps of 4821, 4831 and 4841; otherwise, if that emergency event is not one of the preset events, then the event is reported to the user and stored. Possible emergency events may include, and without limitation to, changes of weather, natural or man-made disasters, security events, communication events, time reminding, errors of the environment control system, notifications, etc. Furthermore, changes of weather may include, and without limitation to, sudden rainfall, precipitation, cooling, warming, environmental pollution, and changes in intensity of sunlight and wind speed, etc.; Natural or man-made disasters may include, and without limitation to, low temperature, high temperature, heavy rain, heavy snow, hail, typhoons, cyclones, tornadoes, dust storms, lightning, earthquake, tsunami, flood, volcanic landslide, pests, rodents, fire, etc.; security events may include, and without limitation to, thefts, robberies, human physical injuries, illegal invasion, illegal restriction of personal freedom, terrorist attacks, anti-society attacks, other man-made alarming, etc.; communication events may include, and without limitation to, calls based on fixed phone within the environment control system or between the environment control system and the external, call based on mobile devices, and video call, voice call, text messages, image messages, voice messages, video messages by wireless or wired means, etc.; time notifications may include, without limitation to, a calendar, events in different time zones, an alarm, a timer, a stopwatch, etc.; system errors may include, and without limitation to, hardware or software errors of the environment control system, hardware or software errors of the home appliances, hardware or software errors of the home multimedia devices, hardware or software errors of mobile devices, hardware or software errors of motor vehicles, and hardware or software errors of other electronic devices, etc.; notifications may include, and without limitation to, notifications preset by the user, notifications synchronized from mobile devices or personal computers, automatic notifications, etc. The above examples are for illustrative purposes and the emergency events may include other events such as important festivals and appointed events, etc.

After an emergency event is detected, the environment control system may match the detected event with the preset events, and execute planned responses with respect to the corresponding events if a match is found. Responses with respect to events may include, and without limitation to, sending notifications, communicating with public networks, controlling electric current and motors, etc. Further, responses with respect to emergency events may include, and without limitation to, sending notifications on the user interface screen of the environment control system; sending notifications to the mobile device and personal computer; receiving alarms or answering other phone calls; sending emails including text, image, voice or video information; sending instant messages including text, image, voice or video information; posting text, image, voice or video information on social networks such as Facebook or Twitter; uploading text, image, voice or video information to a cloud server; controlling flickering of lights; controlling loudspeaker and alarm; controlling locking of the doors and windows, controlling the on/off and angle of surveillance cameras; controlling the on/off of home appliances, etc. The examples described above are for illustrative purposes, and responses to emergency events may be other types, such as controlling the on/off of the ventilation devices and the sprinklers.

Setting emergency events may be achieved by, but is not limited to, events set in storage devices in the environment control system, events set by the user via user interface of the environment control system, mobile devices, or computers, events downloaded from a local network or the internet, events set via a cloud server or via the self-learning function of the environment control system, etc. For example, plans stored by the environment control system may include that after the detection of an illegal invasion, the environment control system immediately records and uploads videos to the cloud server, rings the alarm and calls the public security system (for example, 9-1-1 emergency call in the United States) at the same time; plans set by the user via user interface of the environment control system may include that the vehicle is to be started and preheated in a certain time in the morning of a low-temperature working day; plans downloaded by the user from the internet or set by other users may include that the music is to be played along with lights turned on when a family member is back home on his/her birthday; plans determined by the self-learning functions stored in the cloud server of the environmental control system may include that action B is executed immediately after the occurrence of event A, if the self-learning function have learnt the user's habit of executing B after A, etc. These plans may control every module in the environment control system and external devices. Furthermore, in some embodiments, the device controlled is a lighting device, and the flickering of the light may act as one response to emergency events. By way of example and without limitation to the following plans, the light may flicker continuously in the SOS Morse code in case there is an alarm of a security event; the light may flicker rapidly and continuously in case there is a sudden event; the light may execute a breathing-type flicker in a certain period of time when the intercommunication of the environment control system sends voice or text messages; and the light may execute a slow flicker in a certain period of time when the timer is working.

Figure 49:
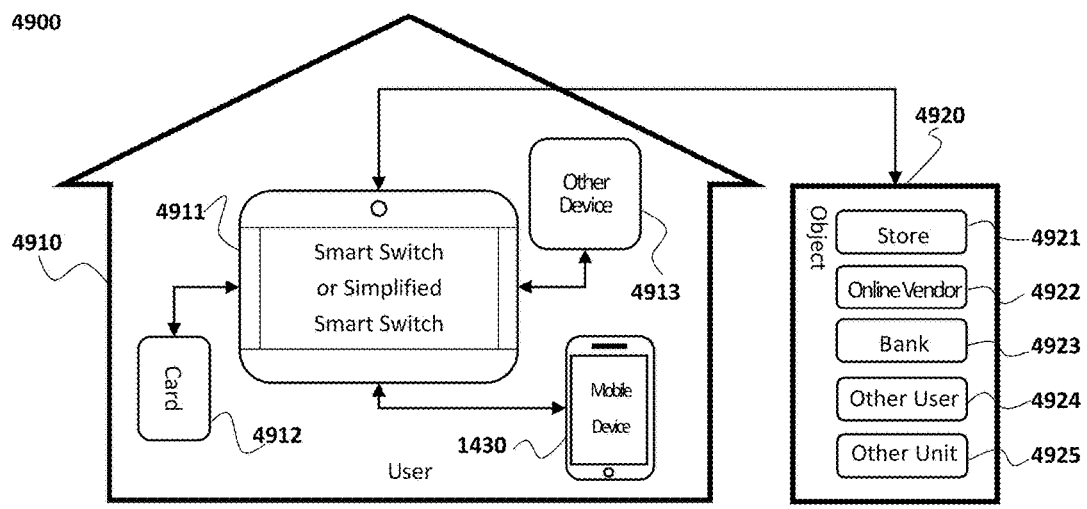
FIG. 49: Diagram of an exemplary embodiment of near-field communication (NFC) payment function.

FIG. 49 shows an exemplary embodiment of near-field communication (NFC) payment function. The smart switch or simplified smart switch 4911 is located within 4910. The smart switch or simplified smart switch 4911 contains at least one near field communication or NFC module. A card 4912 contains a NFC module. Other device 4913 contains a NFC module. The mobile device 1430 contains a NFC module. The smart switch or simplified smart switch 4911 may conduct bi-directional communication with the mobile device 1430, the card 4912 and the other device 4913, where the communication may be in an active mode or a passive mode. In the active communication mode, both sides of the communication have their own power device and both sides of the communication generate their own electromagnetic field. In the passive mode, only one side of the communication has its power device, while the other side acquires power to drive itself to work using an electromagnetic field emitted by the side having the power device. An NFC device may work in a card simulation mode, a point-to-point mode, and a card-reader mode, or any combination of the above modes. The smart switch or simplified smart switch 4911 may conduct bi-directional communications with the target 4920 through the communication module 140, and the target may include, without limitation to, a store 4921, an online vender 4922, a bank 4923, other users 4924, other units 4925, etc. It should be noted that targets listed above are for illustrative purposes, and the target 4920 may also include schools, railway stations, airports, hospitals, convenience stores and any other location that may communicate with the smart switch or simplified smart switch 4911. Apparently, after understanding of disclosure and principles of the present application, persons skilled in the art may conceive various modifications or variations to the forms or details of the target 4920, without departing from the present principles and structures. These modifications and variations are still within the scope of the present disclosure and claims. The smart switch or simplified smart switch 4911 may communicate with the store 4921 or other targets in 4920 to receive their coupon information or other information pushed by the store 4921 or other targets in 4920, such as the business hours or changes thereof, school hours or changes thereof, activity locations or changes thereof, etc. Take the store coupon as an example, the smart switch or simplified smart switch 4911 may store the received coupon information into the corresponding storage device. When the mobile device 1430 is close enough to the smart switch or simplified smart switch 4911, the two devices may be able to conduct bi-directional communication. The mobile device may acquire coupon information stored in the smart switch or simplified smart switch 4911. After the mobile device 1430 acquires the coupon information, the user may go shopping at the store 4921 that provided the coupons. Also, the mobile device 1430 may consume the coupon directly via the smart switch or simplified smart switch 4911: after receiving information that the coupon has been consumed in the mobile device 1430, the store 4921 delivers the content of consumption to the holder of the mobile device 1430 via a courier or in person. The card 4912 may conduct passive communication with the smart switch or simplified smart switch 4911. After establishment of the communication, the smart switch or simplified smart switch 4911 consumes the coupon information stored in the smart switch or simplified smart switch 4911 by reading information in the card 4912. After receiving the consumption information in the card 4912, the store 4921 delivers the content of consumption to the holder of the card 4912 via a courier or in person. Furthermore, the card 4912 may conduct active communication with the smart switch or simplified smart switch 4911 by active communication. The card 4912 may receive the coupon information stored in the smart switch or simplified smart switch by active communication. The above description on the consumption of coupon information is just a specific example, which should not be deemed as the only practical implementation. Apparently, after understanding the basic principles of payment using near field communication, persons skilled in the art may make various modifications and variations to the forms or details of the implementation of near field communication payment, and these modifications and variations are still within the scope of the present description. The other device 4913 may be any device that supports near field communication payment, such as a Wii U GamePad, by which games may be purchased through the smart switch or simplified smart switch 4911.

The environment control system has a self-learning function, of which one exemplary embodiment is described below. According to data acquired in its operation, the environment control system analyses the pattern of the data, continuously optimizes its algorithms, and finally reaches a degree that it is able to make judgments in unknown situations. Particularly, the data may include, without limitation to, data acquired by the environment control system via the sensing module 140, user's daily habit of using, data input to the environment control system, and any combination thereof.

Further, data acquired by the environment control system via the sensing module may include, and without limitation to, any physical, chemical, or biological data. Particularly, the physical data may include, without limitation to, sound, light, time, weight, approaching, location, temperature, humidity, pressure, current, velocity, acceleration, breathable particles, radiation, texts, images, touch, iris, fingerprint, etc.; chemical data may include, without limitation to, air pollutants, water pollutants, etc.; biological data may include, without limitation to, smell, microorganisms, allergens, etc. User's daily habit of using may include, without limitation to, operations by the user when using any part of the environment control system. These operations may include, and without limitation to, any one or combination of deleting, adding, selection, forward, backward, back, turning on, turning off, increase, decrease, speeding up and slowing down, as well as the one or more of time, location, range, intensity, dimension, frequency, precision corresponding to these operations. Additionally, a user's habit of using may include feedback to the judgment of the environment control system, such as but not limited to agree, decline or neither, etc. Data input to the environment control system may include, without limitation to, codes, algorithms, programs, software, or applications that are transmitted to or input into the environment control system using network, floppy disk, hard disk, CD, flash drives, chips or other data carriers, or through input devices such as a keyboard or mouse. Through self-learning and analyzing acquired data or feedback, the environment control system continuously optimizes its algorithms, and eventually realizes artificial intelligence. For example, the environment control system may learn about when lights should be on through the user's operations of turning on the lights. Meanwhile, through the use of light sensors, the environment control system may learn about the luminance condition in the room every time before the user turns on the light. After continuous self-learning, the environment control system may automatically acquire a mode; that is, when luminance in a room reaches a certain threshold, automatically turn on the light. In another example, when the user travels and is not at home, the environment control system still decides whether to turn on the light whenever luminance reaches a certain threshold. But if the motion sensor has not detected any movement within the house for a period of time, the environment control system then will not turn on the light. In this situation, the environment control system may gradually acquire a new mode; that is, not to turn on the light even when the luminance in the room reaches the threshold. Additionally, the user may also manually input some instructions to quickly change the self-learning function of the environment control system.

It should be noted that the examples described above are for illustrative purpose. The modes of self-learning are not limited to the situations described above and persons of ordinary skills in the art may make changes to the technology according to the principles of self-learning described above.

First Exemplary Embodiment of Artificial Intelligence: Smart Housekeeper of Electrical Appliances Provided herein is an exemplary embodiment of the environment control system as a smart housekeeper of electrical appliances. The environment control system may connect all or some of the home electrical appliances to the environment control system in a certain way, and manage them in a distributed or centralized manner. For example, the setting interface as shown in FIG. 30 may allow a user to access the mode for adding a new home electrical appliance. The user may pair one or more devices or appliances to the environment control system in that mode, enabling the environment control system to communicate with these devices and appliance, to acquire information from and control these devices or appliances. These home appliances may include, and without limitation to, multimedia electronic devices, office appliances, kitchen appliances, bathroom appliances, and any other home appliance. Particularly, the multimedia electronic devices may include, without limitation to, television sets, personal computers, acoustic equipment, home gaming terminals such as Microsoft Xbox series, and Sony PlayStation series, television set top boxes, video/audio playing devices, and network television terminals; office appliances may include, without limitation to, appliances such as servers, printing devices, scanning devices, telephones, shredders; kitchen appliances may include, without limitation to, range hoods, electric furnaces, electric stoves, microwave ovens, ovens, refrigerators, dishwashers, small kitchen appliances such as toasters, juice machines, mixers, etc.; bathroom appliances may include, without limitation to, water heaters, washing machines, dryers, and small bathroom appliances such as hair dryers, beauty instruments, etc.; Other home appliances may include, without limitation to, heating equipment, air conditioners, lighting devices, central water system, doorbells, routers, data storages, chargers of mobile devices, gateway terminals of smart devices, etc. The above examples are for illustrative purpose only, and home appliances may be of other types such as home theaters, cars or any other home appliances.

The environment control system may manage these appliances individually, such as the security mode and lighting mode described above. The environment control system may also manage these appliances in a centralized manner. With respect to centralized management, it may include, and without limitation to, controlling according to the synergy and antagonism between different types of appliances and the self-learning approaches of the environment control system. The synergy may include, without limitation to, the need of coordination of two or more appliances when doing a task. For example, when cooking, a microwave oven, an electronic oven, a blender, and a range hood may be used at the same time. The antagonism may include, and without limitation to, the need to stop simultaneous use of other appliances when some appliances are working on a task. For example, when the air conditioner is turned on, the heating devices need to be turned off; and when the lighting is turned off, the security mode need to be turned on. The environmental control system's self-learning function mainly analyzes the user's habits of using with respect to various appliances, such as the user typically turns on the lighting system after closing the curtain, or turns on the music player after starting a shower. The environment control system may automatically record these sequences of operations and optimize its algorithm to control appliances through its continued interaction with the user. The environment control system may use the synergy/antagonism relationship of appliances and the self-learning function individually or in a combination. To help with better understanding, the following example is given: suppose the user is an office worker, who gets up at 7 am, washes up at 7:15 am, prepares breakfast at 7:35 am and leaves home at 8 am. The environment control system may turn on the air conditioner in the bedroom slowly at 6:50 am; turn on the light in the bedroom at 7 am; preheat the water heater in the bathroom at 7:10 am; turn on the light in the bathroom at 7:15 am; turn off the air conditioner and light in the bedroom at 7:20 am; turn on the light in the kitchen at 7:35 am, and turn on the range hood after the user has turned on the gas; turn off the water heater and light in the bathroom at 7:38 am; after the user turns off the gas, turn off the range hood; turn on the dishwasher at 7:50 am; turn off the dishwasher and light at 7:55 am; turn on the light in the lounge and broadcast the weather forecast at 7:55 am; open the door and turn off the indoor light at 8 am.

It should be noted that throughout the user's usage, a series of actions may happen, and the environment control system equipped with the self-learning function may adapt to other various situations that are not limited by the examples provided above. Additionally, the control of the appliances by the environment control system is not in a fixed mode, and the system may coordinate every appliance intelligently and fluently according to the user's real-time actions. For example, the environment control system may determine the user's status through the sensing module each time before it receives or sends a command. For example, even if the bathroom lights are scheduled to be turned on at 7:15, but if the sensing module has not detected the user's activity in the bathroom by then, the system would delay turning on the lights in order to save energy.

Second Exemplary Embodiment of Artificial Intelligence: Smart Conversation Service The environment control system has a smart conversation function in one embodiment. When a user appears within the detectable range of the environment control system, the environment control system may begin to collect information of the user and recognize the user according to that information. After recognition of the user, the environment control system may inquire the user's stored database and outputs the content of conversation according to the user's characteristics, habits, or inclinations. After the user replies, the environment control system may judge the semantics of that reply to determine the content of further conversation or follow the user's instructions. When the environment control system collects the users' information, a sensor built inside or outside the smart switch may be used. The collected information may include, and without limitation to, information or parameters of the user and the environment. Information of the user may include, and without limitation to, face, body, action, speed, acceleration, voice, facial expression, temperature, smell, pheromone, etc. Information of the environment may include, and without limitation to, image, sound, temperature, humidity, pressure, gas, electromagnetic waves, etc. Information collected by the environment control system may be one type of information described above, or a combination of several types of information. The sensor to be used may include, and without limitation to, one or more of video sensors, motion sensors, speed and acceleration sensors, sound sensors, temperature sensors, pheromone sensors, humidity sensors, pressure sensors, gas composition sensors, electromagnetic wave sensors (such as but not limited to visible light sensors, infrared sensors, and ultraviolet sensors). The environment control system makes comprehensive judgment based on the collected information to recognize the user's identity.

For the sake of illustration, provided herein is an exemplary implementation of the image recognition. Assuming that user is hostess A. When hostess A enters into a room in the morning, a video sensor for example may collect images and sounds of her, then transmits that information to a processing module to perform the recognition. The methods of recognition may include, and without limitation to, any one or combination of facial characteristics, body features, sound characteristics, characteristics of actions. Particularly, the facial characteristics may include, without limitation to, one or more characteristics such as ages, irises, facial expressions, hairstyles, the relative position of facial features. Body characteristics may include, and without limitation to, one or more characteristics such as height, volume, and body proportions. Voice/sound characteristics may include, and without limitation to, any one or combination of characteristics such as pitch, musical quality, frequency, fluency, or key words, of user's voice or walking sound. The motion characteristics may include, and without limitation to, one or more selected from body movements (such as movements of head, arms or legs), speed, or acceleration, etc. The environment control system may transmit the collected information to the processing module to have the information analyzed comprehensively to recognize the identity of hostess A. Methods adopted during the comprehensive analysis may include, and without limitation to, validation of user's identity by comparing the stored database with the collected information using certain algorithms. Assuming that the environment control system determines the identity of hostess A according to information such as the age, iris, height, walking speed. The environment control system subsequently further inquiries data related to hostess A in the environment control system and outputs the content of conversation according to the specific conditions such as time, location, weather, etc. In this scenario, for example, the environment control system determines that the hostess A has entered into the kitchen in the morning. The content of conversation to be outputted by the environment control system may include, without limitation to, "good morning, dear A! Are you going to make breakfast?" A conversation partner may be displayed by the conversation interface on the display of a smart switch or other devices. Types of conversation partners may be defined by the system, or set by a user according to his/her preferences or habits. These partners may be human subjects, animals, or plants, including, but not limited to, movie stars, singers, historical figures, cartoon characters, and all kinds of anthropomorphic animals or plants. These partners may be displayed in two-dimensional or three-dimensional. The language and voice feature of conversation partner may be set to reserve the partner's own style, or set by the user. After hostess A receives the conversation information from the environment control system, she may respond, such as but not limited to, "Yes, I want to check if anything is left in the refrigerator." The environment control system, after receiving the response, may then judge again. For example, the environment control system may determine that the hostess A is going to cook breakfast based on the response "Yes," and that hostess A needs to check the refrigerator based on keywords such as "refrigerator" and "check." After the processing of the information, the environment control system may generate an action that opens the refrigerator door and output voice "OK. Is there anything else I may help with?"

It should be noted that the above description is for illustrative purposes only, and the practical scenario of the smart conversation function is not limited to the examples provided above. Persons of ordinary skill in the art may make other variations after understanding of the principles of smart conversation. For instance, the situation in the example with hostess A may be applied to other members of the family or pets, such as elders or kids who need company. For example, when senior B is in the bedroom alone, the system, after a series of information collection and analysis, may automatically start a conversation with that senior person. For example, "Dear B, you have been sitting in the room for 2 hours; how about going downstairs and having a walk?" The senior person may reply that "Thanks, but no. I want to know if my grandson C slept well last night." The environment control system, after checking the record of family member C's sleep last night, may reply "C went to bed at 9 o'clock and slept for 11 hours with a deep sleep of 7 hours. He had a good sleep." Obviously, this scenario is also for illustrative purposes only, and this kind of expansions or variations that do not depart from the principles are still within the scope of protection sought by the present application.

Third Exemplary Embodiment of Artificial Intelligence: Smart Home Care

The following scenarios may exist in a family: parents are busy working in a room, having no time to care for the kids or elders temporarily. The environment control system has a smart care function (such as but not limited to the infant monitoring mode 1915 or 1958 as shown in the menu interface). Below illustrates one of various implementations. The main workflow of the smart care function is that the environment control system collects information of the cared target, transmits the information in real time to the supporter or provider, automatically analyses unexpected situations and sends alarms. The environment control system's collecting information may be realized via its sensing module. The collected information may include, without limitation to, information or parameters of the user in the environment. Information of the user may include, and without limitation, to face, body, action, speed, acceleration, voice, facial expression, temperature, smell, pheromone, etc. The sensor to be used to collect such information may include, and without limitation to, video sensors, motion sensors, speed and acceleration sensors, sound sensors, temperature sensors, pheromone sensors. It is also possible to recognize information related to human or animal subjects using device worn by human or animal subjects, such as GPS devices, mobile phones, smart glasses, smart watches, or any other wearable devices along with other information. For example, the environment control system may detect wearable devices of a human or animal subject or information such as the height of the human or animal subject, and then recognize the identity of the human or animal subject. After collecting the information, the environment control system may transmit it to the room of the supporter or provider using the communication module, such that the user can acquire the status of the cared target in a timely fashion. The forms of such information may be text, voice, and video. Additionally, the environment control system has an emergency alert function, where the emergency may include, without limitation to, a child falling down, crying, falling from the bed, playing or making noises, and screaming, a senior person falling down, waking up frightened, or screaming, etc. To help illustration, assume the cared target is a child, and the target location is a swimming pool, while the parents are talking in the lounge. The environment control system may record the activity of the child using a camera of the smart switch or other image-capturing devices, and transmit it to the smart switch or other external display devices in the study so that parents are able to know the activity of the child at any time. The system does not disturb parents if the cared child is safe. The video information collected by the environment control system may be analyzed by the processing module, such as detecting whether the child is near or has fallen into the swimming pool. The methods of the environment control system for analyzing the videos may be defined by the user, or acquired by the environment control system via self-learning. For example, if the environment control system detects that the child is near the edge of the swimming pool, it may send alert instructions to the lounge, and corresponding devices in the lounge such as the smart switch's loudspeakers or alert devices may execute that alert instruction and let parents know about the danger.

It should be noted that the above description is for illustrative purposes and practical applications may be not limited to the above examples. Persons of ordinary skill in the art may implement other variations or applications after understanding the principles of smart care. For example, the environment control system may be applied in the sanatorium, nursing home, delivery room, baby room, dormitory in a kindergarten, etc., and it may also be used for pet care and patient care. For example, with respect to pet care, it may be used along with other external devices to undertake other tasks, which include but is not limited to feeding the pet on schedule, preventing the pet from chewing home facilities, talking to the pet, etc. With respect to the patient care, the undertaken tasks may include, and without limitation to, helping the patient call the nurse, reminding the patient to take medicine, reporting the health condition to the patient, etc. Such expansions are still within the scope of the present application.

Fourth Exemplary Embodiment of the Artificial Intelligence: Smart Health Assistant The environment control system may establish a health record for every family member, and provide health information to the user in real time. Particularly, the process of establishing health record includes, without limitation to, the acquisition of user's physiological parameters by the environment control system via for example detection by the sensing module, input by the user, or the self-learning function, etc. These physiological parameters may include, and without limitation to, the user's gender, age, height, weight, bust/waist/hip measurements, blood type, body temperature, respiration, pulse, heart rate, blood pressure, blood glucose, blood lipids, reflection of corneal and pupil, medical history (such as but not limited to tuberculosis, heart disease, asthma, hypertension, diabetes), etc. Physiological parameters may also include conditions of sleeping, metabolisms, or physical examinations. The user may understand his/her own health conditions through the environment control system. Additionally, according to its analysis and determination, the environment control system may provide health suggestions daily or at appropriate time. For example, after getting up, the user may know his/her sleep quality last night, learn his/her temperature, heart rate, breathing, pulse, blood pressure, or blood lipid from the environment control system. The environment control system may conduct a comprehensive analysis using the user's instant physiological parameters and health records. If the parameters are within the normal range, the user may be not notified. But if the variation of physical parameters of the user is out of a certain range, such as significant rise of body temperature, decreasing of sleeping time, significant rise of blood pressure or blood lipid, the user may be notified such as by a voice message. Assuming the user is ill, for example, suffering from a cold or hypertension, then the environment control system may remind the user to take the medicine, measure body temperature or blood pressure at an appropriate time (such as but not limited to before a meal, after a meal, before bed, etc., depending on the specific medicine). After the user recovers from the disease, the environment control system may update the user's health record. That update may be realized by input from the user, or by automatic update of the environment control system, or by update of the environment control system based on information provided by a third-party. For example, the environment control system may acquire the health information or healing information from the user's medical records (such as electronic medical records) or prescription records kept by the hospital or the user's doctor, so as to update the user's health record in the environment control system. In some cases, the environment control system does not establish or maintain the user's health record, but rather acquires the user's health record from a third party. For example, the environment control system may acquire the user's health record from the third party in real time, according to a set schedule, or when a triggering event occurs. Such triggering events may include the establishment or update of the medical records, such as electronic medical records or prescription records kept by the hospital or by the user's doctor. The third party may include a hospital, a clinic, a pharmacy, or any other institution or person capable of establishing, updating, saving, or accessing the health information or other information of the user.

It should be noted that the above examples are provided for illustration purposes. The practical applications are not limited to examples described herein. Persons of ordinary skill in the art may make other variations or applications after understanding the principles. For example, the environment control system may be employed in locations such as a patient room or sanatorium to assist the treatment of the patient. The environment control system may also share the health record with a private doctor to allow the doctor to gain knowledge of the physiological parameters of the user.

Fifth Exemplary Embodiment of Artificial Intelligence: Smart Living Assistant

The environment control system may administrator a user's living conditions intelligently. One exemplary implantation is as follows: the environment control system may use devices that are built inside of or external to the environment control system to assist the user in accomplishing a series of activities according to the user's habits. Particularly, the activities may include, and without limitation to, getting up and going to bed, and the devices may include, and without limitation to, various smart appliances. For example, in the activity of getting up, the environment control system may cooperate in many ways, including but not limited to various aspects such as turning on the alarm, turning on the light, drawing the curtain, turning on the air conditioner, suggesting dressing index, etc. With respect to the setting of the alarm, the sound and frequency of the alarm may be defined according to the user's preference or habit, for example, the sound of the alarm may be music, human voice, voice of animals, etc. The alarm may be once, or multiple times at certain intervals. With respect to turning on lights, the lights may be turned on at a specific time, or alternatively turned on gradually within a period of time (such as to simulate the sun rise). The light-on time and brightness of light may be set by the users, or determined by the system through self-learning. Whether and when the curtain should be open may be set by the user, or by the system according to whether the user is detected to be out of the bed and properly dressed. The air conditioner may be turned on after or before the user gets up. For example, the environment control system may control the air conditioner according to the user's instruction and/or one or more other parameters. The user's instructions may include one or more parameters of the time when the user gets out of bed, the temperature at or prior to that time (such as the temperature half or one hour before the user getting up), and the speed of temperature change. The control of the air conditioner may include, and without limitation to, the starting time, operating power, the variation curve of the power (such as varying with respect to time), etc. The notification of dressing index is based on the weather forecast function of the environment control system. For example, when the outdoor temperature is low, the environment control system may notify the user to wear more clothes. With respect to resting, the environment control system may provide assistance that includes but is not limited to notification of resting, turning off lights, turning on the air conditioner, closing the curtain, etc. With respect to notification of resting, the environment control system may send the notification by playing video, voice, or music. Particularly, the choice of video, voice, or music may be set according to the user's preference or habits. With respect to turning off lights, the light may be turned off at a certain time, or dimmed gradually over a period of time (to simulate the process of sunset). The air conditioner may be turned on prior to when the user goes to bed, or determined by the environment control system according to the detected real-time temperature.

It should be noted that the examples described above is intended for the sake of understanding and should not limit the application of the present disclosure. Persons skilled in the art may make other variations or applications after the understanding of the principles. More complicated tasks may be undertaken by the combination of the functionality of smart living assistant with other functionalities. For example, the functions of the smart living assistant and the smart conversation may be combined to tell stories when the child gets up or goes to bed, to help the child learn a song or review the lessons. The related applications or instructions may be inputted into the environment control system in ahead of time, such that the environment control system may lead the child to learn new knowledge in an interactive way on a daily basis.

Sixth Exemplary Embodiment of Artificial Intelligence: Smart Recommendation of Lifestyle With the help of big data, cloud data and the self-learning function of the system, the environment control system may be able to provide users with lifestyle suggestions in which they are really interested in a very considerate way at all times and places. These lifestyle suggestions may include, and without limitation to, recommendations on various aspects such as food menus, television/film programs, meetings with people, travel plans, workout plans, etc. For example, information such as the user's nationality, religion, diet habits, physical conditions may be stored in the environment control system, and may be used to automatically generate recommendations of appropriate diet menus. For example, in some embodiments, the environment control system may detect that the user mainly consumes vegetables based on examination and analysis of his/her daily dishes. The system may also find out that the user is on the low end of a reasonable body weight spectrum, according to his/her stored health record. The system may also find out that the user does not have any specific religion. Based on the above information, the environment control system may automatically recommend some meat-containing menu for the user to choose from. In another example, the environment control system may record and analyze information such as the user's phone records, guests appeared in the lounge, names mentioned in conversations, or settings by the user, and thus be able to remind the user to contact or meet with certain guests, etc. In another example, the environment control system may record and analyze the user's television-viewing history, such as, the channels, time periods, programs. Thus, the environment control system is capable of recommending the user to watch certain interesting programs when there are updates in them at certain time. In yet another example, the environment control system may notify the user to put on more clothes or a hat, to take an umbrella, to wear a mask, etc., according to weather forecast of the day. Additionally, according to the user's living habits, diet habits or physical conditions, the environment control system may recommend the user whether or not to exercise, as well as the suitable methods for exercising, etc.

It should be noted that the examples described above are intended for illustrative purposes, and should not be interpreted as to limit the practical application of the disclosed subject matter. Persons skilled in the art may make other variations or applications after understanding the disclosed principles. For example, more complicated tasks may be undertaken by the combination of different functions of the system. For example, the smart lifestyle recommendation function may be combined with the NFC function, such that the system may be able to recommend advertisements of real value and interest to the user. Such expansions in functionality or applications, are still within the scope of the present application.

What is claimed is:

1. A system comprising,
a first panel comprising a first sensing module configured to collect a parameter and a first processing module configured to control a device according to the collected parameter, and
a second panel comprising a physical controller operably connected to the device, the first panel and the second panel being operably and detachably connected to each other,
wherein the first panel is configured to control the device through the second panel and
the physical controller is configured to work independently of the first panel to directly control the device when the first panel is detached and disconnected from the second panel, and
wherein the physical controller is covered by the first panel when the first panel is attached and connected to the second panel.

2. The system of claim 1, the second panel further comprising a current detecting device configured to collect current information and send the current information to the first panel.

3. The system of claim 1, the physical controller comprising a dimmer.

4. The system of claim 1, the first panel further comprising an ambient light sensor configured to sense intensity of ambient light.

5. The system of claim 1, the first panel further comprising a temperature and humidity sensor or a gas composition sensor.

6. The system of claim 1, the first panel further comprising a motion sensor configured to detect speed, contour, and a distance between an object and a smart switch in a vicinity of the smart switch.

7. The system of claim 1, the first panel further comprising a gateway.

8. The system of claim 1, the first panel further comprising a first communication module, wherein the first panel is configured to communicate with a second device via the first communication module.

9. The system of claim 1, the first panel further comprising a touch screen configured to receive user input via the touch screen.

10. The system of claim 1, the second panel further comprising a second sensing module.

11. The system of claim 1, the second panel further comprising a second communication module.

12. The system of claim 1 further comprising a third panel, the third panel including a second physical controller configured to control a third device with the first panel being configured to control the third device through the third panel.

13. The system of claim 1 further comprising a remote control configured to control the device via the first panel.

14. The system of claim 1, wherein the first panel comprises a first port and the second panel comprises a second port with the first and the second port forming a connector when the first panel is attached to the second panel and wherein the ports.

15. A method of using a system to control a device, the system comprising:

a first panel and a second panel comprising a physical controller operably connected to the device with the first panel and the second panel being operably and detachably connected to each other and the first panel configured to control the device through the second panel, the method comprising:

receiving a parameter or user input related to the device via the first panel; and controlling, by the first panel, the device according to the received parameter or at least some of the user input;

wherein the physical controller is configured to control the device independently of the first panel when the first panel is detached and disconnected from the second panel, and wherein the physical controller is covered by the first panel when the first panel is attached and connected to the second panel.

16. The method of claim 15, the first panel further comprising a first sensing module configured to collect the parameter relating to the first panel.

17. The method of claim 15, the first panel further comprising a touch screen configured to receive the user input.

18. The method of claim 15, the physical controller comprising a dimmer.

19. The method of claim 15, the first panel further comprising a first communication module configured to communicate with a second device.

20. The method of claim 19, the first panel being configured to control the second device via the communication with the second device.

* * * * *